United States Patent [19]
Seto et al.

[11] Patent Number: 5,875,044
[45] Date of Patent: Feb. 23, 1999

[54] IMAGE FORMING APPARATUS AND METHOD

[75] Inventors: Kaoru Seto, Chigasaki; Atsushi Kashihara, Hachioji; Takashi Kawana; Manabu Takebayashi, both of Yokohama, all of Japan

[73] Assignee: Canon Kabushiki Kaisha, Tokyo, Japan

[21] Appl. No.: 815,897

[22] Filed: Mar. 12, 1997

Related U.S. Application Data

[63] Continuation of Ser. No. 252,429, Jun. 1, 1994, abandoned.

[30] Foreign Application Priority Data

Jun. 4, 1993 [JP] Japan ................................ 5-134394
May 6, 1994 [JP] Japan ................................ 6-094420

[51] Int. Cl.$^6$ .................................................. G03F 3/08
[52] U.S. Cl. ........................ 358/518; 358/445; 358/448; 382/162; 382/299
[58] Field of Search ..................... 358/445, 448, 358/455, 456, 458, 462, 464, 443, 501, 518; 382/162, 167, 299

[56] References Cited

U.S. PATENT DOCUMENTS

| | | | |
|---|---|---|---|
| 4,303,947 | 12/1981 | Stoffel ..................................... | 358/260 |
| 4,751,585 | 6/1988 | Shibazaki ................................ | 358/464 |
| 4,878,126 | 10/1989 | Ichikawa ................................. | 358/451 |
| 5,235,436 | 8/1993 | Sakamoto et al. ...................... | 358/462 |
| 5,313,313 | 5/1994 | Sato ........................................ | 358/514 |
| 5,404,233 | 4/1995 | Nagata et al. .......................... | 358/456 |
| 5,408,338 | 4/1995 | Koike ...................................... | 358/448 |

FOREIGN PATENT DOCUMENTS

| | | |
|---|---|---|
| 0348145 | 12/1989 | European Pat. Off. . |
| 0359463 | 3/1990 | European Pat. Off. . |
| 0444953 | 9/1991 | European Pat. Off. . |

OTHER PUBLICATIONS

Horak, "Interchanging Mixed Text Image Documents In the Office Environment," Computers & Graphics, vol. 7, No. 1, 1983, pp. 13–29.

Anderson et al., "Binary–image–manipulation algorithms in the Image View Facility," IBM Journal of Research & Development, vol. 31, No. 1, Jan. 1987, pp. 16–31.

*Primary Examiner*—Thomas D. Lee
*Attorney, Agent, or Firm*—Fitzpatrick, Cella, Harper & Scinto

[57] ABSTRACT

An image forming apparatus and method produce, when 600 dpi image data is generated from 300 dpi image data, interpolated data of a pixel of interest by a two-value logical operation in a case where the image data about the periphery of the pixel of interest appertains to binary representation. When the image data is judged to appertain to an image of multivalued representation, the interpolated data of the pixel of interest is produced by a numerical operation. As a result, a 600 dpi picture of the same size can be printed and recorded in such a manner that outline sharpness and smoothness, which are characteristics possessed by a two-value image, are maintained at portions of the input 300 dpi image data that are two-value images while smoothness of the grayscale is maintained at portions of the input 300 dpi image data that are halftone images.

40 Claims, 46 Drawing Sheets

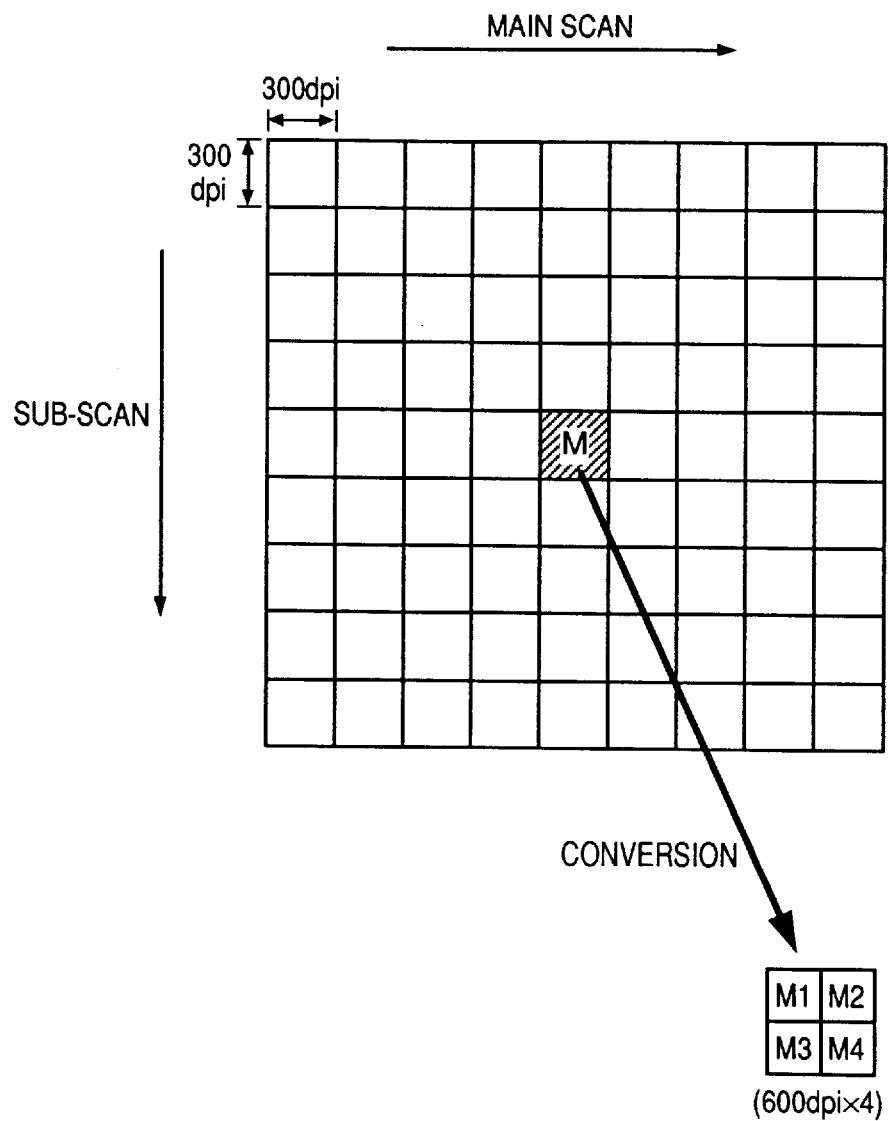

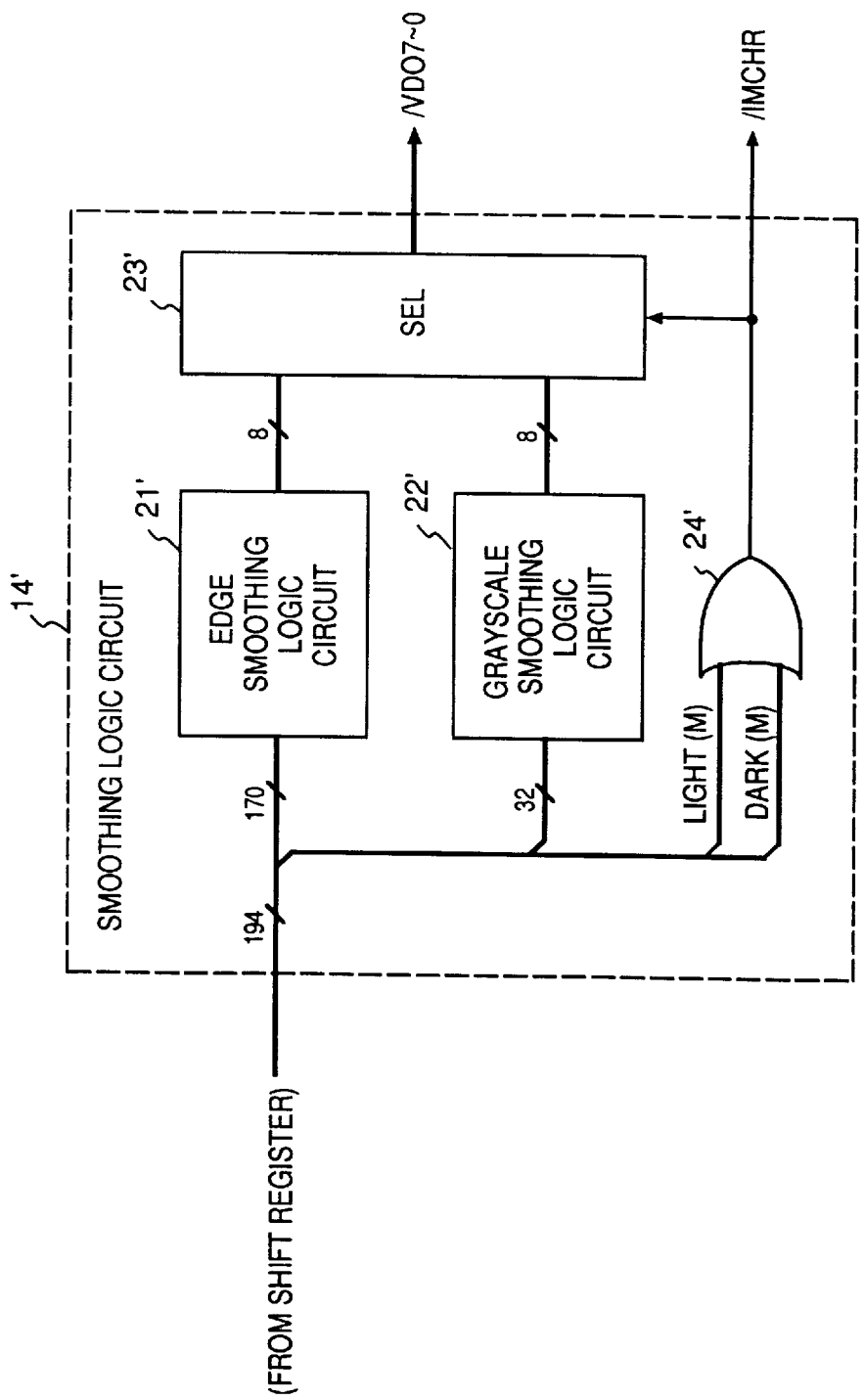

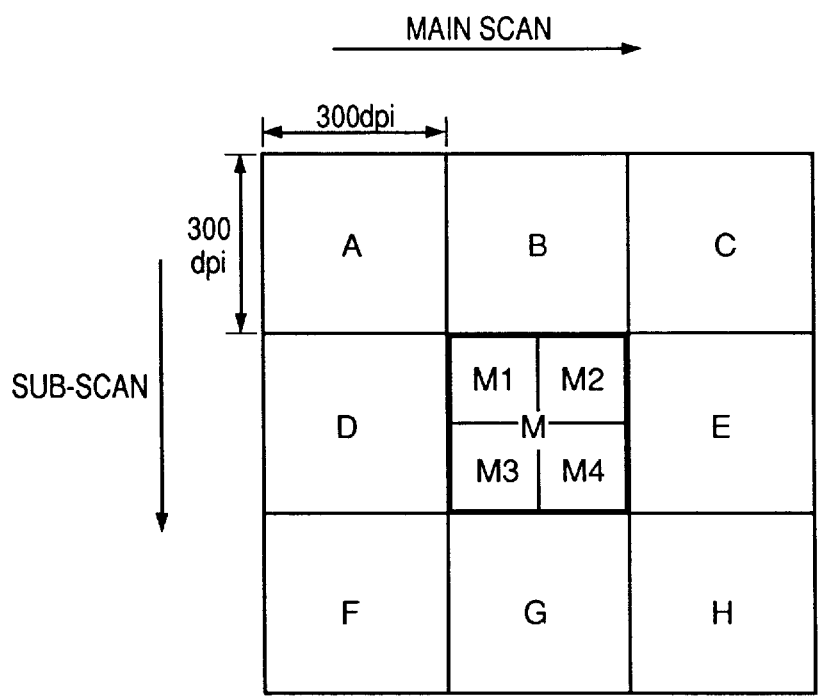

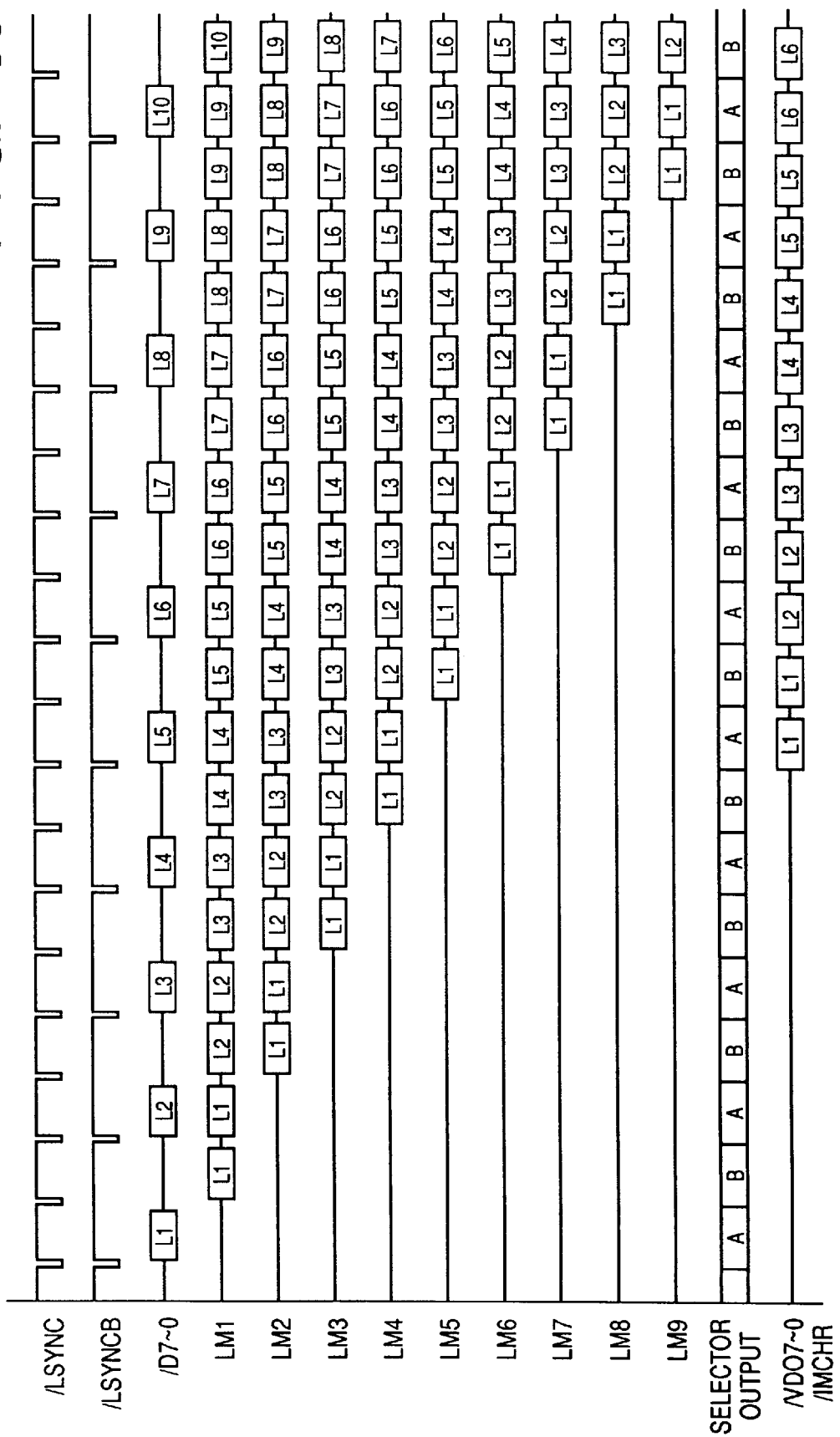

IMAGE FORMING APPARATUS AND METHOD

This application is a continuation of application Ser. No. 08/252,429 filed Jun. 1, 1994, now abandoned.

BACKGROUND OF THE INVENTION

This invention relates to an image forming apparatus and method for forming/recording an image while maintaining the quality of a picture by converting resolution of image data.

Printers have recently been given a color printing capability and have come to be utilized by users and means for producing a variety of expressions. In particular, color page printers using electrophotography have become the focus of attention owing to their high-quality printing and high-speed printing capabilities.

A full-color, laser-beam printer, which is one type of color page printer, records a multiple-value colored image by a first process which involves performing a first development by causing a beam to scan a photosensitive drum in a main-scan direction, and then transferring the image to a recording medium such as recording paper on a transfer carrier, and by successive second, third and fourth processes that follow the first process.

An electrophotographic color-laser beam printer is known in which a color image is obtained generally by these four processes using Y (yellow), M (magenta), C (cyan) and K (black) color toners. Recent years have seen the practical application of printers in which halftone image data is received from a host computer as multiple-value information-signal data composed of, say, eight bits per pixel, without the data being binarized as by dithering. These printers output each pixel by printing it in multivalued form. Printers having a printing resolution on the order of 300 dpi (dots per inch), 600 dpi, etc., have been developed and manufactured.

FIG. 46 is a block diagram illustrating the construction of a color laser-beam printer according to the prior art. As shown in FIG. 46, a host computer 201p connected to a printer 202p sends image information, which has been created by application software or the like, in the form of a command or data to a controller 203p within the printer 202p via an interface (not shown).

While expanding the entered command or data to multiple-value (e.g., eight bits) bit data corresponding to pixels of 600 dpi in conformity with the command or data, the controller 203p sequentially plants the data as 600 dpi multivalued data in a buffer memory 108p and stores one page of data. In dependence upon the process timing of a printer engine 207p having a resolution of 600 dpi, the controller sequentially sends a 600 dpi multiple-value image signal to the printer engine to drive the engine in conformity with the image signal, thereby obtaining a color image.

In recent years, information storage devices, such as laser-beam printers, employing electrophotography have come to be used widely as output devices for computers. Owing to the advantages of high printing quality, silence and high speed, these information storage devices have led to rapid growth in the field of desktop publishing (DTP).

Furthermore, electrophotographic color printers have also been developed. Owing to improvements in the capabilities of components such as a controller, which is the image generating unit in a host computer or printer, these color printers handle not only monochromatic printing but also the printing of color images. These printers have been put into practical use and are gaining popularity.

Depending upon the type of color printer, several methods such as the dither method, density-pattern method and error-diffusion method are available as methods for printing a full-color image exhibiting tonality. A characterizing feature of a laser-beam printer is that resolution in the main-scan direction can be changed with comparative ease. For example, laser-beam printers employ pulse-width modulation (so-called PWM) in which grays can be expressed by changing the driving pulse width of a laser diode in dependence upon the value of image data.

In recent monochromatic page printers, the general trend has been to improve picture quality by introducing resolution improving techniques such as smoothing processing for detecting and smoothing the edges of characters and figures. In addition, high-resolution printers in which the resolution of the printer engine serving as the printing mechanism is on the order of 480 or 600 dpi have appeared on the market in place of those having a resolution of 240 or 300 dpi, which was the old standard. By incorporating the aforesaid smoothing processing technique in these high-resolution printers, printing quality has been improved remarkably in comparison with the conventional printers.

Accordingly, there is a need to improve the printing quality of color printers as well by applying resolution-improving processing to smoothen the edges of characters and figures.

In the printers mentioned above, however, the following problem arises owing to the enormous amount of information carried by the signals handled:

Specifically, image information possessing grayscale information for each and every pixel contains an extremely large quantity of information, namely (number of pixels)×(number of grayscale bits). In this case, the image information must be transferred in conformity with the process speed of the printing process employed by the printer. In addition, an operation is necessary for transforming information indicative of the entered color space to gray-level information of the colors Y (yellow), M (magenta), C (cyan) and K (black).

In order to implement this, an apparatus has been put into practical use in which the printer side is provided with a buffer memory having a capacity equal to or greater than the maximum output size. Once input image information has been stored in the buffer memory, data is transmitted to the printer engine and printed out in accordance with the timing of the printer.

In a printer of this kind, however, memory capacity is very large. Consequently, in a case where resolution is 600 dpi and a multiple-value image of eight bits per pixel is entered to print out data in size A4, the required capacity of the buffer memory is 32 megabytes for each of the colors Y, M, C, K, for a total of 128 megabytes.

This leads to problems such as a major increase in the cost and size of the apparatus. Furthermore, the processing performance of the control unit (CPU) handling the data must be improved. This also is accompanied by higher cost.

Further, in the conventional color printers mentioned above, the image data is multivalued and one picture is reproduced by superimposing images, which are composed of toners of the four colors magenta, cyan, yellow and black, produced from the multiple-value image data. This means that the smoothing processing technique employed in monochromatic printers cannot be applied as is.

Moreover, the above-mentioned conventional color printers often deal with pictorial images such as photographs.

This makes it necessary to distinguish between these pictorial images and images such as characters and figures for the sake of processing.

An object of the present invention is to provide an image forming apparatus and method in which memory capacity can be reduced by a wide margin, while a high picture quality is maintained, even when a resolution conversion is performed so as to raise the resolution of image data.

Another object of the present invention is to provide an image forming apparatus and method in which image conversion logic that differs depending upon the characterizing features of an image is applied to effect a conversion of resolution so that a smooth-edged image can be obtained.

SUMMARY OF THE INVENTION

In order attain the foregoing objects, the present invention provides an image forming apparatus for obtaining an image on recording paper by forming a latent image of image data, which has been entered from an external unit, on a photosensitive body and developing the latent image, comprising means for discriminating two-value image data and multiple-value image data contained in the image data, compressing/decompressing means for applying compression/decompression processing to image data after discrimination, means for generating first bit information having a first resolution from image data obtained by decompression by the compressing/decompressing means, and resolution converting means for converting the resolution of the first bit information to obtain second bit information, which has a second resolution whose resolution is higher than the first resolution, by applying conversion processing of one type for the two-value image data and conversion processing of a different type for the multiple-value image data, wherein image formation and recording are performed based upon the second bit information.

The arrangement described above functions in such a manner that printing is carried out at a high resolution in a state in which sharpness and smoothness of image contours are maintained as well as the smoothness of the grayscale in halftone portions of the image.

The present invention also provides an image forming apparatus for obtaining an image on recording paper by forming a latent image of image data, which has been entered from an external unit, on a photosensitive body and developing the latent image, comprising means for generating prescribed color image data based upon the image data, compressing/decompressing means for applying compression/decompression processing to the color image data, means for converting the color image data after decompression processing to field-sequential image data corresponding to developers of a plurality of colors, detecting means for detecting characterizing features of the image data based upon a specific pixel of the field-sequential data and prescribed pixels peripheral to the specific pixel, means for altering a data value of the specific pixel based upon the characterizing features, and resolution converting means for converting the resolution of the image data by incorporating the altered pixel, wherein image formation and recording are performed based upon image data after the resolution conversion.

The arrangement described above functions in such a manner that a resolution conversion that differs depending upon the characterizing features of an image is executed to obtain a smooth-edged image.

Furthermore, the present invention provides an image forming apparatus for obtaining an image on recording paper by forming a latent image of image data, which has been entered from an external unit, on a photosensitive body and developing the latent image, comprising compressing/decompressing means for applying compression/decompression processing to color image data corresponding to the image data, first image processing means for applying a first resolution conversion to color image data after decompression processing, second image processing means for applying a second resolution conversion, which differs from the first resolution conversion, to the color image data after decompression processing, and means for selectively executing the first resolution conversion and the second resolution conversion in accordance with prescribed conditions.

The arrangement described above functions in such a manner that different resolution conversions are executed selectively to obtain high-quality printing and images having smoother edges.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 32 is a diagram for describing the conversion of image data representing a pixel M of interest performed by a smoothing logic circuit according to the second embodiment;

FIG. 33 is a block diagram illustrating the general construction of the smoothing logic circuit according to the second embodiment;

FIG. 36 is a diagram for describing data conversion in grayscale smoothing processing according to the second embodiment;

FIG. 38 is a timing chart showing processing timing in a smoothing processor;

DESCRIPTION OF THE PREFERRED EMBODIMENTS

Preferred embodiments of the present invention will now be described in detail with reference to the accompanying drawings.

[First Embodiment]

Figure 1:
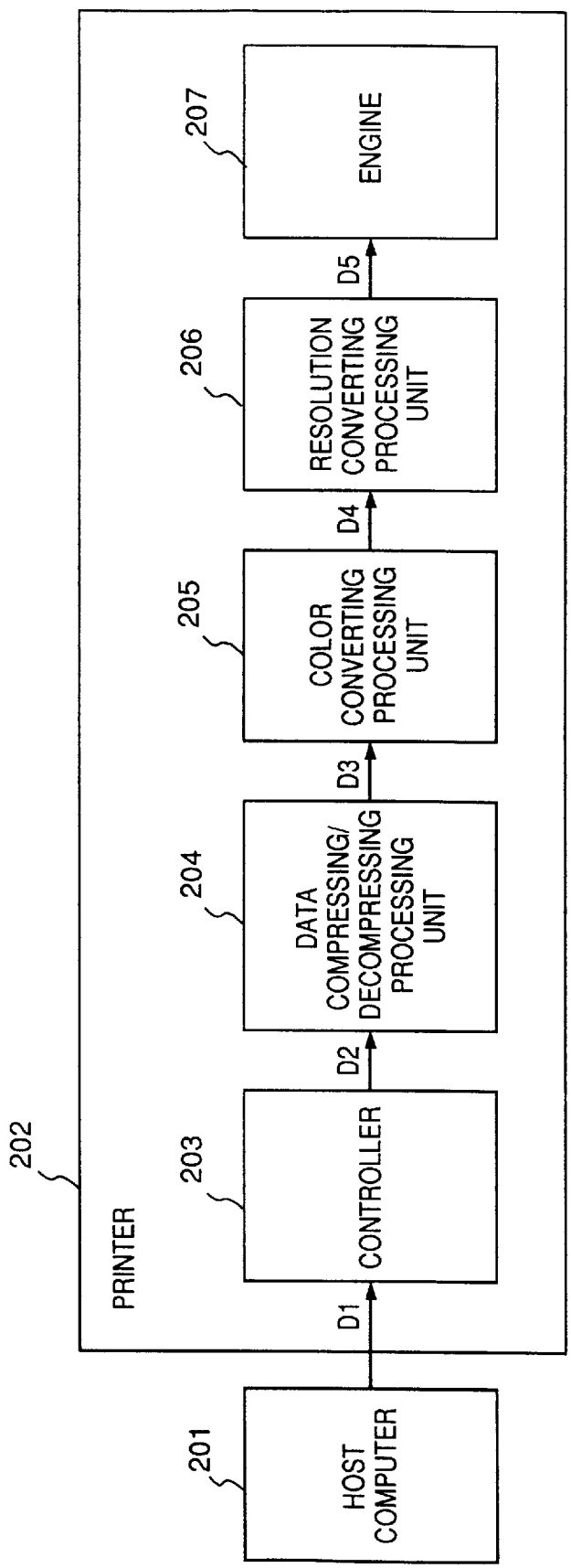
FIG. 1 is a block diagram illustrating the construction of a color-image forming apparatus according to a first embodiment of the present invention.

FIG. 1 is a block diagram illustrating the construction of a color laser-beam printer (hereinafter referred to simply as a "printer") according to a first embodiment of the present invention. As shown in FIG. 1, a host computer 201 connected to a printer 202 sends image information, which has been created by application software or the like, in the form of a command or data D1 to a controller 203 within the printer 202 via an interface (not shown). The controller 203 expands the command or data to RGB multiple-value bit data D2 (eight bits, for example) corresponding to pixels of 300 dpi in conformity with the command or data.

The bit data D2 outputted by the controller 203 is sent to a data compressing/decompressing processing unit 204, where the data is compressed and stored in memory as one page of RGB multiple-value bit data. The data compressing/decompressing processing unit 204 successively outputs decompressed RGB multiple-value bit data D3 of 300 dpi from this memory in conformity with the process timing of an engine 207.

The aforesaid 300 dpi RGB bit data enters a color converting processing unit 205, which color-converts the entering 300 dpi RGB multiple-value bit data to YMCK multiple-value bit data D4. The YMCK multiple-value bit data D4 is then resolution-converted to 600 dpi multiple-value bit data by a resolution converting processing unit 206, which is the next stage, and this data is outputted to the engine 207 as bit data D5.

The bit data D5 is subjected to pulse-width modulation conforming to the data by means of the engine 207, and a laser is driven by the modulated data so as to obtain a color image.

Figure 2:
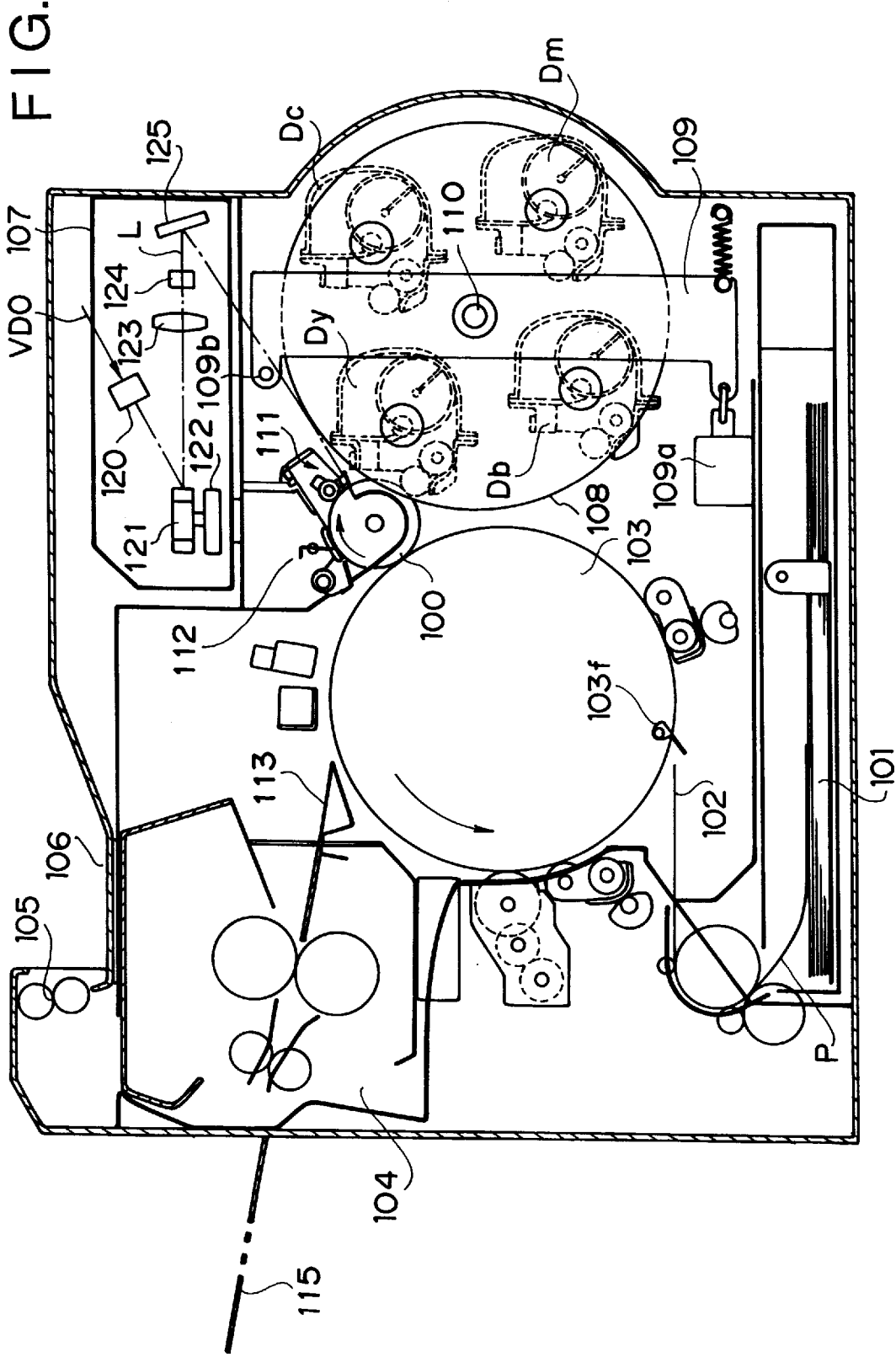
FIG. 2 is a diagram showing the cross-sectional configuration of the color-image forming apparatus according to the first embodiment.

FIG. 2 is a diagram showing the cross-sectional configuration of a color laser-beam printer, which performs eight-bit multiple-value recording, capable of printing on size A4 paper at a resolution of 600 dpi. In FIG. 2, paper 102 fed from a paper feeder 101 is retained on the outer circumference of a transfer drum 103 while its leading edge is held by a gripper 103f.

Latent images for respective colors formed on an image carrier 100 by an optical unit 107 are developed by respective color developing devices Dy, Dc, Dm, Db and are transferred a plurality of times to the paper situated on the outer circumference of the transfer drum 103, thereby forming a multicolored picture. The paper 102 is then separated from the transfer drum 103, fixed by a fixing unit 104 and ejected into a paper-discharge tray 106 from a paper ejecting unit 105.

Each color developing device has rotational support shafts on both its sides and is held by a developing-device selecting mechanism 108 in such a manner that each is capable of rotating about its support shafts. Each developing device is revolved for selection purposes in such a manner that the attitude thereof is held constant all times. After the selected developing device has been moved to a developing position, the selecting mechanism 108 employs a solenoid 109a to move a selecting-mechanism support frame 109 together with the developing devices in the direction of the image carrier 100 about a pivot point 109.

The operation of this color-laser printer having the foregoing construction will now be described in detail.

First, the photosensitive drum 100 is charged uniformly to a prescribed polarity by a corona discharge device 111 and a first latent image for magenta, for example, is formed on the photosensitive drum by being exposed to a laser beam L. Next, by applying a requisite developing bias voltage solely to the magenta developing device Dm, the magenta latent image is developed so that a first toner image for magenta is formed on the photosensitive drum 100.

Meanwhile, transfer paper P is supplied at a prescribed timing. Just before the leading edge of the paper P reaches a transfer starting position, a transfer biasing voltage (+1.8 KV) whose polarity (positive in this example) is opposite that of the toner is applied to the transfer drum 103. The first toner image on the photosensitive drum 100 is transferred to the transfer paper P and the latter is electrostatically attracted to the surface of the transfer drum 103. Residual magenta toner is subsequently cleaned off the photosensitive drum 100 by a cleaner 112 to prepare for the latent image formation and development of the next color.

Next, a second latent image for the color cyan is formed on the photosensitive drum 100 by exposure to the laser beam L, and the second latent image is developed on the photosensitive drum 100 by the cyan developing device Dc so as to form a second toner image. The second toner image in the color cyan is transferred to the transfer paper P upon being made to coincide with the position of the magenta first toner image transferred to the transfer paper P earlier. In the transfer of the toner image of the second color, a biasing voltage of +2.1 KV is impressed upon the transfer drum 103 just before the transfer paper P arrives at the transfer unit.

Similarly, third and fourth toner images in the colors yellow and black are successively formed on the photosensitive drum 100 and developed by the developing devices Dy, Db, respectively. The third and fourth toner images in the colors yellow and black, respectively, are then successively transferred to the transfer paper P upon being made to coincide with the position of the toner images transferred to the transfer paper P earlier. As a result, a picture is formed in a state in which the toner images of the four colors overlap one another on the transfer paper P.

In the transfers of the toner images in the third and fourth colors mentioned above, a biasing voltage of +2.5~+3.0 KV is impressed upon the transfer drum 103 just before the transfer paper P arrives at the transfer unit. The reason for raising the transfer biasing voltage whenever transfer of the toner image of each color is carried out is to prevent a decline in transfer efficiency.

The prime cause of a decline in transfer efficiency is as follows: When the transfer paper is separated from the photosensitive drum 100 after the transfer, the surface of the transfer paper is charged to a polarity opposite that of the transfer biasing voltage by a gaseous discharge (the surface of the transfer drum carrying the transfer paper also is charged slightly). As a consequence, the charge builds up with each transfer. If the transfer biasing voltage were held constant, the electric field for achieving the transfer would decline with each transfer.

In the transfer of the fourth color described above, a DC biasing voltage of +3.0 KV of the same polarity and the same potential as those of the transfer biasing voltage applied at the time of the transfer of the fourth toner image is superimposed upon an AC voltage of 5.5 KV (this is the effective value, with the frequency being 500 Hz) when (inclusive of immediately before or immediately after) the leading edge of the transfer paper reaches the transfer starting position. The resulting voltage is applied to the corona discharge device 111.

The reason for actuating the corona discharge device 111 when the leading edge of the transfer paper reaches the transfer starting position in the transfer of the fourth color is to prevent irregular transfer. In the transfer of a full-color image in particular, the occurrence of even a slightly uneven transfer results in a readily conspicuous difference in color. Accordingly, it is necessary to perform the aforesaid discharging operation by applying the prescribed biasing voltage to the corona discharge device 111.

When the leading edge of the transfer paper P to which the toner images of the four colors have been transferred draws near the separation position, a separating member 113 approaches and its distal end contacts the surface of the transfer drum 103 so that the transfer paper P is separated from the transfer drum 103. The distal end of the separating member 113 remains in contact with the surface of the transfer drum 103 until the trailing edge of the transfer paper P departs from the transfer drum 103. The separating member 113 returns to its original position after leaving the transfer drum 103.

Further, the corona discharge device 111, which operates from the moment the leading edge of the transfer paper arrives at the transfer starting position for the final color to the moment the trailing edge of the transfer paper departs from the transfer drum 103, as set forth above, removes the accumulated electric charge (the polarity of which is opposite that of the toners) on the transfer paper. This facilitates the separation of the transfer paper by the separating member 113 and reduces the gaseous discharge at the time of separation.

When the trailing edge of the transfer paper arrives at the transfer end point (the exit of a nipping portion formed by the photosensitive drum 100 and transfer drum 103), the transfer biasing voltage applied to the transfer drum 103 is turned off (placed at ground potential). The biasing voltage being impressed upon the corona discharge device 111 is turned off at the same time.

Finally, the transfer paper P that has been separated from the transfer drum 103 is conveyed to the fixing unit 104, where the toner images on the transfer paper are fixed. The transfer paper is then discharged into the discharge tray 115.

The operation of a laser-beam scanning device according to this embodiment will now be described.

The optical unit 107 in FIG. 2 is composed of a semiconductor laser 120, a polygon mirror 121, a scanner motor 122, a lens 123 and a mirror 125. In synchronization with feed of the recording paper P, an image signal VDO for one page is outputted to the semiconductor laser 120. The laser beam L modulated by the image signal VDO is projected toward the polygon mirror 121 rotated by the scanner motor 122.

The laser beam L emitted by the semiconductor laser 120 is introduced to the photosensitive drum 100 by the lens 123 and mirror 125. When the laser beam is emitted, the beam is detected by a detector (not shown) disposed on the scanning axis, and a beam detection signal BD serving as a horizontal synchronizing signal is outputted. As a result, the photosensitive drum 100 is scanned and exposed by the laser beam L in synchronization with the BD signal to form an electrostatic latent image.

Figure 3:
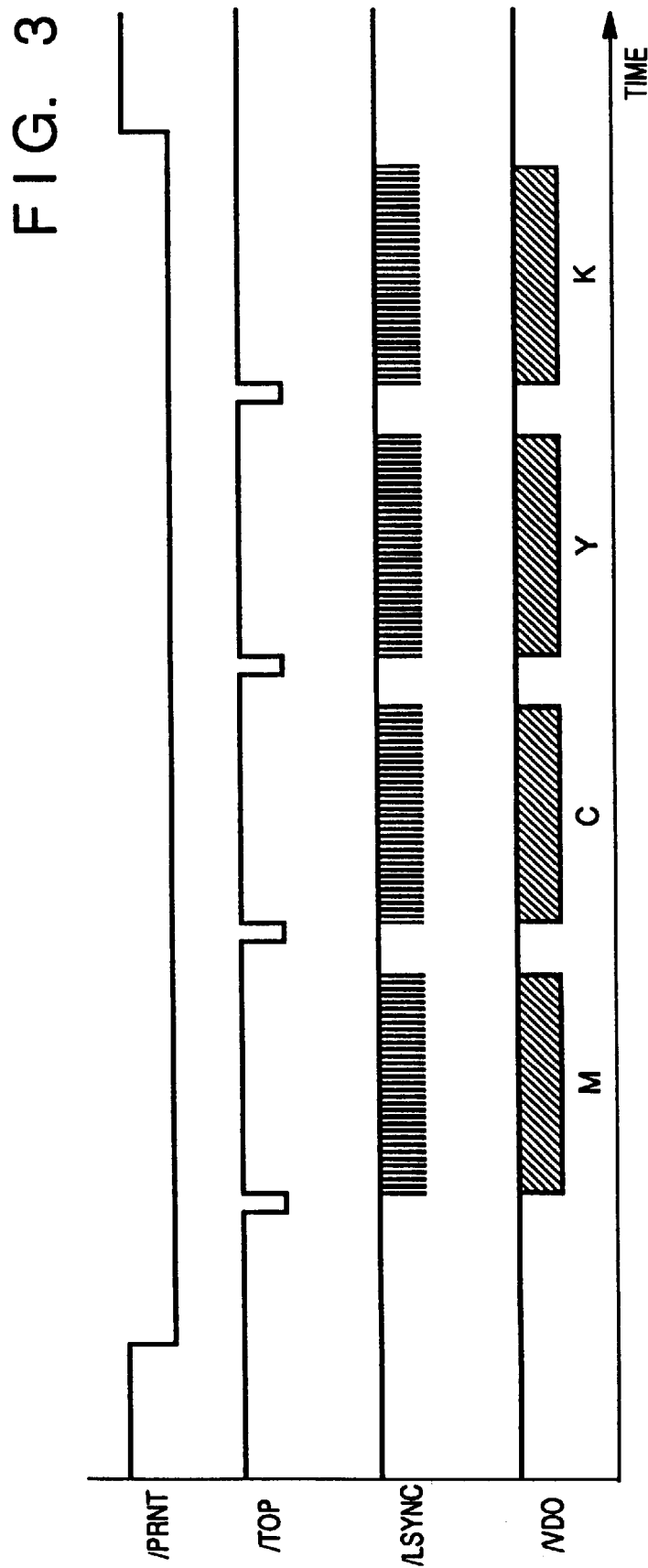
FIG. 3 is a timing chart of image recording in the first embodiment.

FIG. 3 is a timing chart showing the timing at which image data is transmitted in the present embodiment. In FIG. 3, a /PRNT signal is outputted by the controller 203 and serves as a signal which instructs the engine 207 to perform a printing operation. A /TOP signal is a sub-scan direction synchronizing signal sent from the engine 207 to the controller 203 in response to the /PRINT signal. As shown in FIG. 3, the signal is composed of four pulses outputted in conformity with processing timing corresponding to the M (magenta), C (cyan), Y (yellow) and K (black) toners in one page of color recording.

/LSYNC is a main-scan direction synchronizing signal generated as a signal corresponding to the BD signal produced by the engine 107. This signal is outputted to the data compressing/decompressing processing unit 204. A /VDO signal is decompressed by the data compressing/decompressing processing unit 204 in synchronization with the /LSYNC signal and is subjected to a color conversion by the color converting unit 205.

The above-mentioned /VDO signal is a 600 dpi multiple-value (eight bits) image signal that has been subjected to a resolution conversion by the resolution converting unit 206. An M (magenta) VDO signal is outputted in response to the first /TOP signal among the four-pulse /TOP signals, a C (cyan) /VDO signal in response to the second /TOP signal, a Y (yellow) /VDO signal in response to the third /TOP signal, and a K (black) /VDO signal in response to the fourth /TOP signal.

The data compressing/decompressing processing unit 204 shown in FIG. 1 will now be described in detail.

Figure 4:
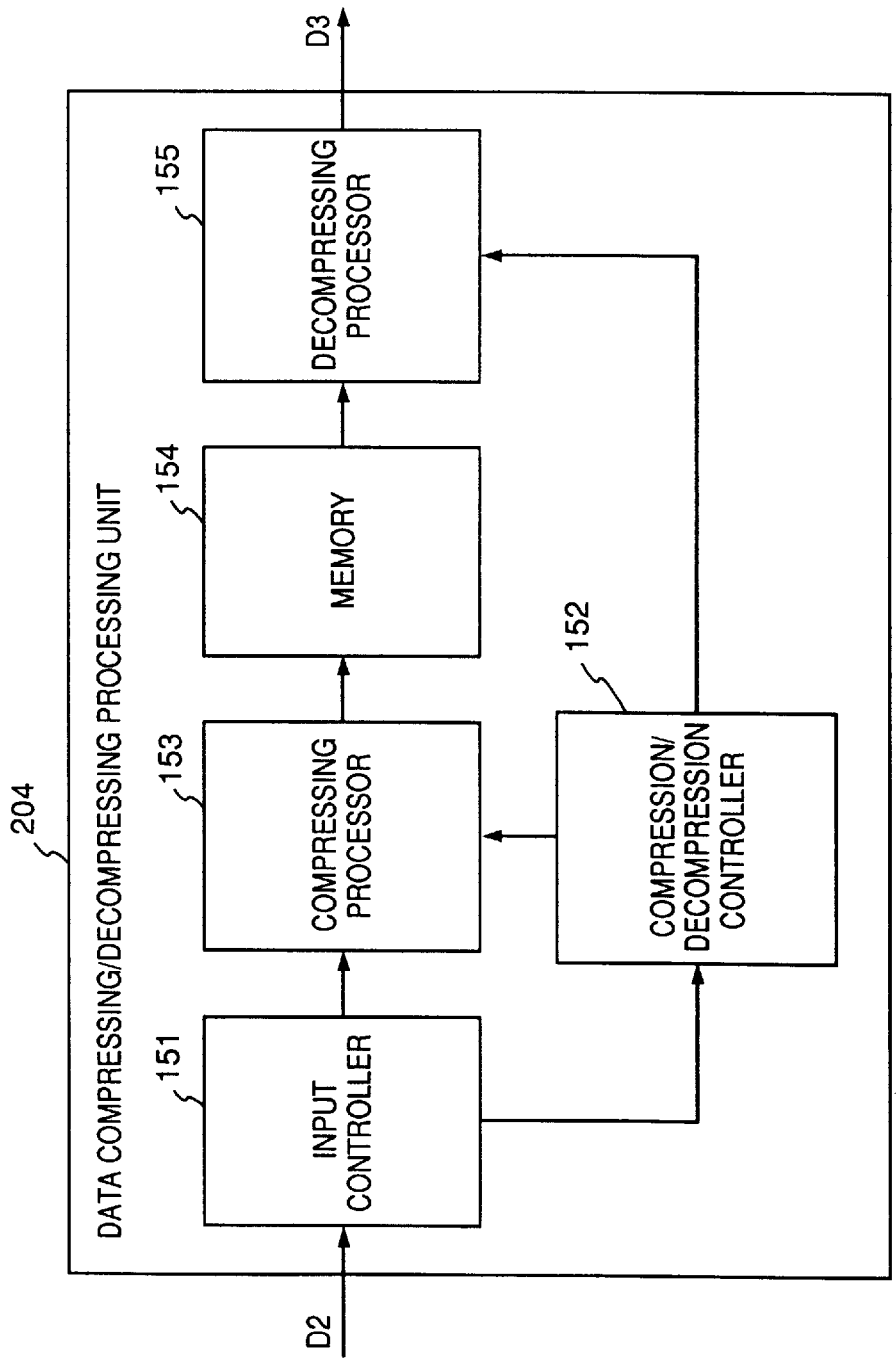
FIG. 4 is a block diagram illustrating a data compressing/decompressing processing unit according to the first embodiment.

FIG. 4 is a block diagram illustrating the data compressing/decompressing processing unit 204. As shown in FIG. 4, an input controller 151 is supplied with an input of the data D2 that is the result of expanding the RGB data, which has been created by application software or the like in the controller 203 of FIG. 1 mounting an interpreter of page description language such as PCL language or postscript language, into the 300 dpi eight-bit multiple-value bit data. The data compressing/decompressing processing unit 204 sends this data to a compressing processor 153.

A compression/decompression controller 152 receives information representing image size with respect to a resolution of 300 dpi from the input controller 151, sets a target compression rate and controls compression processing. The compressing processor 153 which is a well-known encoding block, inputs the RGB image information of 300 dpi resolution from the input controller 151. The compressing processor 153 encodes the image information upon reducing redundancy possessed by the image. A memory 154 stores the encoded and compressed image data of 300 dpi resolution from the compressing processor 153.

It goes without saying that the memory 154 has a capacity, e.g., 2.7 megabytes, smaller than that for the maximum size of an image in the printer of this embodiment.

A decompressing processor 155 receives information such as the target compression rate and amount of allocated code of each block, which are factors used in control, from the compression/decompression controller 152, extracts a code from the memory 154, and decodes the same in accordance with the timing of the printer engine, thereby producing the decompressed RGB image data D3 having a resolution of 300 dpi.

Figure 5:
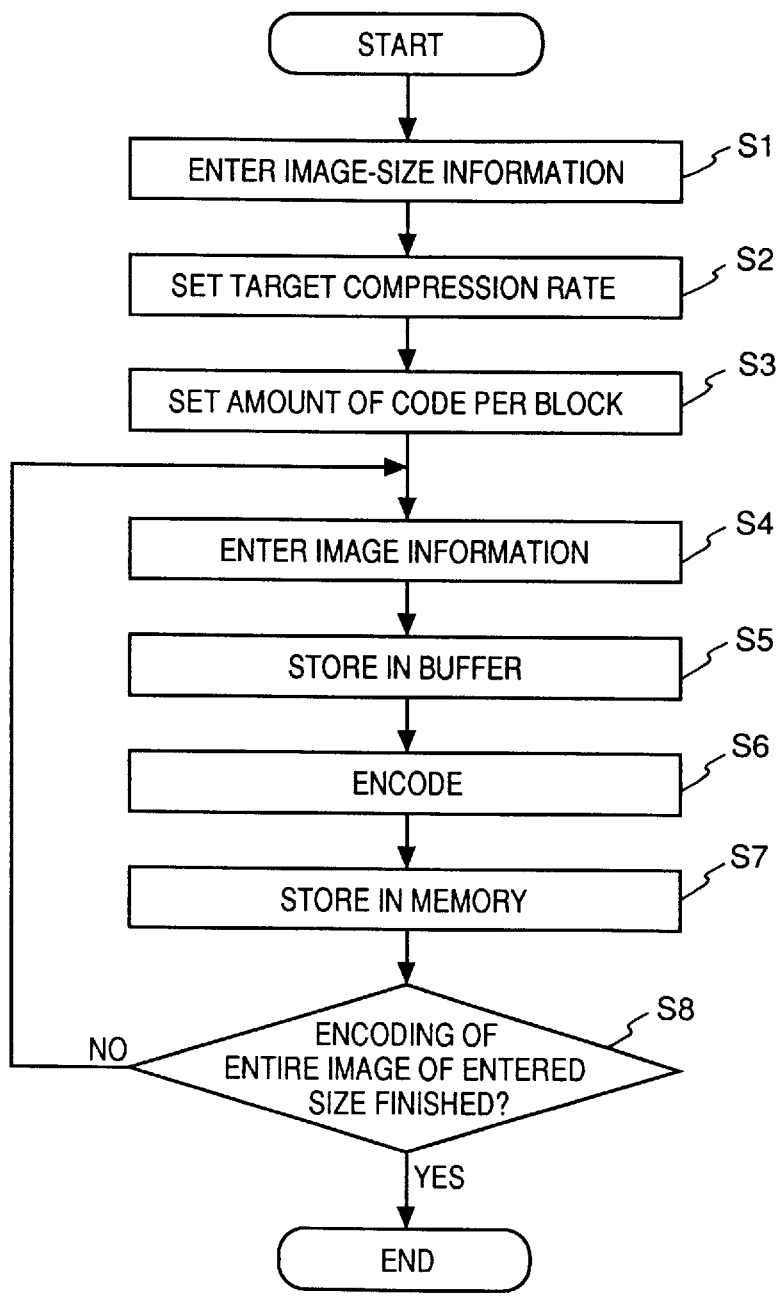
FIG. 5 is a flowchart showing the processing procedure in the data compressing/decompressing processing unit.

FIG. 5 is a flowchart illustrating the operating procedure, from data input to storage in memory, in the data compressing/decompressing processing unit shown in FIG. 4. Step S1 in the flowchart of FIG. 5 calls for entry of image-size information. Specifically, this is a processing step in which the compression/decompression controller 152 receives information from the input controller 151.

In a case where the image domain is rectangular, the image-size information is received from the connected host computer in a "horizontal pixel number", "vertical pixel number" format or in an "area of image domain" format. In either case, header information is received before the image information.

Next, the target compression rate is set by the compression/decompression controller 152 at step S2. The target compression rate is set in order to compress the entered size image information efficiently to the full memory capacity possessed by the printer. For example, the target compression rate is set to C/B, where A represents memory capacity for the maximum image size of the printer, B the memory capacity possessed by the printer and C the memory capacity for the entered image size.

The amount of code allocated per block is set at step S3. This will be described with regard to a system in which compression is performed by dividing an image into blocks and utilizing an orthogonal transformation or the like within each block.

If an image domain is partitioned into X-number of blocks by dividing an input image into blocks, fixed-length encoding is carried out to obtain a code which is B/X of each block. The value of X is not a fixed value of the number of blocks of the maximum image size but varies in dependence upon the entered image size. This means that the amount of code of B/X of each block also varies.

Depending upon the decided amount of code per block, quantization conditions such as the number of bits allocated for quantization with respect to each component of the orthogonal transformation coefficients in the block are selected. This information is sent from the compression/decompression controller 152 to the compressing processor 153 and decompressing processor 155. This is followed by steps S4, S5, at which the compressing processor 153 enters part of the image information and stores in a buffer. Encoding is then performed at step S6 in accordance with quantizing conditions set by the compression/decompression controller 152, and the code generated is stored in the memory 154 at step S7.

It is determined at step S8 whether the encoding of the entire image of the entered size is finished. If the result of the determination is "NO", then the processing from steps S4 to S7 is repeated. Thus, image information, the amount of which is for the entered image size, is stored in an internal memory of the printer.

At the time of decompression, the decompressing processor 155 performs decoding in synchronization with the timing of the printer engine on the basis of the information indicative of quantizing conditions from the compressing processor 153. Now the demodulated RGB image signal of 300 dpi is outputted. That is, as illustrated in the timing chart of FIG. 3, the RGB signal D3 for the same page is outputted to the color converting processing unit 205 four times in conformity with the /TOP signal corresponding to each of the colors M, C, Y, K.

By performing compression and decompression in this manner, it is possible generally to reduce memory capacity by approximately half without a major deterioration in the image.

In this embodiment, an example is described in which both character/figure data and data indicative of a natural picture are compressed at the same compression ratio. However, an arrangement may be adopted in which use is made of a method for attaining a higher compression ratio while maintaining a better picture quality. For example, the character/figure data and data indicative of a natural picture may be discriminated and separated from each other before compression. The character/figure data is then subjected to a compression method that produces no image deterioration or very little image deterioration. The data indicative of the natural picture, on the other hand, is subjected to a compression method through which a higher compression ratio is capable of being achieved even if some deterioration in the image results. The data resulting from these two types of decompression may then be stored in memory. At the time of decompression, these two types of data may be combined after demodulation.

Figure 6:
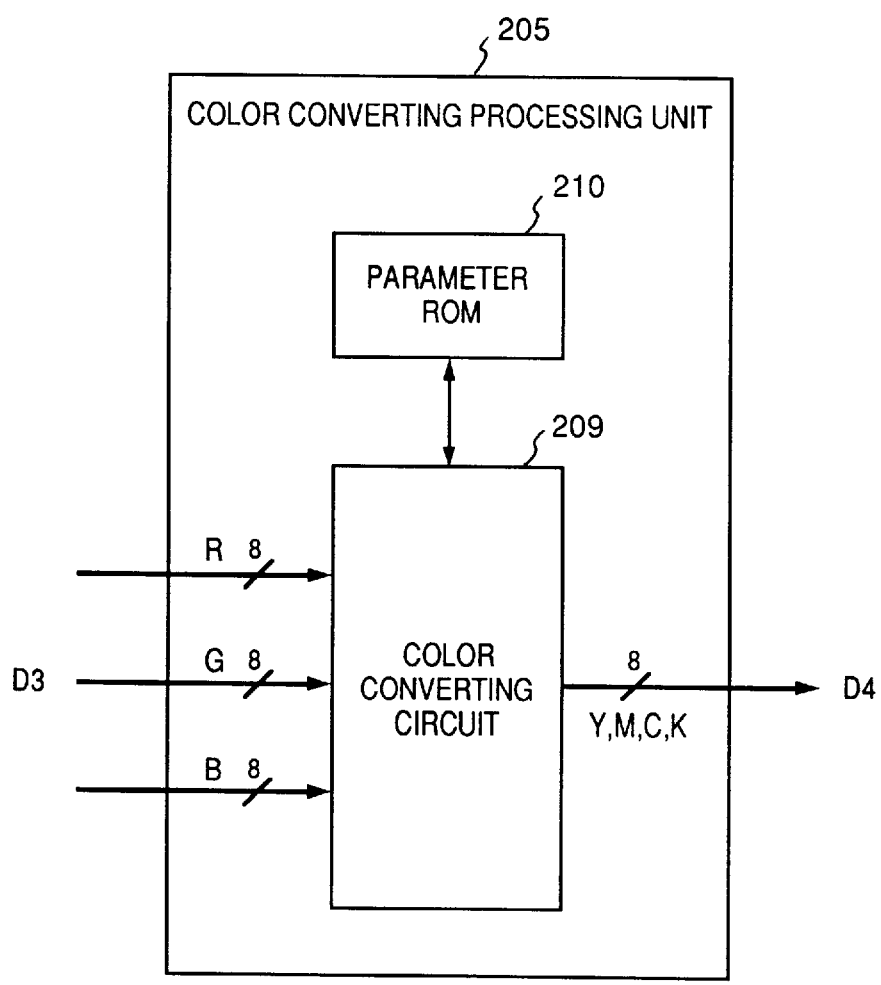
FIG. 6 is a block diagram of a color converting processing unit according to the first embodiment.

FIG. 6 is a block diagram of the color converting processing unit 205 according to this embodiment. As shown in FIG. 6, the 300 dpi image signal D3 (eight-bit data for each of the colors R, G, B) enters a color converting circuit 209. The latter receives an input of parameters from a parameter ROM 210 and produces an eight-bit M signal, which corresponds to the first pulse of the aforementioned /TOP signal, by an operation or by a look-up table conversion.

Further, the color converting circuit 209 produces an eight-bit C signal corresponding to the second pulse of the /TOP signal, an eight-bit Y signal corresponding to the third pulse of the /TOP signal and an eight-bit K signal corresponding to the fourth pulse of the /TOP signal. Masking processing and undercolor removal (UCR) are executed in this process in conformity with the color reproduction characteristic of the engine to carry out color conversion. The 300 dpi YMCK signal D4 composed of these signals is sent to the resolution converting processing unit 206.

Figure 16:
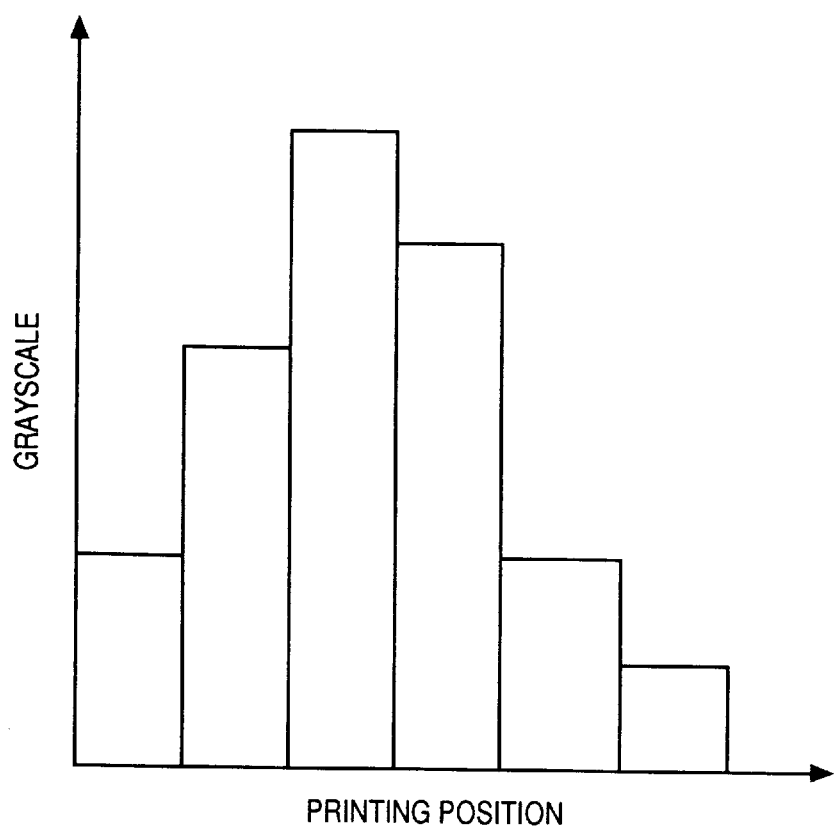
FIG. 16 is a diagram showing the relationship between printing position on one line and grayscale at a printing density of 300 dpi.

FIG. 16 illustrates the relationship between printing position on one line and change in grayscale at a printing density of 300 dpi. When image data of the kind shown in FIG. 16 is printed as is by a printer engine having a resolution of 600 dpi, the size of the image in both the vertical and horizontal directions is halved. Accordingly, the resolution converting processing unit 206 in this embodiment executes processing for extending the dot configuration by a factor of two both horizontally and vertically.

Figure 17:
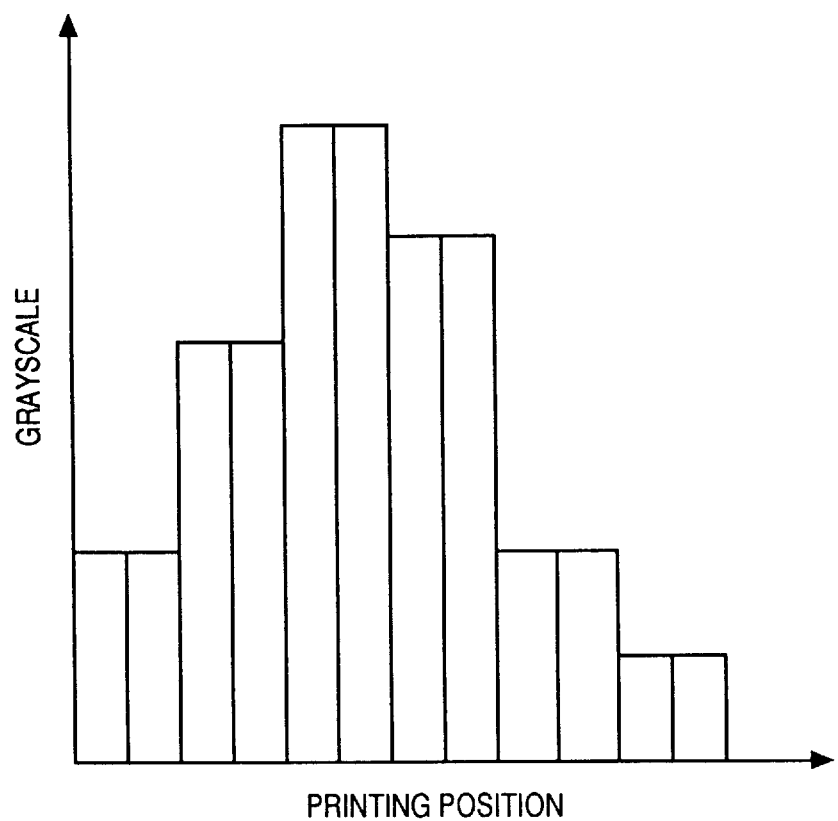
FIG. 17 is a first diagram showing the relationship between printing position on one line and grayscale at a printing density of 600 dpi.

However, in a case where processing is executed for effecting a conversion to 600 dpi image data by simply extending the dot configuration of 300 dpi image data by a factor of two both horizontally and vertically, the output image is enlarged but there is no change in picture quality (smoothness of the grayscale levels) in comparison with the 300 dpi image, as shown in FIG. 17. As a result, an engine having a resolution of 600 dpi cannot fully manifest its original capability.

Further, page information at the printing density of 300 dpi contains a mixture of halftone images, such as natural pictures, and two-value images such as characters and figures. Converting this data to image data having a printing density of 600 dpi by a single uniform algorithm does not provide the most ideal picture quality conforming to the nature of picture quality. That is, a halftone image requires reproducibility and smoothness of gray levels and a two value image requires reproducibility of outline sharpness and outline smoothness. This method does not take these requirements into consideration.

The present embodiment improves upon the foregoing difficulties. Specifically, the embodiment makes possible high-quality printing of images in which outline sharpness and smoothness are reproduced at portions where there are two-value images while smooth reproduction of grays is made feasible at portions where there are halftone images.

Figure 7:
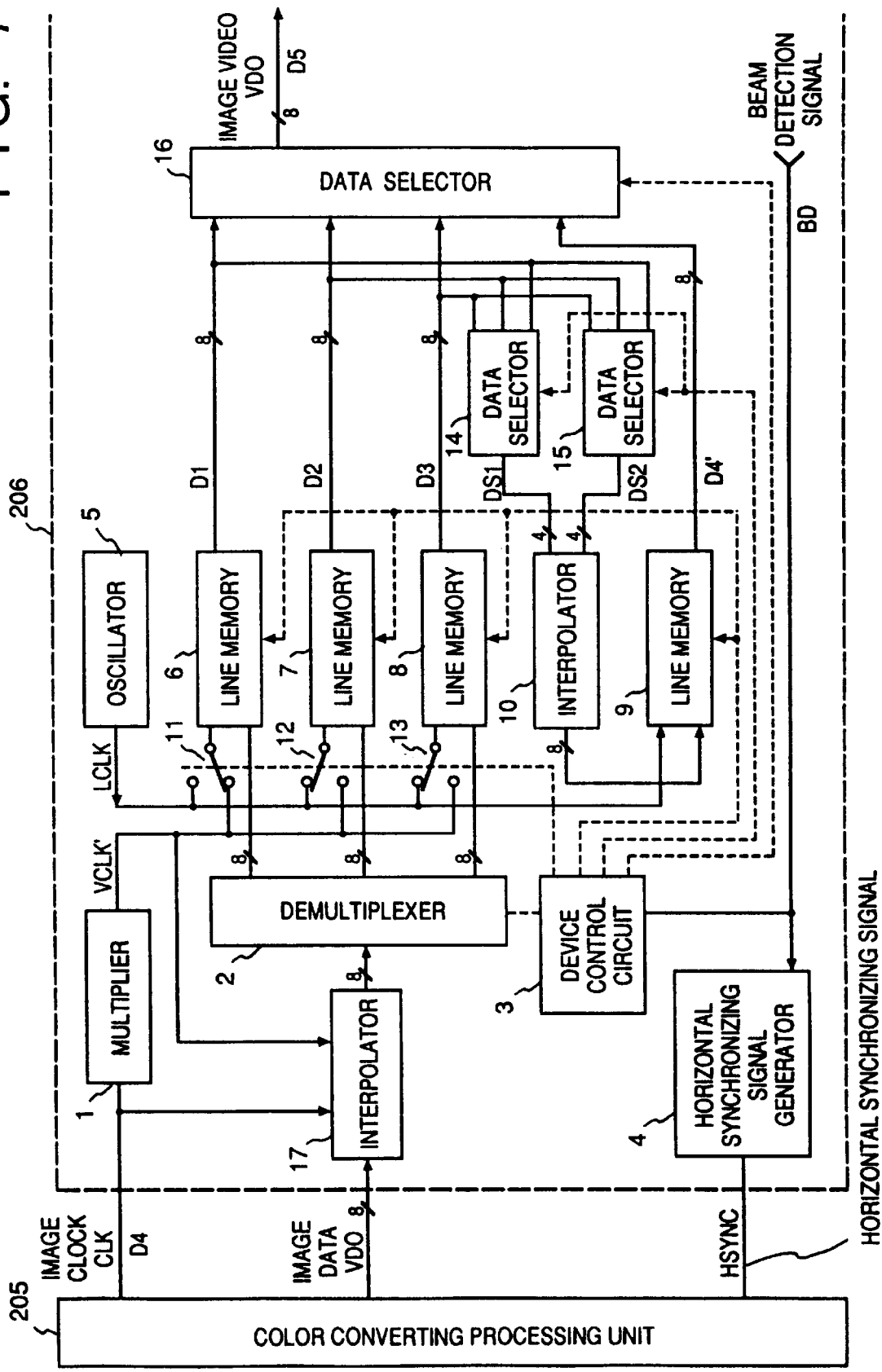
FIG. 7 is a block diagram of a resolution converting processing unit according to the first embodiment.

FIG. 7 is a block diagram of the resolution converting processing unit 206 according to this embodiment. The resolution converting unit illustrated in FIG. 7 applies interpolation processing, described below, to each of the M, C, Y, K signals sent from the color converting unit 205, namely to the eight-bit M signal transmitted in correlation with the first /TOP signal, the eight-bit C signal transmitted in correlation with the second /TOP signal, the eight-bit Y signal transmitted in correlation with the third /TOP signal and the eight-bit K signal transmitted in correlation with the fourth /TOP signal.

In FIG. 7, a horizontal synchronizing signal generating circuit 4 counts the entering beam-detection signal (BD signal) and outputs one horizontal synchronizing signal HSYNC (the synchronizing signal in the main-scan direction) whenever two BD signals are counted. The color converting processing unit 205 receives the horizontal synchronizing signal HSYNC, transmits demodulated 300 dpi, eight-bit multiple-value image data VDO (VDO0~VDO7) and an image clock signal VCLK. The resolution converting unit 206 then generates 600 dpi, eight-bit image data from the eight-bit image data VDO that has entered at 300 dpi and the image clock signal VCLK, and records this eight-bit image data.

A frequency multiplier circuit 1 multiplies the frequency of the input image clock signal VCLK to obtain a clock signal VCLK' having twice the frequency. An oscillator 5 generates a clock signal LCLK having a frequency four times that of the image clock signal VCLK. Changeover circuits 11~13 each select either the clock signal VCLK' or LCLK and supply the selected signal as a read/write clock signal to line memories 6~8 (each of which has a depth of eight bits), respectively.

An interpolating circuit 17 forms 600 dpi image data in the main-scan direction by generating and inserting interpolated data between items of the input 300 dpi image data VDO. A demultiplexer 2 distributes the image data interpolated by the interpolating circuit 17 to the line memories 6~8. The memories 6~8 each have a memory capacity of one line equivalent to 600 dpi in the main-scan direction.

A device control circuit 3 controls each block of the device repeatedly every line based upon the BD signal. More specifically, the device control circuit 3 performs control in such a manner that the image data VDO after interpolation is successively distributed to the line memories 6~8 by the demultiplexer 2 and the image data VDO is written in the line memory, which has been selected by the changeover circuits 11~13, by the clock signal VCLK'.

Image data which has already undergone writing is read out of the other two line memories, which are not currently undergoing writing, by the clock signal LCLK. This operation is performed sequentially line by line. When data is written in the line memory 6, for example, the line memories 7, 8 undergo a data read operation. When data is being written in the line memory 7, the line memories 8, 6 undergo the data read operation. The line memory 8 undergoes the data write operation on the next line, at which time the line memories 6, 7 undergo the data read operation.

Data selectors 14, 15 each select a readout signal from the line memories 6~8. For example, when the line memory 6 is written and the line memories 7, 8 are read, the data selector 14 selects the data D2 read out of the line memory 7 and outputs a series of image data DS1, and the data selector 15 selects the data D3 read out of the line memory 8 and outputs a series of image data DS2.

An interpolating circuit 10 compares one or a plurality of items of the image data DS1 with the same number of items of image data DS2 or subjects these data to a numerical operation and outputs image (interpolated) data Q obtained as the result. A line memory 9 stored one line of the image data Q. A data selector 16 selects one of the items of image data D1~D4 outputted by the line memories 6~9 and outputs this data as image data VDO'.

Figure 8:
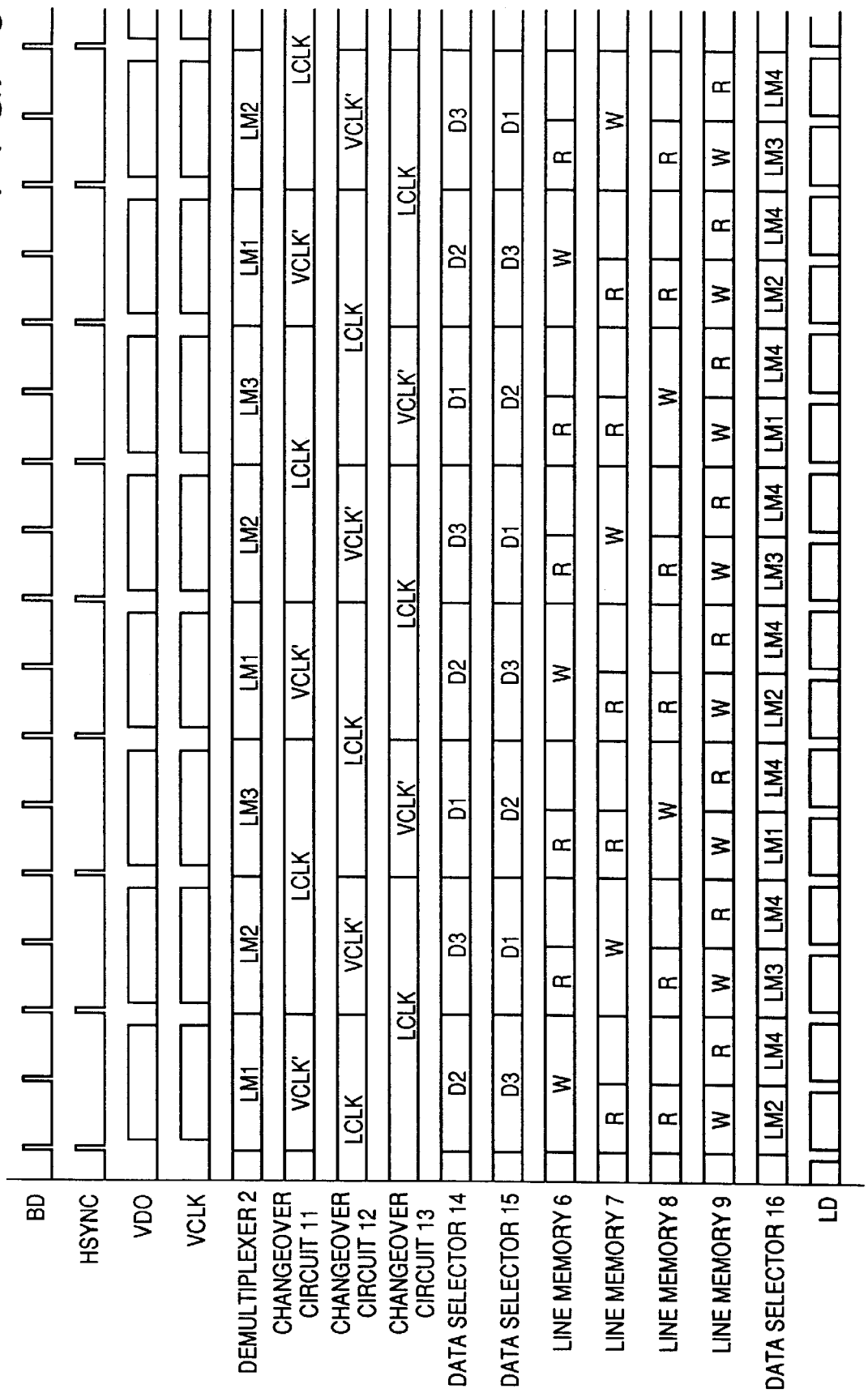
FIG. 8 is an operation timing chart of the resolution converting processing unit.

The device control circuit 3 also controls read/write of the line memories 6~8, 9 and the selection operation performed by the selections 14~16. FIG. 8 is an operation timing chart of the resolution converting processing unit 206 shown in FIG. 7.

Figure 9:
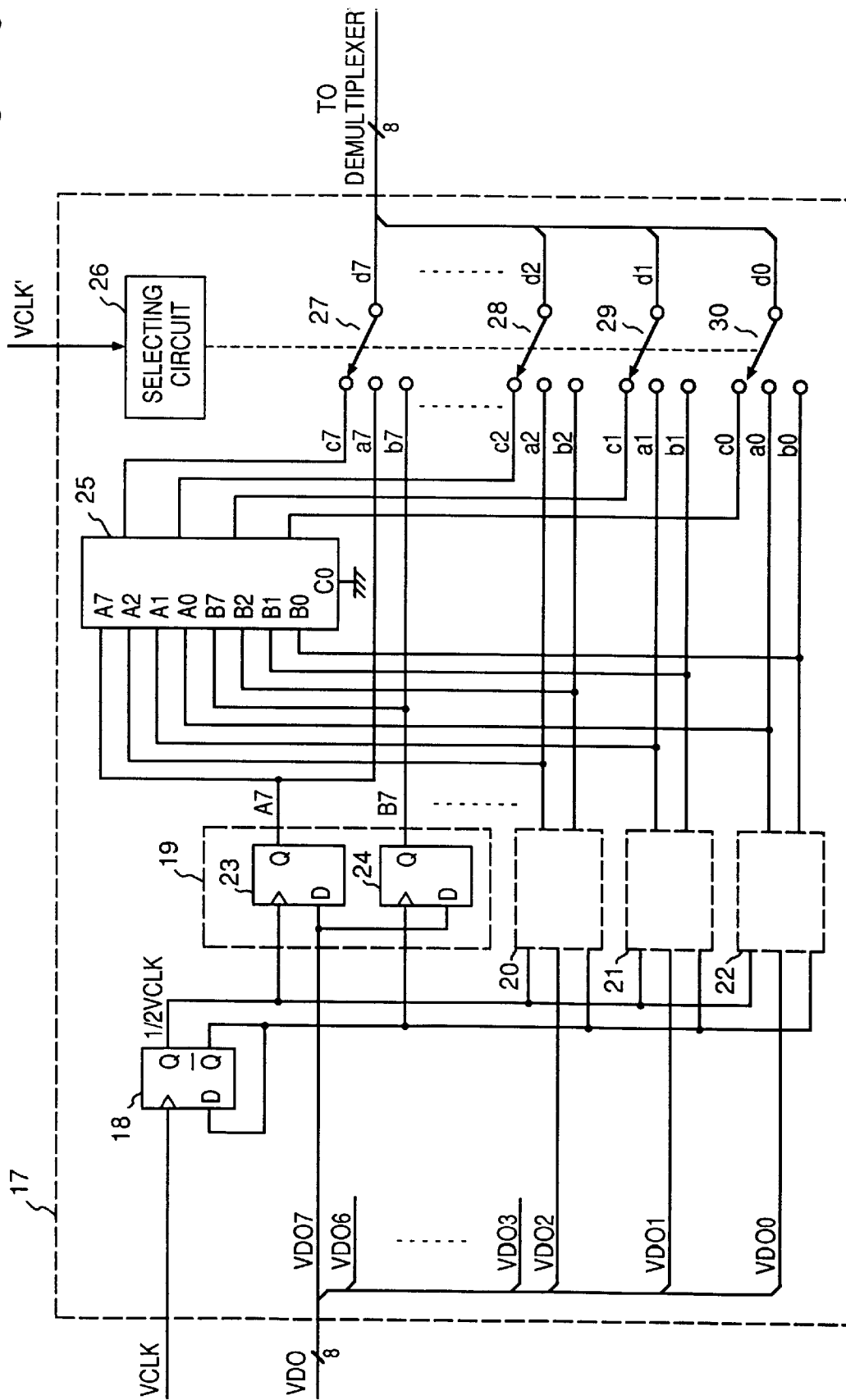
FIG. 9 is a block diagram of an interpolating circuit 17 shown constituting the resolution converting processing unit

FIG. 9 is a block diagram of the interpolating circuit 17 shown in FIG. 7. The interpolating circuit 17 in FIG. 9 subjects the image data to data interpolation in the horizontal direction.

As shown in FIG. 9, a flip-flop 18 frequency-divides the clock signal VCLK by two and outputs a clock signal ½VCLK. The most significant bit VDO7 of the image data VDO is latched alternately in latches 23 and 24 of a latch circuit 19. Similarly, each of the other bits VDO6~VDO0 of the image data also is latched alternately in two latches of respective latch circuits 20~22. As a result, image data prevailing at the present time and image data that was effective at the immediately preceding point in time are stored in the latch circuits 19~22.

A full-adder 25 sums the contents of two consecutive items of image data. From among the total of nine bits resulting from addition, the eight higher order bits are taken, whereby the value of the sum is halved so that the mean value of the two consecutive items of data is decided. Further, a selecting circuit 26 controls the changeover of switching terminals 27~30, thereby successively outputting image data which was effective at the preceding point in time, data indicative of mean values intermediate the preceding point in time and the present point in time, and image data prevailing at the present point in time.

Figure 18:
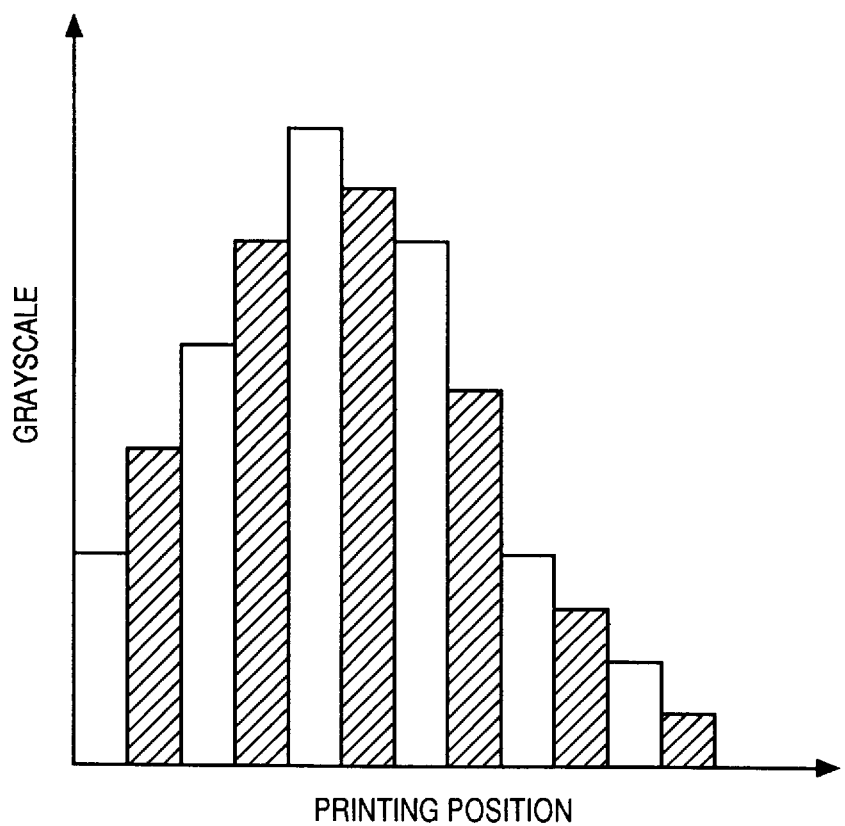
FIG. 18 is a second diagram showing the relationship between printing position on one line and grayscale at a printing density of 600 dpi.

By virtue of this operation, image data and interpolated data is allocated to areas of two dots each in the engine having the resolution of 600 dpi, and resolution in the main-scan direction also becomes 600 dpi. For example, the 300 dpi, eight-bit data shown in FIG. 16 is converted to 600 dpi, eight-bit data, as illustrated in FIG. 18. As a result, smoothing is applied to the grayscale.

Figure 10:
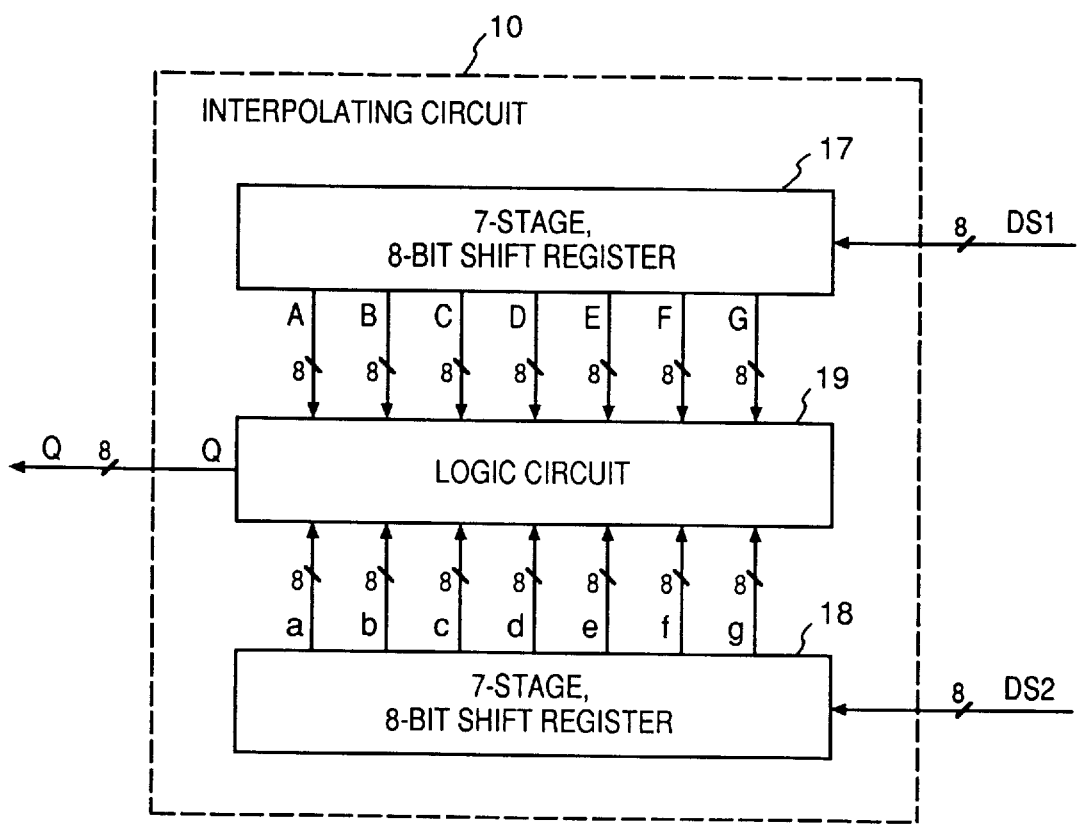
FIG. 10 is a block diagram of the interpolating circuit 17 shown constituting the resolution converting processing unit

FIG. 10 is a block diagram of the interpolating circuit 10 shown in FIG. 7. In FIG. 10, the items of image data DS1, DS2 enters respective eight-bit, seven-stage shift registers 17, 18. The contents of image data A~G accumulated in the shift register 17 and the contents of image data a~g accumulated in the shift register 18 enter a logic circuit 19, which outputs the eight-bit interpolated data Q corresponding to these inputs.

The data interpolation processing performed by the interpolating circuit 10 according to this embodiment will now be described.

Figure 11:
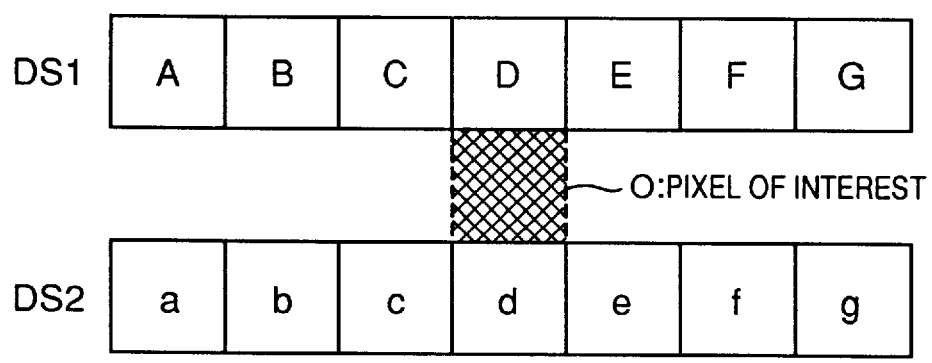
FIG. 11 is a diagram for describing data interpolation processing in the interpolating circuit 10.

FIG. 11 illustrates the relative positional relationship between the image data A~G, a~g and a pixel Q of interest to be interpolated. That is, the pixel Q of interest to be interpolated is situated at the middle of a line bracketed by the image data A~G and the image data a~g.

Figure 12:
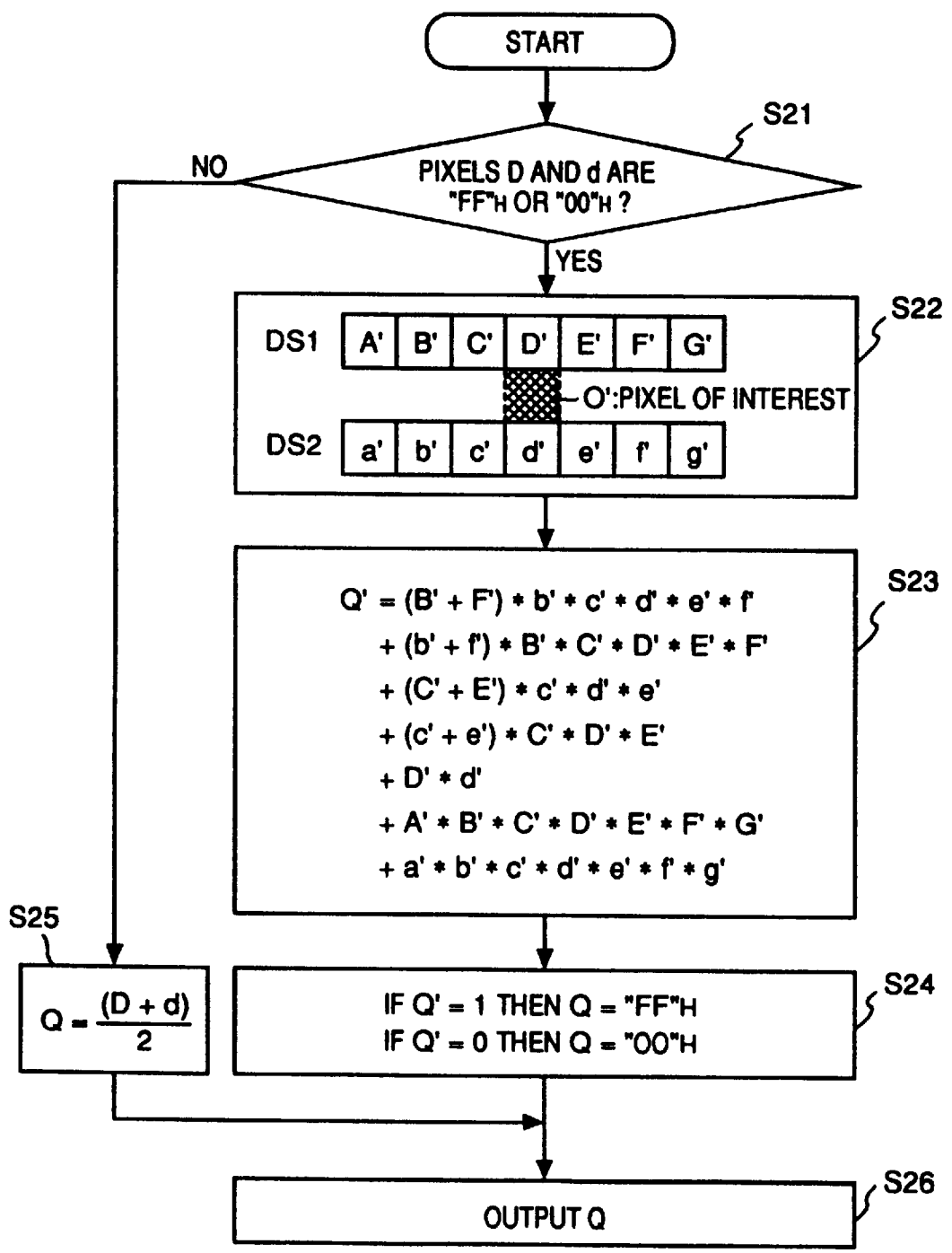
FIG. 12 is a flowchart illustrating the procedure of data interpolation processing in the interpolating circuit 10.

FIG. 12 is a flowchart illustrating logical processing and numerical processing in the logic circuit 19 constituting the interpolating circuit 10. At step S21 in FIG. 12, the contents of pixels D and d situated above and below the pixel Q of interest are discriminated to determine whether both are "FF"$_H$ (where H represents hexadecimal notation) or "00"$_H$ or a combination of "FF"$_H$ and "00"$_H$.

When the result of discrimination is "YES", it is judged that two-value image data indicative of a character or figure should be produced as the pixel of interest and processing is advanced to step S22. Here the items of eight-bit image data A~G and a~g are converted to items of two-value data A'~G' and a'~g' each composed of one bit.

More specifically, the content of image data is converted to logical "1" with regard to pixels of "FF"$_H$ and to logical "0" with regard to pixels of "00"$_H$~"FE"$_H$. One-bit interpolated data Q' is produced by interpolation in accordance with the following logical expression:

$$\begin{aligned} Q' = & \{(B'+F') * b' * c' * d' * e' * f'\} + \\ & \{(b'+f) * B' * C' * D' * E' * F'\} + \\ & (C'+E') * c' * d' * e' + \\ & \{(c'+e') * C' * D' * E'\} + \\ & (D'+d') + \\ & \{A' * B' * C' * D' * E' * F' * G'\} + \\ & \{a' * b' * c' * d' * e' * f' * g'\} \end{aligned}$$

Here "+" represents logical sum and " * " represents logical product.

The two-value interpolated data Q' is inversely converted to multiple-value interpolated data Q at step S24. In other words, when the data Q' is logical "1", multiple-value interpolated data Q="FF"$_H$ is established. When the data Q' is logical "0", Q="00"$_H$ is established. The multiple-value interpolated data Q obtained at step S25 is outputted at step S26.

When the result of discrimination at step S21 is "NO", this means that either the upper pixel D or lower pixel d includes image data "01"$_H$~"FE"$_H$ and it is judged that multiple-value image data such as that of a photograph should be produced as the pixel of interest. The program then proceeds to step S25. Here the mean value Q=(D+d)/2 of the upper and lower pixel data D, d is produced by interpolation by means of a numerical operation. The multiple-value interpolated data Q is outputted at step S26.

Figure 19:
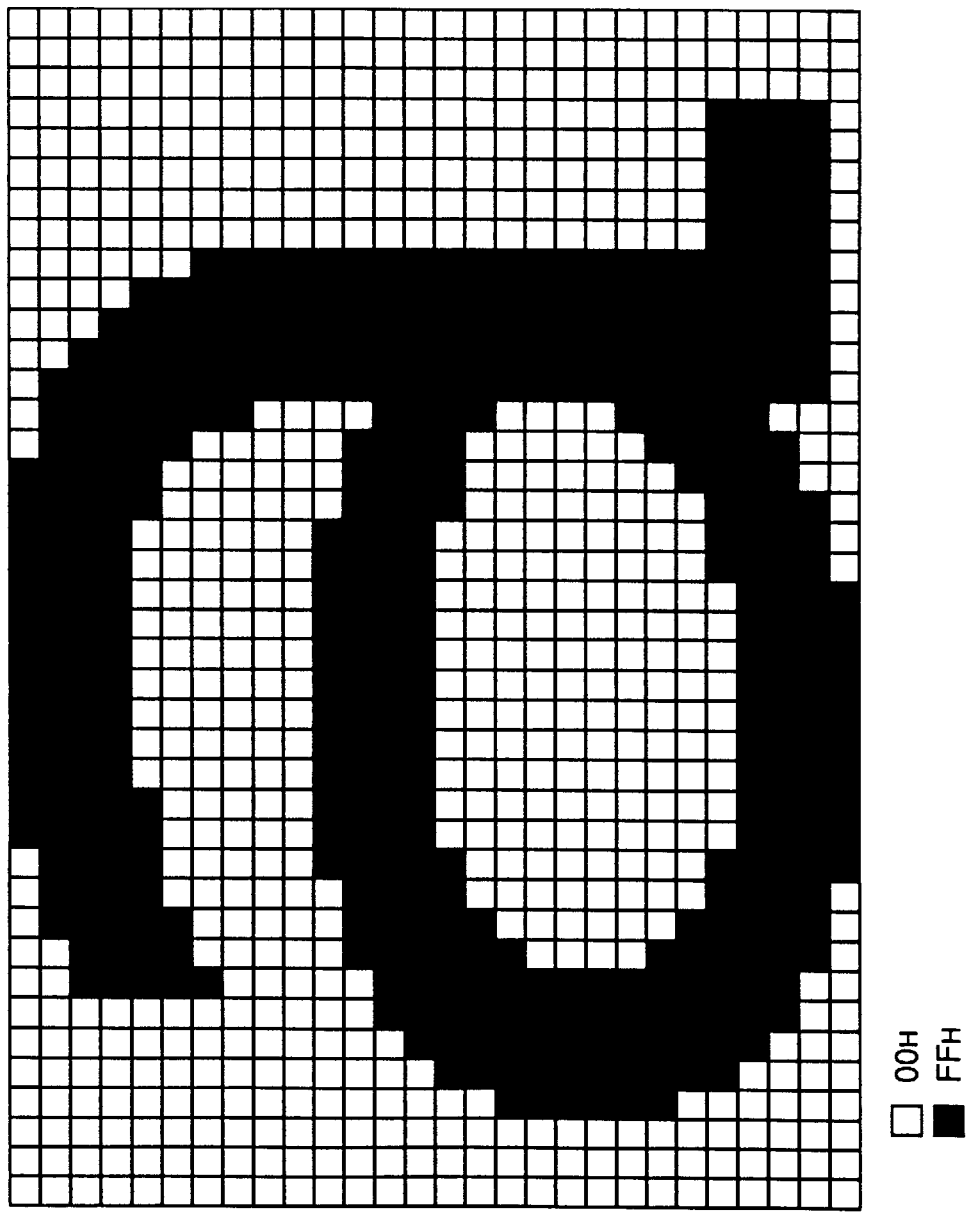
FIG. 19 is a diagram schematically showing image data of the alphabetic character "a" at 300 dpi.
Figure 20:
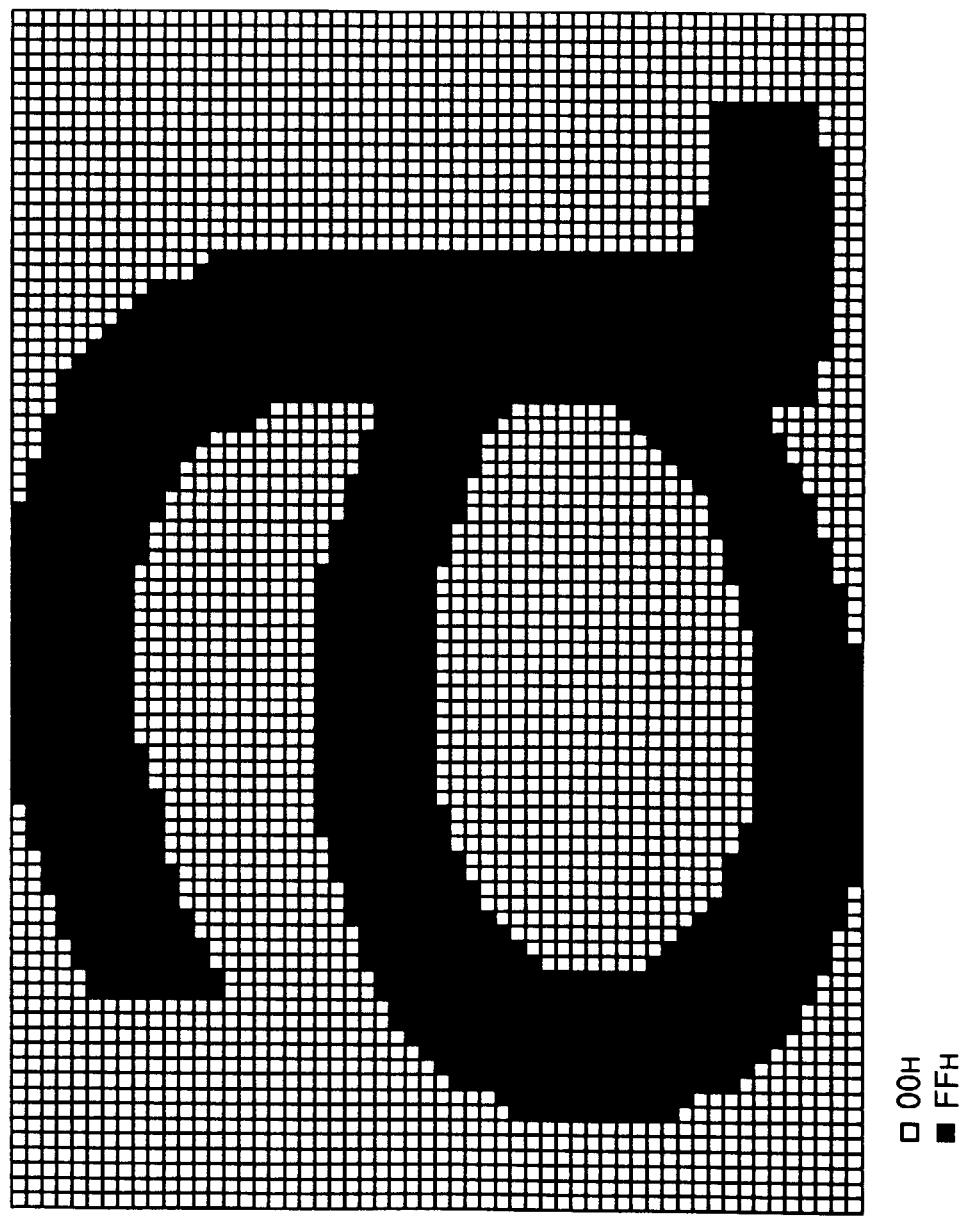
FIG. 20 is a diagram schematically showing image data of the alphabetic character "a" at 600 dpi.

By virtue of the foregoing processing, image data representing the alphabetic character "a" formed at a resolution of 300 dpi shown in FIG. 19 becomes interpolated image data of 600 dpi, as illustrated in FIG. 20, by way of example. This interpolated 600 dpi, eight-bit image data is sent to a pulse-width modulating circuit within the engine 207, described below.

Figure 13:
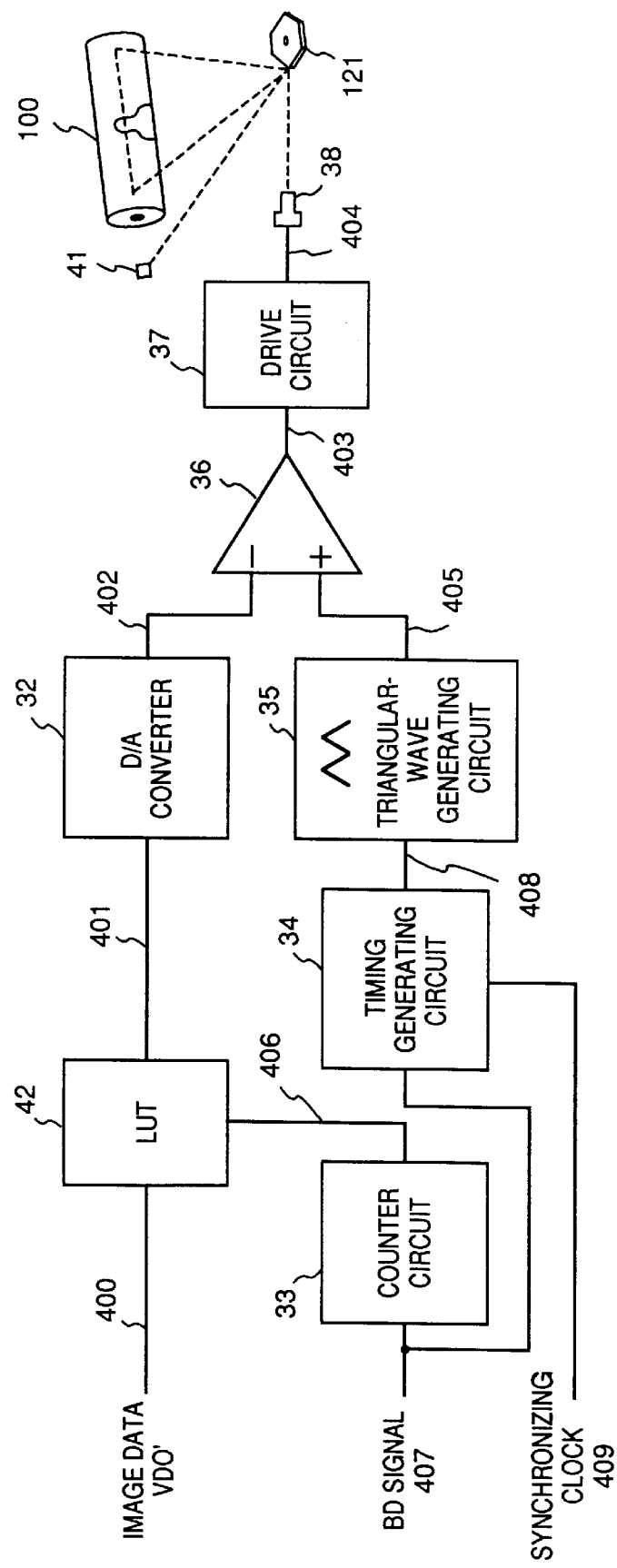
FIG. 13 is a block diagram of a pulse-width modulating circuit and image recording unit constituting an engine according to the first embodiment.

FIG. 13 is a block diagram of the engine 207 according to this embodiment. As shown in FIG. 13, the engine 207 is composed of a pulse-width modulating circuit and an image recording section.

In FIG. 13, a look-up table (LUT) 42 applies a gamma-correction conversion to the eight-bit image data (VDO') 400 from the data selector 16 within the resolution converting processing unit 206. Further, a D/A converter 32 converts gamma-corrected image data 401 to an analog image signal 402.

A timing generating circuit 34 generates a timing signal 408 synchronized to a horizontal synchronizing signal (BD signal) 407, which based upon a detection signal from a beam detector 41, and a synchronizing clock signal 409 based upon the BD signal. A triangular-wave generating circuit 35 generates a triangular signal 405 in accordance with the timing signal 408.

A comparator 36 compares the analog image signal 402 and the triangular signal 405, thereby generating a PWM signal which is the result of pulse-width modulating the density of the analog image signal 402. A driver circuit 37 pulsatingly drives the semiconductor laser 38 in accordance with the PWM signal outputted by the comparator 36.

Thus, the laser beam emitted from the semiconductor laser 38 is made to scan across the photosensitive drum 100 in the main-scan direction by the polygon mirror 121 rotated at high speed, and is made to scan in the sub-scan direction by the photosensitive drum 100 rotating at a prescribed speed. A latent image of the input image data VDO' is formed on the uniformly charged surface of the photosensitive drum 100 by so-called raster scanning. The latent image is rendered visible by developing means and transferred to recording paper, whereby a 600 dpi, eight-bit recorded image is obtained.

Figure 14:
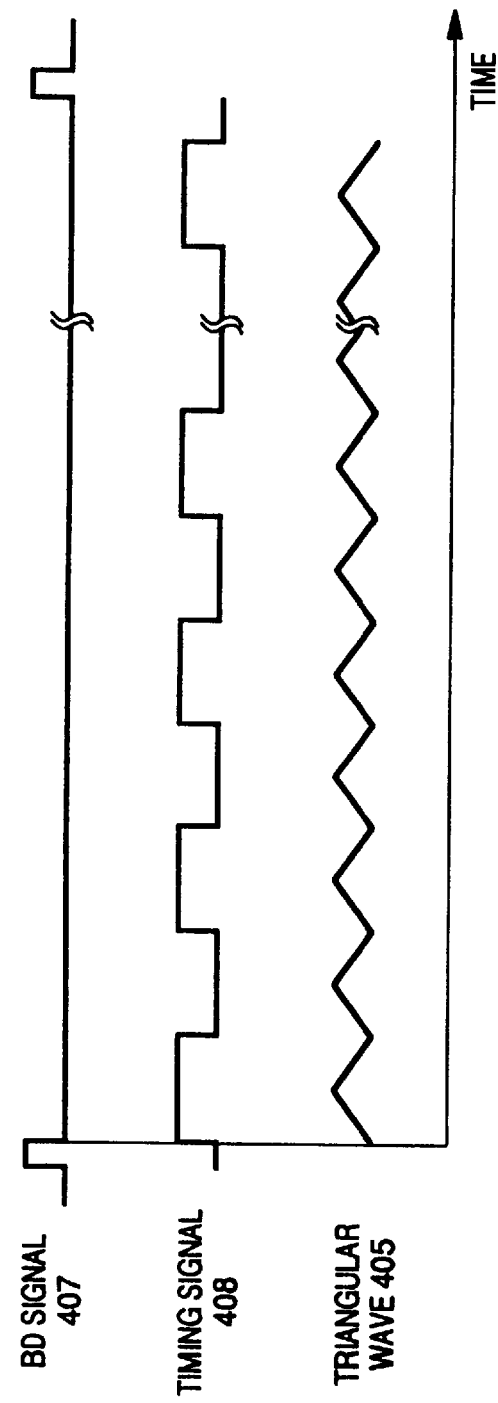
FIG. 14 is an operation timing chart of the pulse-width modulating circuit and image recording unit shown in FIG. 13.
Figure 15:
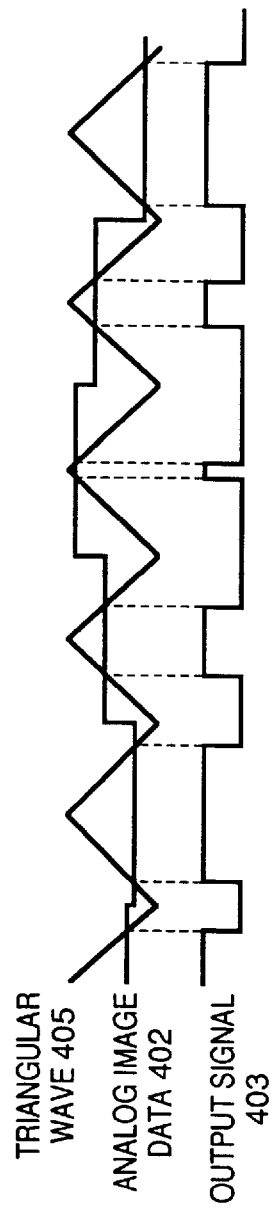
FIG. 15 is an operation timing chart of the pulse-width modulating circuit and image recording unit shown in FIG. 13.

FIGS. 14 and 15 are operation timing charts for the engine shown in FIG. 13. As illustrated in FIG. 14, timing signals 408 of a prescribed number of pixels (here 600 dpi) are generated between the BD signals 407, and the triangular signal 405 is generated in synchronization with the timing signals 408. As shown in FIG. 15, the comparator 36 forms an output signal (PWM signal) 403 in such a manner that the signal attains the logical "1" level in an interval in which the level of the triangular signal 405 exceeds the level of the analog image signal 402. In other words, the comparator 36 generates the PWM signal whose pulse widths (halftones) conform to the density level of the analog image signal 403. Laser drive and image recording are carried out in accordance with this PWM signal.

In accordance with this embodiment, as described above, when 600 dpi image data is generated from 300 dpi image data, interpolated data of a pixel of interest is produced by a two-value logical operation in a case where the image data about the periphery of the pixel of interest appertains to binary representation. When the image data is judged to appertain to an image of multivalued representation, the interpolated data of the pixel of interest is produced by a numerical operation. As a result, a 600 dpi picture of the same size can be printed and recorded in such a manner that outline sharpness and smoothness, which are characteristics possessed by a two-value image, are maintained at portions of the input 300 dpi image data that are two-value images while smoothness of the grayscale is maintained at portions of the input 300 dpi image data that are halftone images.

Further, by developing image data at 300 dpi and converting this image data to 600 dpi image data by interpolation in the resolution conversion of the image data, memory capacity can be reduced to one-fourth. By applying compression/decompression processing, this memory capacity can be further reduced to 1/12. This means that in a case where a memory of 128 megabytes (memory capacity of when image data is developed at 600 dpi) is required for the buffer memory, the necessary memory capacity can be reduced to 1/(4×12)=1/48. In other words, a memory capacity of 2.7 megabytes will suffice. As a result, a large-scale reduction in the cost of the apparatus can be achieved. In addition, since the image developing speed also is such that development can be carried out at 300 dpi, the developing speed can be raised by a factor of four.

The present invention is not limited to the foregoing embodiment but can be modified in various ways within the scope of the claims.

Modifications of the foregoing embodiment will now be described.

For example, though a two-value image and a multiple-value image are discriminated by comparative reference data "FF"$_H$, "00"$_H$ in the above-described embodiment, this may be accomplished by adopting "FF"~"F0" or "10"~"0" data as the two-value data and data of "EF"~"11" as the multiple-value data.

Further, though a calculated mean value of adjacent pixel data is used as interpolated data in a case where image data is multivalued, the interpolated value may be altered by making a judgment upon additionally taking into consideration the grayscale gradient of the surroundings. By adopting this expedient, interpolation processing of portions of the multiple-value image that undergo a gentle change in the grayscale can employ the mean value of the peripheral pixel data and interpolation processing of portions that undergo a sudden change in the grayscale can employ a calculated value which will preserve the outline of a figure. This makes it possible to perform interpolation while sharpening an image without causing blurring of contour at edge portions present in a natural picture.

Further, in order to simplify the circuitry for processing multiple-value image data, an arrangement may be adopted in which a value is merely interpolated as pixel data identical with one item of pixel data from among the peripheral pixels without using calculation. Though this does raise picture quality, image size can be corrected by simpler circuitry.

In a case where the capacity of the memory 154 in the data compressing/decompressing unit 204 is capable of being enlarged and additional memories cannot be provided, it may be so arranged that the controller 203 develops the image data at 300 dpi, converts this data to 600 dpi in the printer of the foregoing embodiment having the construction of FIG. 1, and causes the converted data to be printed. In a case where the capacity of the memory has been enlarged so as to be greater than a prescribed capacity, it may be so arranged that the controller 203 develops the image data at 600 dpi and skips the resolution conversion processing in the resolution converting processing unit 206 shown in FIG. 1. If this is done, it will be possible to obtain a high-quality image commensurate with the memory capacity.

In the foregoing embodiment, the image data D2 that enters the data compressing/decompressing processing unit 204 is an RGB signal. However, an arrangement may be adopted in which this image data enters as YMCK image data D2, this YMCK data is compressed and then stored in memory, and the image data D3 decompressed in the order Y, M, C, K is fed into resolution converting processing unit 206, without the intermediary of the color converting processing unit, in correspondence with each of the /TOP signals and in conformity with the process timing of the printer engine. In this case, when the controller 203 develops the image data, the data is developed upon being converted YMCK color data.

Furthermore, in the foregoing embodiment, data having a printing density of 300 dpi is subjected to compression/decompression, after which the 300 dpi data is converted to 600 dpi data. However, 400 dpi data may be entered and converted to 800 dpi data, or 300 dpi data may be entered and converted to 900 dpi data, by way of example.

Further, the number of dots subjected to data interpolation is one. However, interpolation of a plurality of dots may be performed, or it may be arranged to deal with image data composed of bits less than eight bits, namely seven bits, six bits, five bits, four bits, three bits or two bits. In addition, the printer engine is limited to a laser-beam printer but may be an LED printer, an ink-jet printer, a thermal-transfer printer or a sublimation-type printer. The image recording modulating method may be luminance modulation rather than pulse-width modulation.

[Second Embodiment]

A second embodiment of the present invention will now be described.

Figure 21:
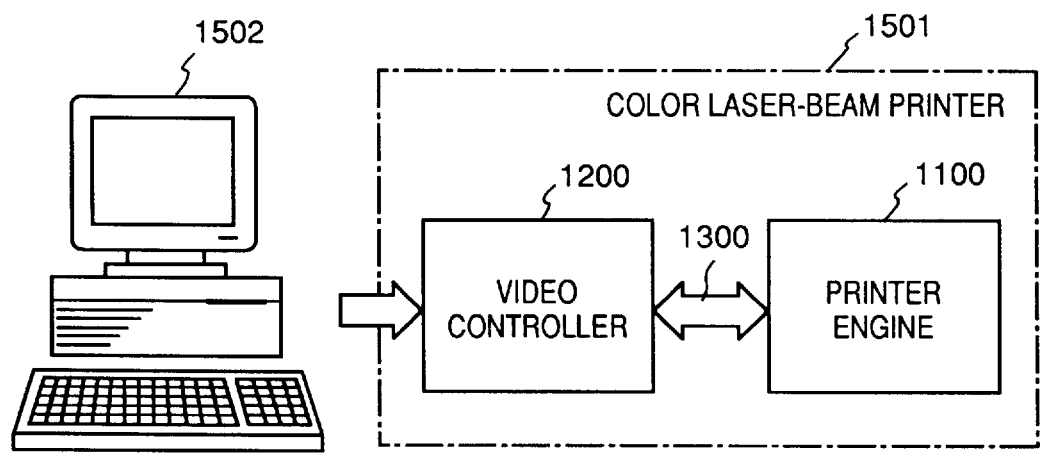
FIG. 21 is a diagram showing, in simplified form, the manner in which a color laser-beam printer in accordance with a second embodiment of the invention is connected.

FIG. 21 is a diagram showing, in simplified form, the manner in which a color laser-beam printer in accordance with the second embodiment of the invention is connected. It should be noted that the color laser-beam printer in this embodiment is assumed to be one having a resolution of 600 dpi.

As shown in FIG. 21, a color-laser beam printer 1501 comprises a video controller 1200 (referred to simply as a "controller" hereinafter) for receiving code data or image data, which is described in printer language, sent from an external host computer 1501, and for generating one page of multiple-value image data of the colors magenta, cyan, yellow and black the basis of this data, and a printer engine 1100 (referred to simply as an "engine" hereinafter) for carrying out recording by a series of electrophotographic processes, namely by forming a latent image by causing a laser beam, which has been modulated in accordance with input multiple-value image data, to scan a photosensitive drum, transferring the latent image to recording paper and then fixing the image. As mentioned above, the engine 1100 has a resolution of 600 dpi.

The video controller 1200 and printer engine 1100 are connected by an interface signal line 1300.

The color-image forming process in the color laser-beam printer of this embodiment will now be described.

Figure 22:
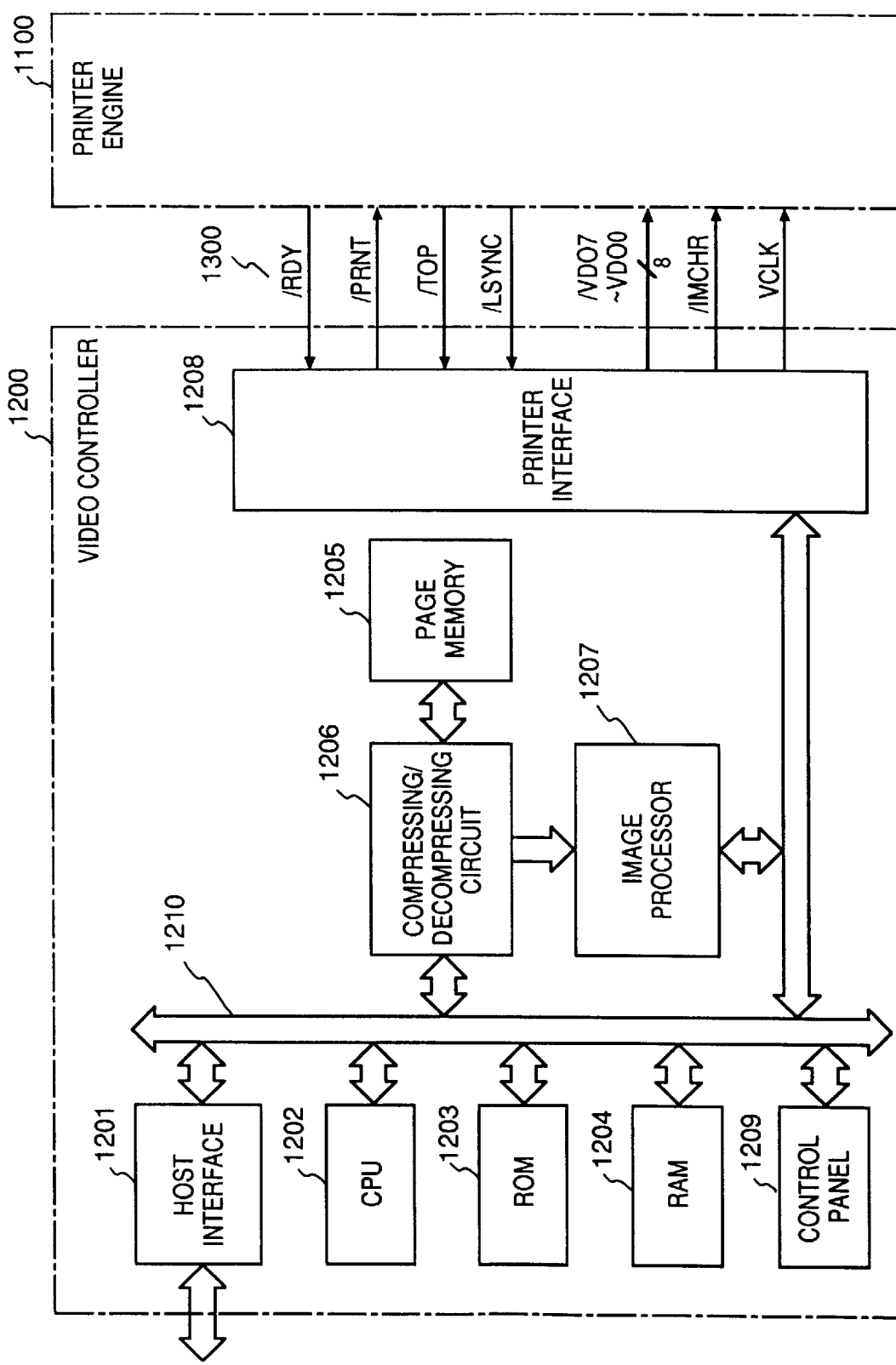
FIG. 22 is a block diagram showing the construction of a video controller in a laser-beam printer according to the second embodiment.

FIG. 22 is a block diagram showing the construction of the video controller constituting the color laser-beam printer according to this embodiment.

The principal interface signals shown in FIG. 22 will be described first. It should be noted that the symbol "/" attached to the signal names signifies that the signal is "low active" in terms of logic.

An /RDY signal is sent to the controller 1200 from the engine 1100. If the engine 1100 receives a /PRNT signal, described below, the /RDY signal indicates that the printer is in a state in which a printing operation can be started at any time or a state in which the printing operation can be resumed.

The /PRNT signal is sent to the engine 1100 from the controller 1200. This signal designates the start of a printing operation or the resumption of the printing operation.

A /TOP signal is a synchronizing signal in the sub-scan (vertical scanning) direction. This signal is sent from the engine 1100 to the controller 1200.

An /LSYNC is a synchronizing signal in the main-scan (horizontal scanning) direction. This signal is sent from the controller 1200 to the engine 1100.

/VDO7~/VDO0 signals are image signals sent from the controller 1200 to the engine 1100 and indicate image-density information to be printed by the engine 1100. These signals are represented by a total of eight bits, in which VDO7 is the most significant bit and VDO0 the least significant bit. The engine 1100 prints at the maximum density of the toner color being developed when the /VDO7~/VDO0 signals are "00$_H$" (where H represents hexadecimal notation) and prints nothing when the /VDO7~/VDO0 signals are "FF$_H$"

An /IMCHR signal is a signal indicating the image attributes and is sent from the controller 1200 to the engine 1100. When this signal is "true", this indicates that the image attaches importance to tonality; when it is "false", this indicates that the image attaches importance to resolution.

Further, when this signal is "true", the engine 1100 prints the number of PWM lines (units expressing density) as 200 lines/inch. When the signal is "false", the engine prints the number of PWM lines as 600 lines.

A VCLK signal is a transfer clock signal of the image signals /VDO7~/VDO0 and image-attribute signal /IMCHR and is sent from the controller 1200 to the engine 1100. The controller 1100 transmits the /VDO7~/VDO0 signals and the /IMCHR signal in synchronization with the leading edge of the VCLK signal.

The video controller 1200 shown in FIG. 22 includes a host interface 1201 for communicating with the aforementioned host computer and receiving code data or image data described in the printer's own language. Numeral 1202 denotes a CPU for supervising overall control of the controller 1200, 1203 a ROM for storing the control program of the CPU 1202 as well as font data, and 1204 a RAM serving as the work area of the CPU 1202.

A compressing/decompressing circuit 1206 functions to compress/decompress RGB eight-bit multiple-value image information. A page memory 1205 stores one page of compressed RGB multiple-value image data. An image processor 1207 converts RGB multiple-value image information, which has been decompressed by the compressing/decompressing circuit 1206, to multiple-value image information of magenta (M), cyan (C), yellow (Y) and black (Bk), which are the colors of the printing toners of the printer engine 1100, and further converts this information to 600 dpi smoothened information to generate the image-attribute signal /IMCHR.

A printer interface 1208 is for interfacing the printer engine 1100. A control panel 1209 is manipulated by the operator so that various printing settings can be set directly. Exchange of data among the blocks within the controller 1200 is performed via a data interface 1210.

In the controller having the construction described above, code data that has entered from the host interface 1201 is developed into 300 dpi, RGB multiple-value image data of eight bits for each color with regard to characters and figures or a pictorial image by a prescribed painting algorithm. The developed RGB image data is compressed by the compressing/decompressing circuit 1206.

The compressing/decompressing circuit 1206 compresses the input image data by a JPEG algorithm, for example, and outputs this data while decompressing it in real-time when a printing operation is performed. The compressed image data is stored in the page memory 1205, as mentioned above.

When the one page of compressed image data is thus prepared in the page memory 1205, the video controller 1200 makes the /PRNT signal "true" if the /RDY signal from the print engine 1100 is "true", thereby instructing the printer engine 1100 to start printing.

The operation of the printer engine 1100 according to this embodiment will now be described.

Figure 23:
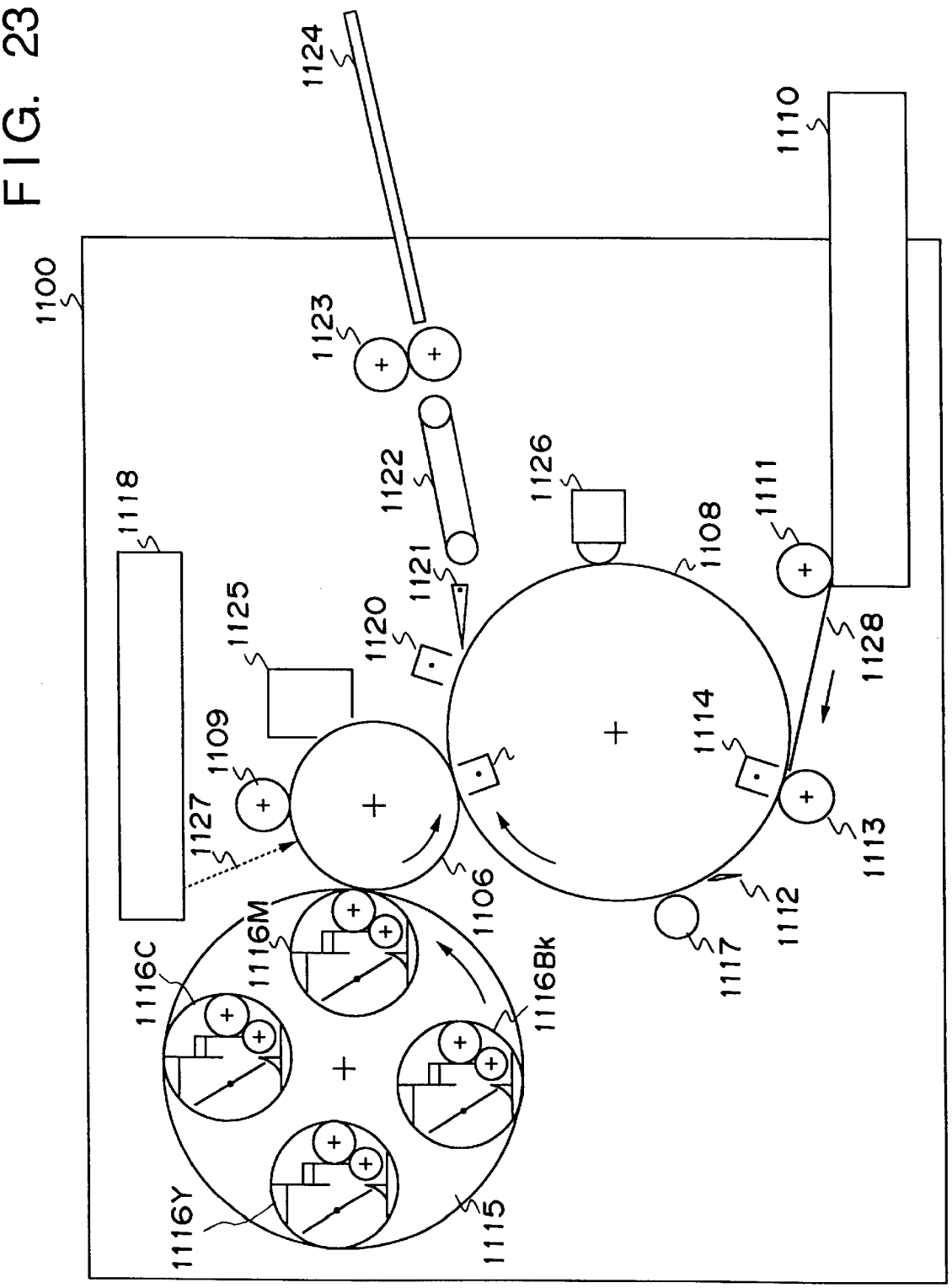
FIG. 23 is a transverse cross-sectional view of a printer engine according to the second embodiment.
Figure 24:
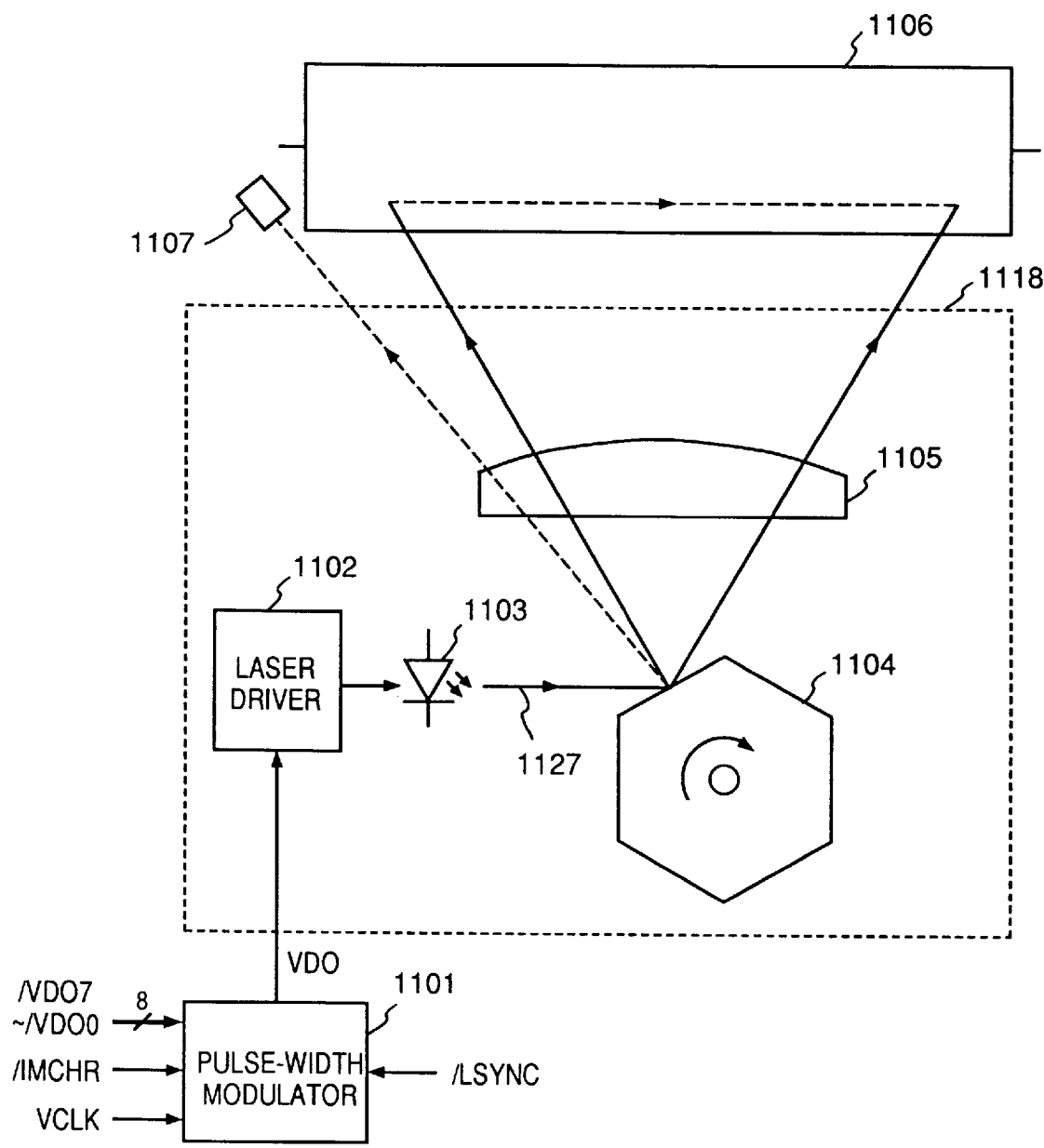
FIG. 24 is a diagram showing the flow of image signals in the printer engine according to the second embodiment.

FIG. 23 is a transverse cross section of the printer engine, and FIG. 24 is a diagram showing the flow of image signals in the printer engine.

Upon receiving the /PRNT signal, the printer engine 1100 shown in FIG. 23 employs drive means (not shown) to rotate a photosensitive drum 1106 and a transfer drum 1108 in the directions of the arrows indicated in FIG. 23. The engine then starts the charging of a roller corona discharge device 1109 to charge the photosensitive drum 1106 uniformly to a prescribed potential.

Next, recording paper 1128 is fed from a recording paper cassette 1110 to the transfer drum 1108 by a paper-feed roller 1111. The transfer drum 1108, which consists of a dielectric sheet tensioned on a hollow support body, is rotated in the direction of the arrow at the same speed as the photosensitive drum 1106. When the transfer drum 1108 is supplied with the recording paper 1128, the latter is held by a gripper 1112 provided on the support body of the transfer drum 1108. The recording paper 1128 is fixedly attracted to the transfer drum 1108 by an attracting roller 1113 and attracting corona discharge device 1114.

At the same time, a support body 1115 of developing devices is rotated to bring a developing device 1116M, which contains magenta toner constituting a first toner, to a position opposing the photosensitive drum 1106. The developing devices in one of four developing devices 1116M, 1116C, 1116Y, 1116Bk supported on the support body 115. The developing devices 1116C, 1116Y and 1116Bk contain cyan toner, yellow toner and blank toner, respectively.

Meanwhile, the printer engine 1100 employs a detector 1117 to detect the leading edge of the recording paper 1128 fixedly attracted to the transfer drum 1106, generates the vertical synchronizing signal /TOP at a prescribed timing and sends this signal to the controller 1200.

Upon receiving the initial /TOP signal for a page to be printed, the controller 1200 starts reading out the compressed image data that has been stored in the page memory 1205. The data read out is decompressed, in real-time, to the original image data composed of a total of 24 bits, namely eight bits for each of R, G, B, by the compressing/decompressing circuit 1206, thereby outputting the decompressed data to an image processor 1207.

The image processor 1207 generates magenta data of the first printing color at 300 dpi and eight bits from the 300 dpi input image data of eight bits for each of R, G, B and converts the generated data to 600 dpi, eight-bit smoothened data. The image-attribute signal /IMCHR for each pixel is generated by the image processor 1207 at the same time. The details of processing executed by the image processor 1207 will be described later.

The 600 dpi image data generated as set forth above is sent to the printer engine 1100 as the image signals /VDO7~/VDO0 together with the image-attribute signal /IMCHR and in synchronization with the VCLK signal. As illustrated in FIG. 24, the /VDO7~/VDO0 signals and the /IMCHR signal outputted by the controller enter a pulse-width modulating circuit 1101, where a laser drive signal VDO having a pulse width conforming to the level of the image data is obtained.

In FIG. 24, a laser beam 1127 from a laser diode 1103 driven in accordance with the laser drive signal VDO is deflected by a polygon mirror 1104 rotated in the direction of the arrow by a motor, not shown. The laser beam scans the photosensitive drum 1106 in the main-scan direction through an imaging lens 1105 arranged in the optical path, thereby forming a latent image on the photosensitive drum 1106.

Now a beam detector 1107 detects the scanning starting point of the laser beam. The /LSYNC signal, which is the horizontal synchronizing signal for deciding the main-scan writing timing, is produced from the detection signal produced by the detector 1107.

Figure 25:
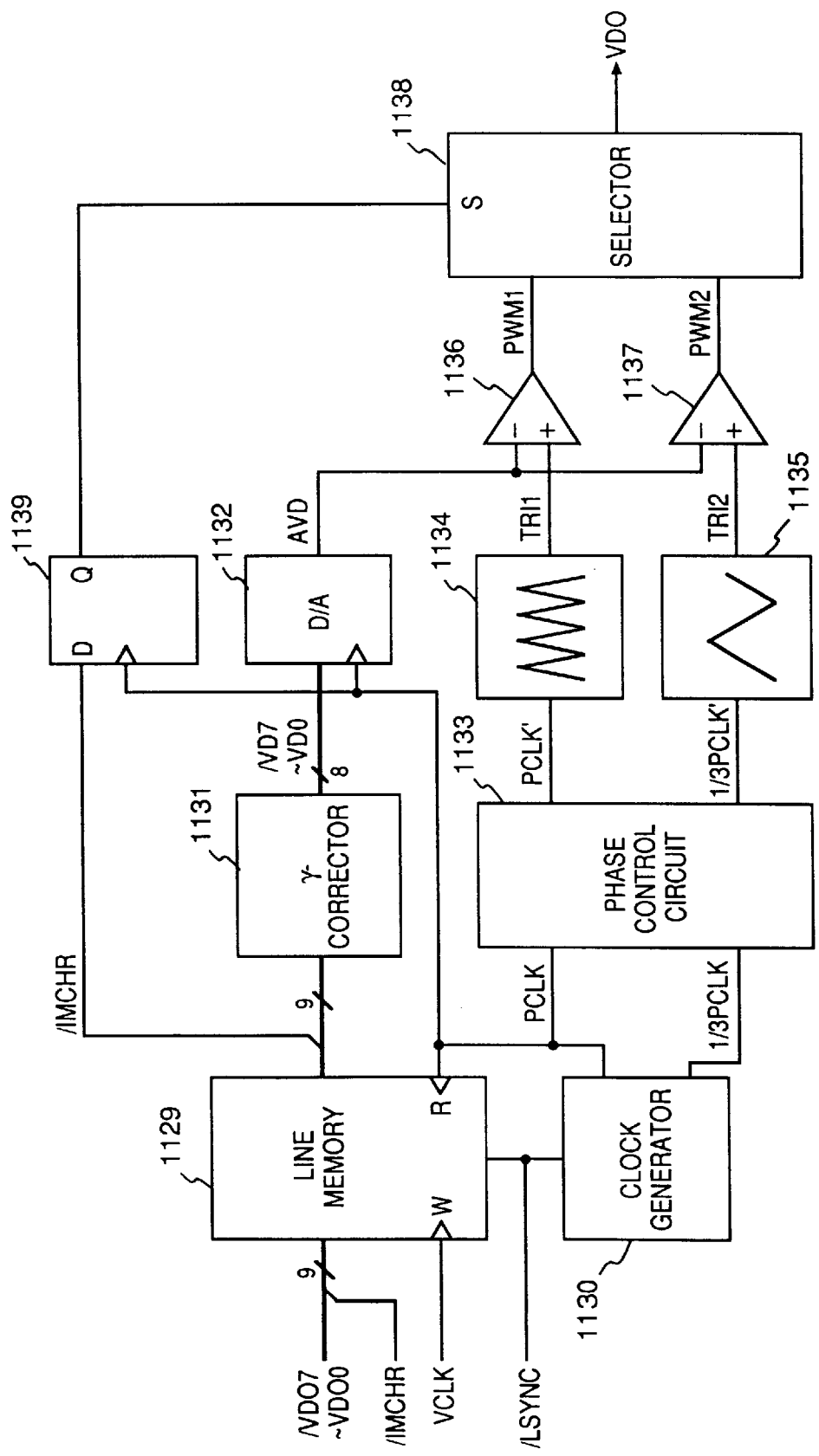
FIG. 25 is a block diagram showing the internal construction of a pulse-width modulating circuit according to the second embodiment.

FIG. 25 is a block diagram showing the internal construction of the pulse-width modulating circuit 1101 according to this embodiment. In FIG. 25, a line memory 1129 is arranged in the form of a toggle buffer. This is an arrangement in which it is possible to perform writing and reading simultaneously by independent clocks.

A clock generating circuit 1130 generates a pattern clock signal PCLK synchronized to the horizontal synchronizing signal /HSYNC, as well as a clock signal ($\frac{1}{3}$)PLCK obtained by frequency-dividing the signal PCLK by three. The signal PCLK has a period corresponding to one dot of printing at 600 dpi. Also shown are a γ-corrector circuit 1131, a D/A converting signal 1132, a phase control circuit 1133, triangular-wave generating circuits 1134, 1135, comparators 1136, 1137, a selector 1138 and a D-type flip-flop 1139.

The operation of the pulse-width converting circuit 1101 will now be described.

First, one line of the /VDO7~/VDO0 signals in the main-scan direction and the /IMCHR signal are written in the line memory 1129 by the clock signal VCLK. When the writing of the first line is completed, writing bank changeover of the line memory 1129 is performed in response to the horizontal synchronizing signal /HSYNC of the next line. At the same time that writing of the signal of the second line is carried out, the data of the first line already written is read out in response to the pattern clock signal PCLK.

The /VDO7~/VDO0 signals and the /IMCHR signal that have been read out enter the γ-corrector circuit 1131. The latter subjects the /VDO7~/VDO0 signals to a γ conversion, which is best suited to the process conditions of the printer engine, in conformity with the number of lines of PWM designated by the /IMCHR signal. The γ-converted eight-bit image signals /VDO7~/VDO0 are converted to analog voltage in dependence upon the values thereof by means of the D/A converting circuit 1132, whereby an analog video signal AVD is obtained.

At this time the D/A converting circuit 1132 generates a minimum voltage if the value of the image signals /VDO7~/VDO0 is $00_H$ and a maximum voltage if the value is $FF_H$. The analog video signal AVD enters negative input terminals of the comparators 1136, 1137. An output TRI1 from the triangular-wave generating circuit 1134 enters the positive input terminal of the comparator 1136, and an output TRI2 from the triangular-wave generating circuit 1135 enters the positive input terminal of the comparator 1137.

Figure 26:
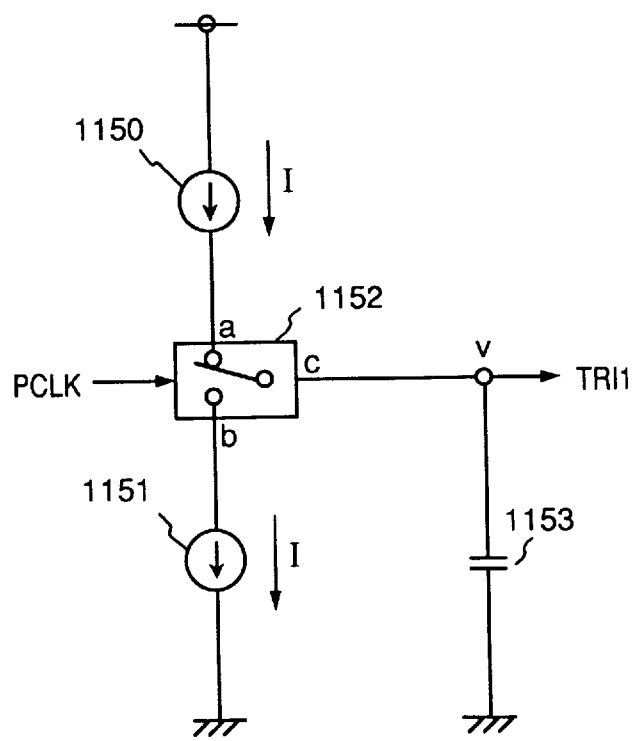
FIG. 26 is a block diagram showing the construction of a triangular-wave generating circuit according to the second embodiment.

The triangular-wave generating circuit 1134 has the construction shown in FIG. 26. Here a clock signal PCLK' obtained by changing the phase of the pattern clock signal PCLK using the phase control circuit 1133 enters a changeover switch 1152. The changeover switch 1152 connects its a and c terminals when the clock PCLK' is at the H logic level, whereby a current I from a current source 1150 flows into a capacitor 1153. As a result, the capacitor 1153 is charged to a prescribed amount of electric charge so that a voltage value V across its terminals increases linearly.

When the clock PCLK' assumed the L logic level, terminals b and c of the switch 1150 are connected so that the current I flows into a current source 1151, thereby discharging the charge that has accumulated in the capacitor 1153 so that the voltage value V decreases linearly.

Thus, the triangular signal TRI1 having a period equal to that of the signal PCKL is obtained. The triangular-wave generating circuit 1135 has a construction similar to that of the triangular-wave generating circuit 1134. However, since its input clock is ⅓PCLK', the period of the outputted triangular signal TRI2 is equal to ⅓PCLK, namely three times TRI1.

The comparators 1136, 1137 compare the analog video signal AVD with the voltage levels of the triangular signals TRI1, TRI2, respectively, and deliver pulse-width modulated signals PWM1, PWM2 as their respective outputs.

In halftone recording, the number of lines generally is adopted as the pixel units for reproducing a certain density. In pulse-width modulation processing, the period of the triangular signal compared with the multiple-value image data is the number of lines. Accordingly, the number of lines of the above-mentioned pulse-width modulated signal PWM1 is 600 lines/inch and the number of lines of the pulse-width modulated signal PWM2 is 200 lines/inch. In terms of the characteristics of the electrophotographic process, the signal PWM1 of 600 lines/inch excels in resolution but is inferior with regard to reproducibility of grays. Conversely, the signal PWM2 of 200 lines/inch has inferior resolution but exhibits excellent reproducibility of grays.

The pulse-width modulated signals PWM1, PWM2 enter the selector 1138, which selects one in dependence upon the image-attribute signal /IMCHR. More specifically, the signal PWM2 exhibiting excellent tonality is selected when the signal /IMCHR is "true", namely when this signal is at the L logic level. The signal PWM1 exhibiting excellent resolution is selected when the signal /IMCHR is "false", namely when this signal is at the H logic level.

Figure 27:
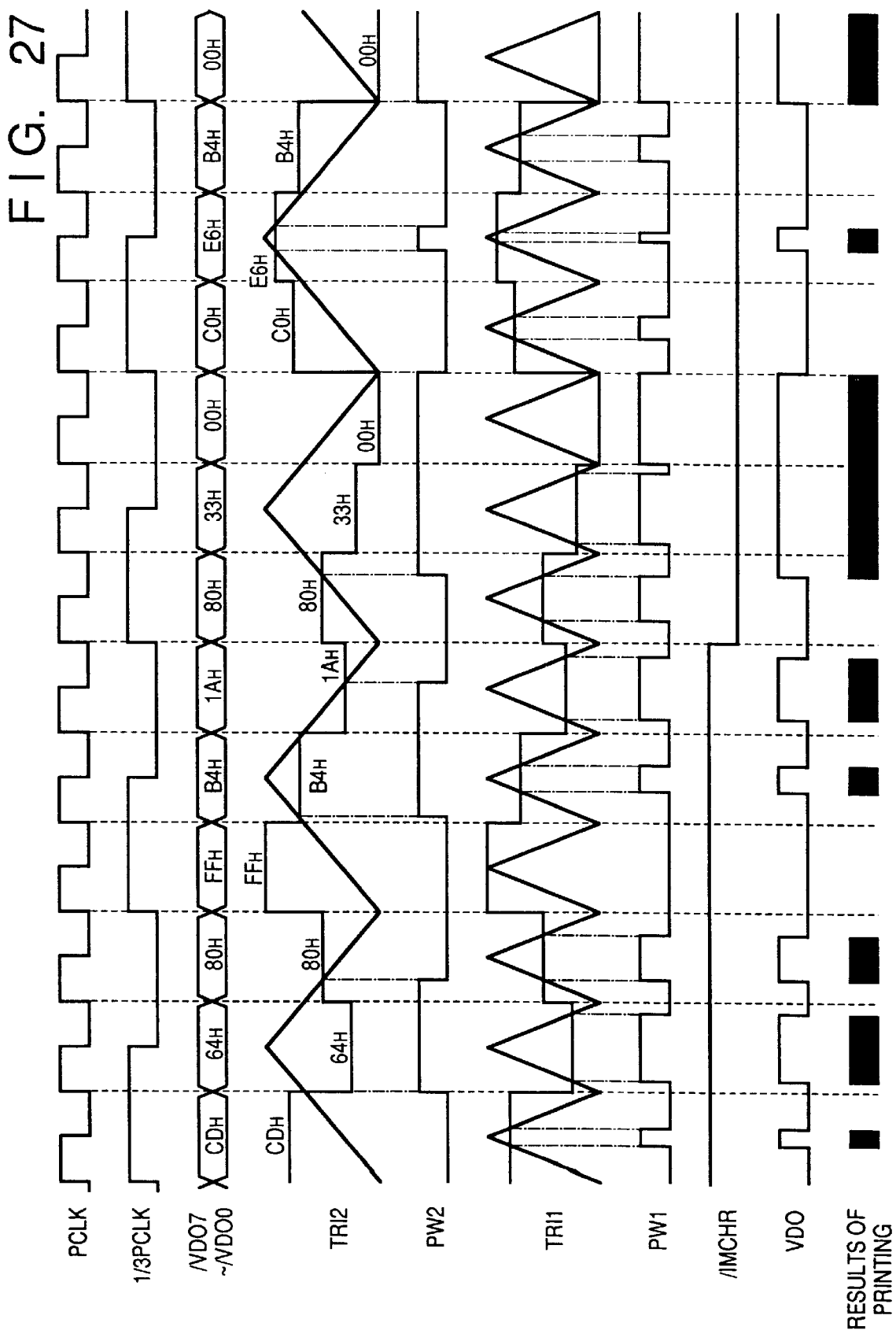
FIG. 27 is a timing chart of the pulse-width modulating circuit according to the second embodiment.

The signal selected in this fashion is sent to the laser driver as the laser drive signal VDO. At the time of development, described later, the grays of the image are reproduced in conformity with the pulse width of the laser drive signal VDO. FIG. 27 is a timing chart of the pulse-width modulating circuit 1101.

In a color laser-beam printer according to this embodiment, the above-described operation in the main-scan direction is repeated to form one page of a magenta latent image on the photosensitive drum 1106.

In a case where the phase of the pattern clock signal PCLK is the same in each main scan, the images formed are connected in the vertical (sub-scan) direction. In particular, when the number of lines of the signal PWM is 200, vertical stripes are produced and become conspicuous. Accordingly, this is prevented by using the phase control circuit 1133 shown in FIG. 25 to shift the phase of the pattern clock signal PCLK within a range of one period of the clock every main scan.

Formation and development of toner images will now be described in detail with reference again to FIG. 23.

The latent image formed on the photosensitive drum 1106 is developed by the developing device 1116M containing magenta toner in order to obtain a magenta toner image. This magenta toner image is transferred by the transfer corona discharge device 1119 to the recording paper 1128 fixedly attracted to the rotating transfer drum 1108. At this time any toner not transferred and left on the photosensitive drum 1106 is removed by the cleaning device 1125. By virtue of this operation, one page of the magenta toner image is formed on the recording paper 1128.

Next, the support body 1115 of the developing devices is rotated to bring the developing device 1116C, which contains cyan toner constituting a second toner, to the position opposing the photosensitive drum 1106. As in the case of the magenta toner, the leading edge of the rotating recording paper 1128 left fixedly attracted to the transfer drum 1108 is detected by the detector 1117, the vertical synchronizing signal /TOP is generated and this signal is sent to the video controller 1200.

Upon receiving this signal, the video controller 1200 reads the compressed image data out of the page memory 1205, decompresses this data to the original RGB image data of eight bits per color in real-time and inputs the resulting image to the image processor 1207. The image processor 1207 generates data indicative of cyan, which is the second printing color, and the image-attribute signal /IMCHR from the RGB input image data of eight bits per color. By subsequently performing an operation similar to that described above, a cyan toner image is transferred to the recording paper 1128 so as to be superimposed on the magenta toner image.

Similarly, a toner image in yellow, which is the third toner, and a toner image in black, which is the fourth toner, are transferred to the recording paper 1128 so as to be superimposed on the existing toner images, thereby obtaining a full-color toner picture. The recording paper 1128 to which all of these four-color toner images have been transferred is sent through a separating corona discharge device 1120, peeled off the transfer drum 1108 by a separating finger 1121 and then supplied to a fixing device 1123 by conveying means 1122. At this time the surface of the transfer drum is cleaned off by a transfer drum cleaner 1126.

The toner image on the recording paper is heated and subjected to pressure by the fixing device 1123, whereby the image is affixed by fusion to obtain the final color image. The recording paper on which recording has been completed is ejected into a paper discharge tray 1124.

The image processing performed by the image processor 1207 shown in FIG. 22 will now be described in detail.

Figure 28:
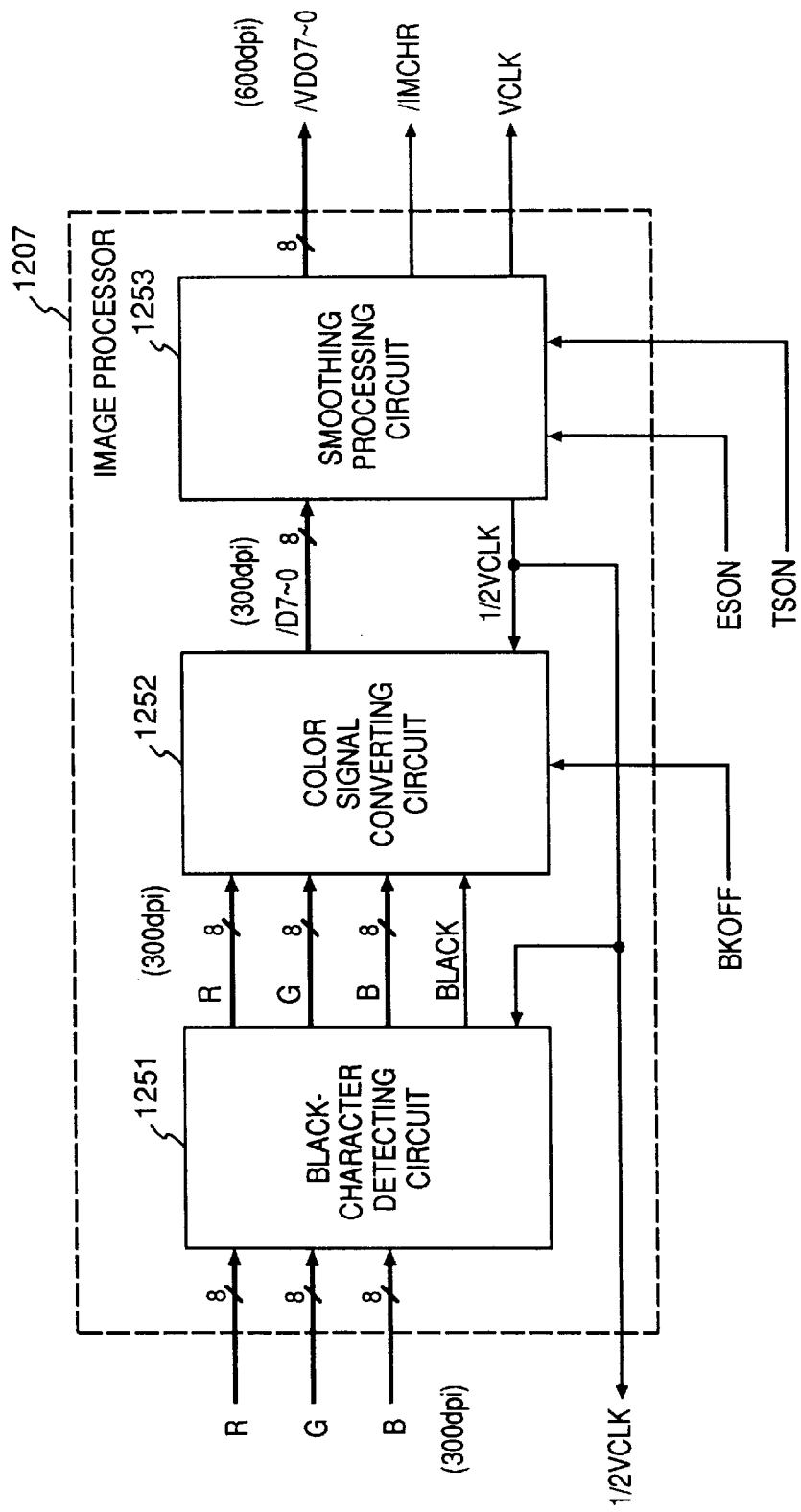
FIG. 28 is a block diagram showing the construction of an image processor according to the second embodiment.

FIG. 28 is a block diagram showing the construction of the image processor 1207. As shown in FIG. 28, the image processor 1207 is divided into three functional blocks, namely a black-character detecting circuit 1251, a color-signal converting circuit 1252 and a smoothing processing circuit 1253. Each of these blocks will now be described.

Figure 29:
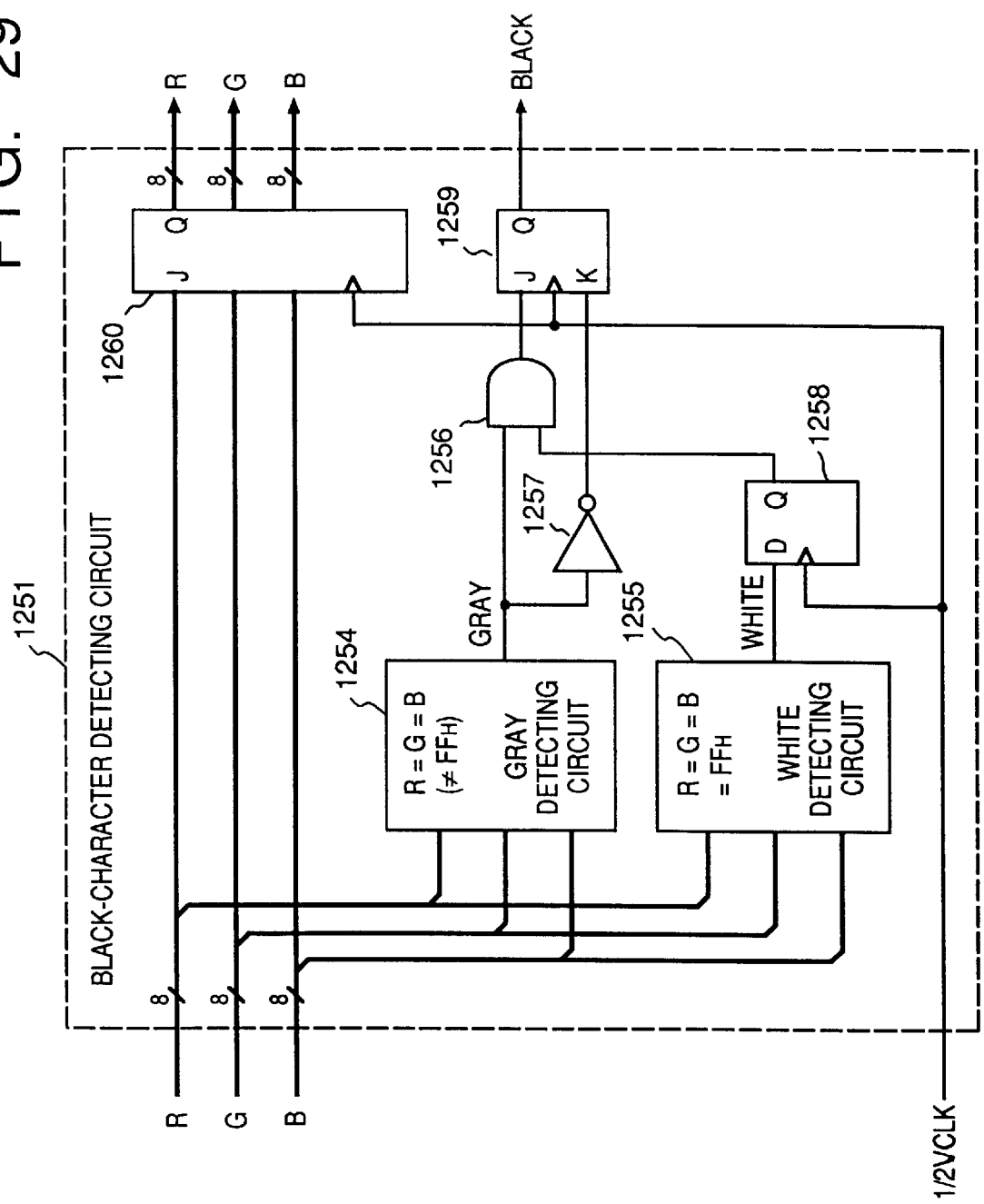
FIG. 29 is a block diagram showing the construction of a black-character detecting circuit according to the second embodiment.

FIG. 29 is a block diagram showing the construction of the black-character detecting circuit 1251. The black-character detecting circuit 1251 is a circuit for detecting characters or figures composed of the single color black described on a white background.

In a color laser-beam printer, "black (or gray)" usually is reproduced by printing the toners of M, C, Y, Bk in superimposed form. The reason for this is that when "black" is reproduced by the single color of the Bk toner, there is a decline in the density of the black portion in comparison with the periphery of this portion, as a consequence of which an unnatural image is produced in a picture such as a photograph. The printing of the aforementioned toners in superimposed form prevents this from occurring.

However, when toners of a plurality of colors are superimposed in a case where a character or figure of the single color black is described on white background, the effect of a slight printing offset in the printing of each color causes the edge portion of an image to be bordered by another color, thereby inviting a decline in picture quality. In the case of a character or figure, there is no need to take the difference in density between the character or figure and its periphery into consideration. This means that it is better to print the character or figure using the single color of black toner. For this reason the black-character detecting circuit 1251 detects a character or figure in the single color black described on a white background and outputs a black-character detection signal BLACK that conforms to the results of detection.

The operation of the black-character detecting circuit 1251 shown in FIG. 29 will now be described. It should be noted that the 300 dpi, RGB image signal of eight bits per color decompressed by the compressing/decompressing circuit 1206 enters the black-character detecting circuit 1251 in synchronization with a transfer clock $_{(\frac{1}{2})}$VCLK.

In FIG. 29, a gray detecting circuit 1254 detects that the data of a pertinent pixel is black (inclusive of gray) and outputs a detection signal GRAY corresponding to thereto. More specifically, a case in which the image data is R=G=B (exclusive of a case in which this image data is $FF_H$) is indicative of gray, and therefore this is detected. The detection signal GRAY enters a J input terminal of a JK-type flip-flop 1259 via an AND gate 1256 and a K input terminal of a JK-type flip-flop 1259 via a NOT circuit 1257 at the same time.

A white detecting circuit 1255 detects that the data of a pertinent pixel is white and outputs a detection signal WHITE as a result. More specifically, a case in which R=G=B=FF$_H$ holds is indicative of white, and therefore this is detected. The detection signal WHITE enters the AND gate 1256 upon being delayed for one period of the transfer clock signal $_{(½)}$VCLK.

By virtue of this arrangement, the AND gate 1256 issues an output, so as to set the J input of the JK-type flip-flop 1259, at a location where data indicative of a pixel neighboring in the main-scan direction has changed from white to black (gray). As a result, the detection signal BLACK becomes "true" in response to the next clock pulse.

On the other hand, the gray detecting circuit 1254 issues an output to set the K input of the JK-type flip-flop 1259 when the data of the pertinent pixel has attained a value other than R=B=G. As a result, the detection signal BLACK becomes "false" in response to the next clock pulse. The black-character detection signal BLACK thus generated is outputted together with the RGB image data, which is delayed by one clock in a D-type flip-flop group 1260 in order that the timings will coincide, in synchronization with the transfer clock $_{(½)}$VCLK.

The RGB data and the black-character detection signal BLACK enter the signal converting circuit 1252 shown in FIG. 28. The signal converting circuit 1252 converts the input data to image data /D7~/D0 of eight bits for each of M, C, Y, Bk. This conversion is carried out in the order of M, C, Y, Bk in synchronization with the /TOP signal corresponding to each color.

When the black-character detection signal BLACK is "true" with respect to a pixel for which the image data is R=G=B, the image data is converted to data of the single color of Bk toner; at all other times the image data is converted to data of a combination of the M, C, Y, Bk toners. However, when a black-character processing designating signal BKOFF is "true", the image data is converted to data of a combination of the M, C, Y, Bk toners irrespective of the black-character detection signal BLACK.

Next, the converted B, C, Y, Bk 300 dpi, eight-bit image data /D7~/D0 enters the smoothing circuit 1253. The latter changes the 300 dpi input data to 600 dpi smoothened data and generates the image-attribute signal /IMCHR.

Figure 30:
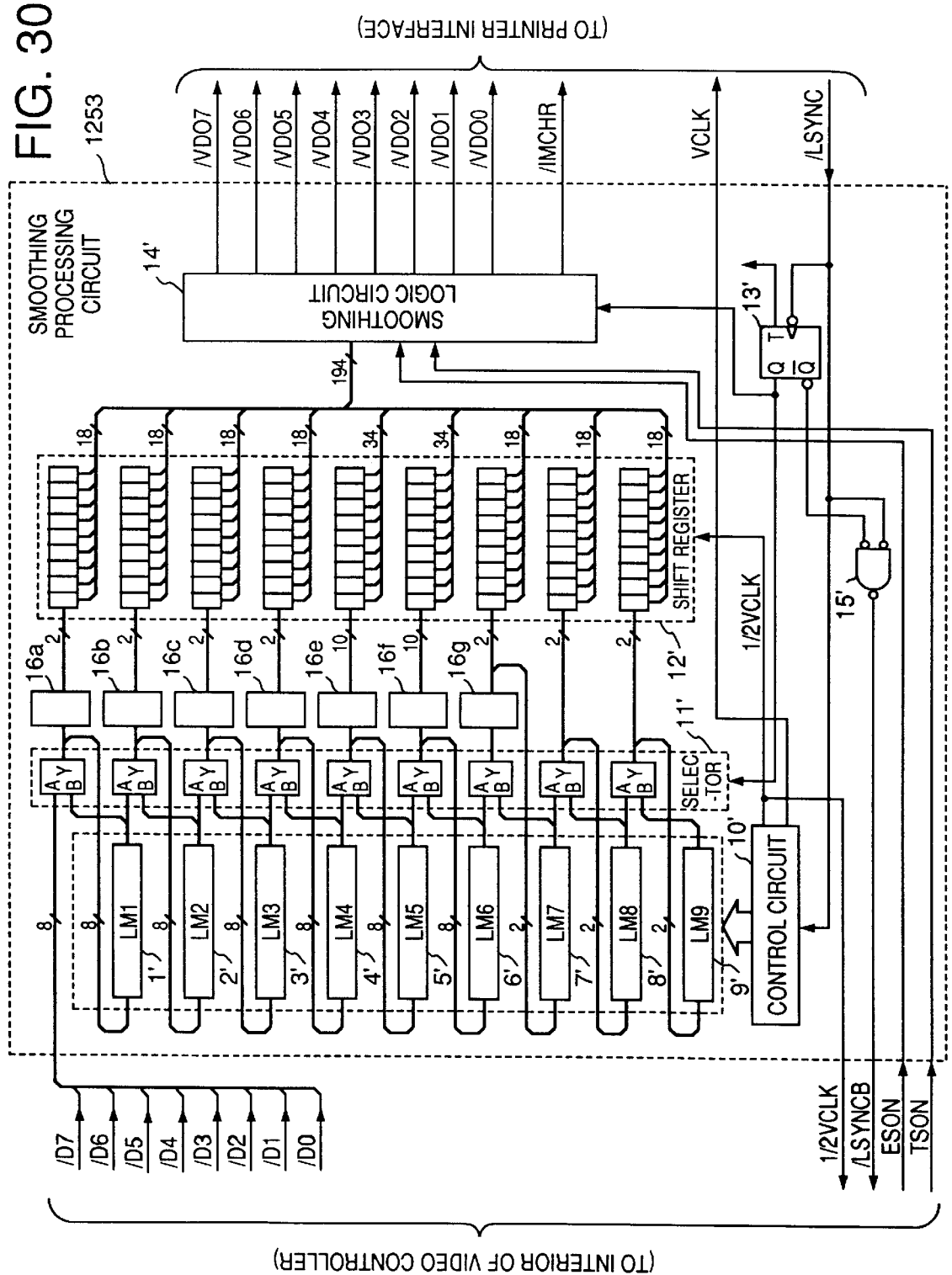
FIG. 30 is a block diagram showing the construction of a smoothing circuit according to the second embodiment.

FIG. 30 is a block diagram showing the construction of the smoothing circuit 1253. In FIG. 30, numerals 1'~9' denote line memories LM1~LM9 which, for purposes of smoothing processing, temporarily store the field-sequential eight-bit image data /D7~/D0 of M, C, Y, Bk.

The line memories LM1~LM6 among these line memories have a capacity capable of storing one line of the eight bits of /D7~/D0 in the main-scan direction at 300 dpi, and the line memories LM7~LM9 have a capacity capable of storing one line of a two-bit binarized signal, described later, in the main-scan direction at 300 dpi. Numeral 10' denotes a control circuit for controlling the overall operation of the smoothing circuit 1253, such as write/read timing control of the line memories 1'~9', synchronizing-signal generation, etc.

Numeral 11' denotes a group of selectors each for selecting one of two inputs A, B and delivering the selected signal to an output terminal Y. Numerals 16a~16g represent binarizing circuits each of which generates two bits of binarized data LIGHT and DARK, described later, on the basis of eight-bit input image data, Numeral 12' designates a group of shift registers for pixels of nine dots×nine lines surrounding a pixel M of interest. At the time of smoothing processing, these shift registers refer to the above-mentioned binarized data and output the aforesaid image data while shifting it in the main-scan direction.

Numeral 14' denotes a smoothing logic circuit which, on the basis of the data from the shift-register group 12', converts the image data of the pixel M of interest and outputs the result as the 600 dpi image signals /VDO7~/VDO0 of eight bits sent to the printer engine. This circuit also produces the image-attribute signal /IMCHR and sends it to the printer engine along with the image signals /VDO7~/VDO0. Numeral 13' designates a toggle flip-flop, and 15' an AND gate.

The M, C, Y, Bk field-sequential, eight-bit image data /D7~/D0 thus developed at 300 dpi is accepted by the smoothing processing circuit 1253 in synchronization with a 300 dpi image clock signal $_{1/2}$VCLK generated by the control circuit 10'.

The processing executed by the smoothing processing circuit 1253 will now be described in detail.

Within the video controller 1200, use is made of a horizontal synchronizing signal /LSYNCB obtained by thinning out every other line of the /LSYNC signal from the printer engine 1100. More specifically, the video controller 1200 operates as a 300 dpi controller. The selector 11' changes over its input whenever the horizontal synchronizing signal /LSYNC enters from the engine, namely at every main scan of the engine. The A input is selected when an odd-numbered line is printed by the printer, and the B input is selected when an even-numbered line is printed by the printer.

After the video controller outputs the /PRNT signal to the engine 1100, as described above, the 300 dpi, the eight-bit image data /D7~/D0 of the first color or magenta, in accordance with the initial vertical synchronizing signal /TOP, enters the smoothing processing circuit 1253 line by line in synchronization with the 300 dpi image clock signal $_{(½)}$VCLK. The first line of data of magenta inputted to the smoothing processing circuit 1253 enters the binarizing circuit 16a via the selector 11'.

Figure 31:
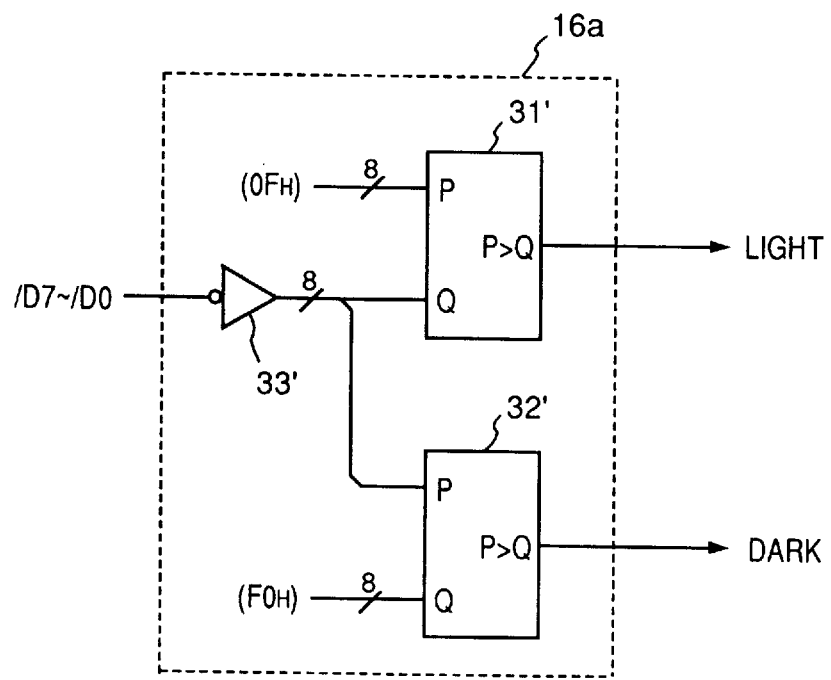
FIG. 31 is a block diagram showing the construction of a binarizing circuit according to the second embodiment.

FIG. 31 is a block diagram showing the construction of the binarizing circuit 16a. This circuit performs binarization by comparing input multiple-value data with a predetermined value. That is, eight-bit digital comparators 31', 32' each compare eight-bit input signals P and Q and output "H" logic when P>Q holds. This operation is described below.

The eight-bit image data /D7~/D0 enters the Q input of the comparator 31' and the P input of the comparator 32' via a NOT circuit 33'. The comparator 31' compares the above-mentioned input image data with a predetermined value "0FH" applied to its P input. At this stage minimum density is indicated when the image data is "00H" and maximum density when the image data is "FFH".

Accordingly, when the output of the comparator 31' is "H", this is a case in which the image data exhibits a density lower than "0FH". The output of the comparator 31' is delivered as the signal LIGHT, which indicates that the pertinent pixel is low in density.

The comparator 32' compares the above-mentioned input image data with a predetermined value "F0H" applied to its Q input. Accordingly, when the output of the comparator 32' is "H", this is a case in which the image data exhibits a density higher than "F0H". The output of the comparator 32' is delivered as the signal DARK, which indicates that the pertinent pixel is high in density.

The binarizing circuits 16b~16g have the same construction as that of the binarizing circuit 16a and need not be described in detail.

The two bits of the output signals DARK, LIGHT from the binarizing circuit 16a enter the first line of the shift register group 12'. At the same time, the eight bits of /D7~/D0, which constitute the image data of the first printing line, are written in the line memory LM1.

Next, the horizontal synchronizing signal /LSYNC of the second scan line of main scanning enters the smoothing processing circuit 1253 from the engine, whereupon the input of selector 11' is changed over to the B side. Accordingly, data L1 of the first line read out of the line memory LM1 is again written at the same address in the line memory LM1 and, at the same time, this data is binarized by the binarizing circuit 16a, whence the binarized data enters the first line of the shift register 12'. At this time the horizontal synchronizing signal /LSYNCB is not transmitted within the controller and, hence, there is no output of image data.

When the /LSYNC of the third scan line of main scanning enters the smoothing processing circuit 1253 from the engine, the input to the selector 11' is changed over to the A side again. Now, as seen from within the controller, the horizontal synchronizing signal /LSYNCB of the second line is transmitted, as a result of which the image data of the second line developed at 300 dpi is read out of the image memory in synchronization with this signal.

The image data read out is converted to the magenta eight-bit data and then fed into the smoothing processing circuit 1253 in synchronization with the image clock signal VCLK as in the manner described above. Data of the same position of the first line stored in the line memory LM1 is read out at the same time that the data L2 of the second line enters. The entered data L2 of the second line is written in the line memory LM1 through the selector 11', and the data L1 of the first line read out of the line memory LM1 is written at the same address in the line memory LM2.

At the same time, the data L2 of the second line is binarized by the binarizing circuit 16a an the data L1 of the first line is binarized by the binarizing circuit 16b. The binarizing signals of two bits obtained as a result enter the first and second lines, respectively, of the shift register 12'.

Thus, the writing/reading of image data of the same line developed at 300 dpi is performed two times each, while shifting is carried out, in the line memories LM1~LM9. At this time the eight bits of /D7~/D0 are stored in the lime memories LM1~LM6. Only the signals LIGHT, DARK of two bits binarized by the above-mentioned binarizing circuits are stored in the line memories LM7~LM9.

Thus, nine consecutive lines of identical data of 300 dpi enter the shift register 12' during two lines of main scanning. Data of 81 pixels in an array of nine dots×nine lines surrounding the pixel M of interest is outputted by the shift register 12'. This output data is composed of a total of ten bits comprising /D7~/D0 and the binarized signals LIGHT, DARK with regard to a total of four pixels, namely the pixel M of interest and three pixels one of which neighbors the pixel of interest at its right, one below and one diagonally below on the right side. The output data is composed of data of the two bits of the signals LIGHT and DARK with regard to pixels other than these pixels.

The data of these 81 pixels next enters the smoothing logic circuit 14'. As shown in FIG. 32, the smoothing logic circuit 14' detects the characterizing features of the image by referring to the surroundings of the pixel M of interest developed at 300 dpi and converts the image data of the pixel M of interest to four items of 600 dpi data M1, M2, M3, M4 of greater picture quality.

FIG. 33 is a block diagram showing the general construction of the smoothing logic circuit 14'.

The logic of the above-described conversion differs depending upon whether a portion of an image is an edge portion or a portion other than an edge. An edge smoothing logic circuit 21' performs a conversion by logic corresponding to an edge, and a grayscale smoothing logic circuit 22' performs a conversion by logic corresponding to portions other than edge portions.

The logic in the edge smoothing logic circuit 21', namely the conversion logic when the pixel M of interest is the edge of an image, will be described first.

Figure 34A:
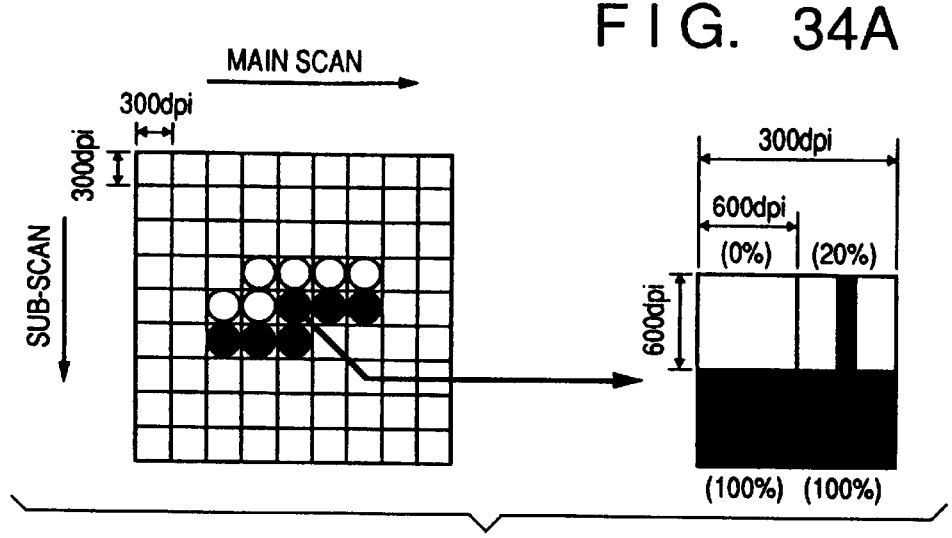
FIGS. 34A to 34C are diagrams illustrating examples of data variations in edge smoothing processing according to the second embodiment.
Figure 34B:
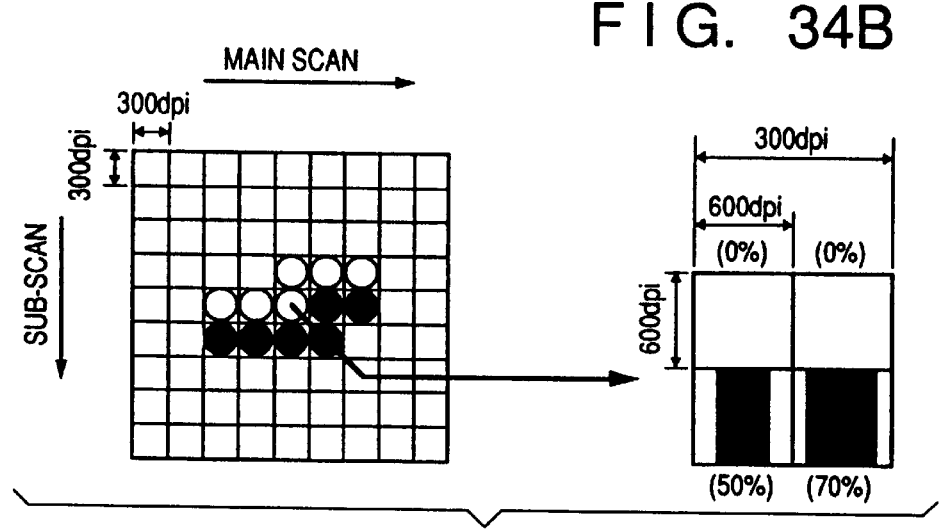
Figure 34C:
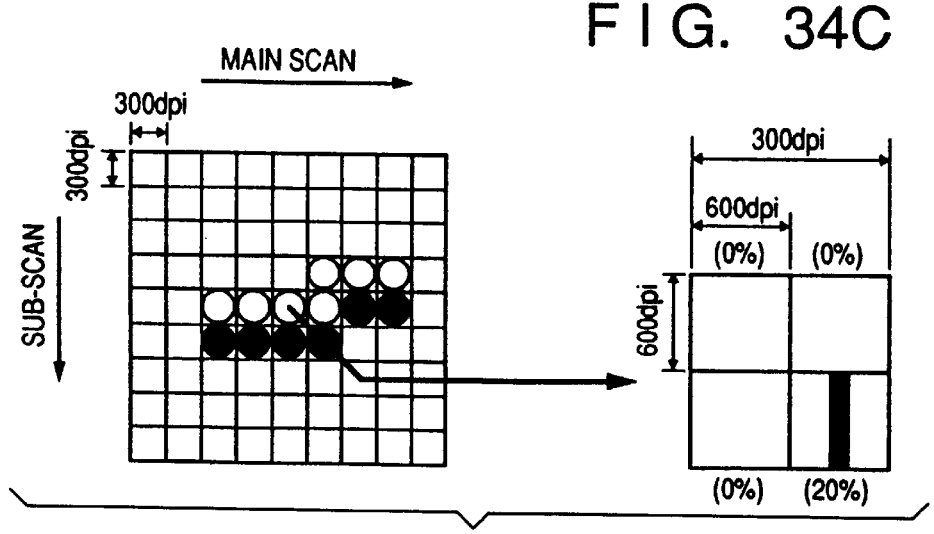

In this case, conversion is carried out by comparing the output data from the shift register 12' with a plurality of predetermined bitmap patterns. These bitmap patterns are for detecting that the pixel M of interest and the pixels peripheral thereto are forming the edge of an image. FIGS. 34A to 34C illustrate examples of data variations in edge smoothing processing.

In FIGS. 34A to 34C, the symbol "●" indicates that DARK of the binarized signals is "true", namely logical "H", and the symbol "○" indicates that LIGHT of the binarized signals is "true", namely logical "H". Furthermore, pixels that are neither "●" nor "○" may be any data whatsoever. Further, the "%" symbol indicates the ratio of laser drive pulses based upon altered data to laser-drive pulse width in a case where one dot of 600 dpi is printed at maximum density. Multiple-value data for a pertinent altered pixel is changed to a value modulated to a pulse shown in FIGS. 34A to 34C by the above-described pulse-width modulating circuit 34.

For example, in the case shown in FIG. 34A, the pixel M of interest is regarded as being a point of change which is part of a nearly horizontal (the main-scan direction) slanted line and on the side of high density, and the pixel is converted to 600 dpi data in the manner shown. In the case shown in FIG. 34B, on the other hand, the pixel M of interest is regarded as being a point of change which is part of a nearly horizontal slanted line and on the side of low density, and the pixel is converted to 600 dpi data as shown. In the case shown in FIG. 34C, on the other hand, the pixel M of interest is part of a nearly horizontal slanted line and on the side of high density, and is one dot away from the point of change. The pixel is converted to 600 dpi data as shown.

Further, in this embodiment, bitmap patterns for a case in which the pixel M of interest is part of a slanted line that is nearly vertical (the sub-scan direction) also are prepared. When matching is achieved with these bitmap patterns, the conversion of data is performed in a similar manner. At the time of conversion, the two items of data of M1, M2 of the upper half are generated when the engine prints an odd-numbered line, and the two items of data of M3, M4 of the lower half are generated when the engine prints an even-numbered line.

Thus, according to this embodiment, the data representing the pixel M of interest is compared with the number of bitmap patterns of the kind described above and a prescribed conversion is performed if the two coincide.

Whether or not conversion processing is executed in the edge smoothing logic circuit 21' can be designated by a signal ESON (see FIG. 28). When the ESON signal is "false", the edge smoothing logic circuit 21' outputs the original data /D7~/D0 of the pixel M of interest as is. Accordingly, in this case the data outputted is the result simply of enlarging the 300 dpi data by a factor of two in both the main- and sub-scan directions.

Figure 35A:
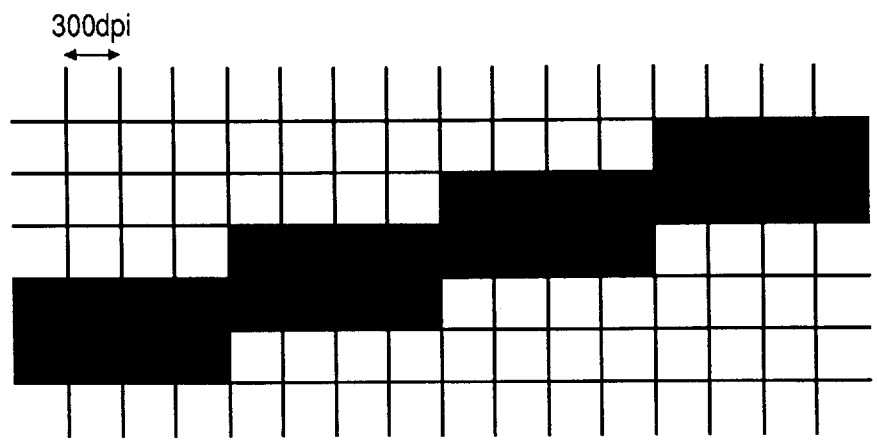
FIGS. 35A and 35B are diagrams schematically illustrating images obtained by edge smoothing processing according to the second embodiment.
Figure 35B:
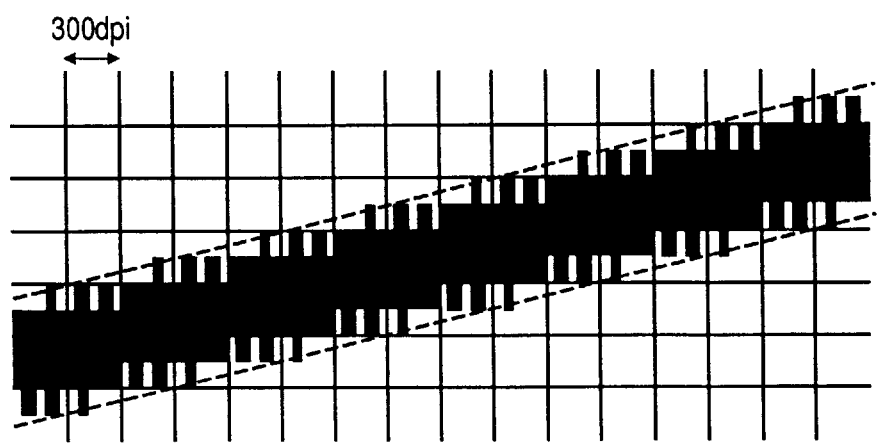

FIGS. 35A and 35B schematically illustrate images obtained by edge smoothing processing, in which FIG. 35A represents an image printed on the basis of the original data developed at 300 dpi and FIG. 35B an image printed on the basis of data converted by the edge smoothing logic circuit 21'. Here one box of the grid indicates a unit of 300 dpi.

When a small dot is added on in the vicinity of an edge, as illustrated in FIGS. 35A and 35B, a smooth image of the kind indicated by the dashed line in FIG. 35B is obtained by blurring of the dotted portion owing to the characteristics of the electrophotographic process. In other words, even if the original data is 300 dpi data, a smoothed-edge image is obtained by converting the data to 600 dpi data using smoothing processing. In FIGS. 35A and 35B, a case is illustrated in which data representing the high-density portion of the image is 00H and data representing the low-density portion of the image is FFH.

Next, the logic in the grayscale logic circuit 22', namely the conversion logic when the pixel M of interest is not the edge of an image, will be described.

FIG. 36 is a diagram for describing data conversion in grayscale smoothing processing according to this embodiment. This processing is for application to a case in which all of the binarized signals are LIGHT or all of the binarized signals DARK are "false" with regard to the pixel M of interest and all eight of pixels A~H neighboring the pixel M of interest. When this requirement is met, the four items of 600 dpi data M1, M2, M3, M4 converted from the pixel M of interest are calculated in accordance with the following equations:

$$M1 = M$$
$$M2 = (M+E)/2$$
$$M3 = (M+G)/2$$
$$M4 = (M+H)/2$$

In these equations the alphabetic characters indicate the image-data values of the pixels. That is, among the four items of data after conversion, M1 is assumed to be M representing the original data. With regard to M2, M3 and M4, these are replaced by the mean values of the original data M and the data of three pixels one of which neighbors the pixel of interest at its right, one below and one diagonally below on the right side, respectively.

Whether or not conversion processing is executed in the grayscale smoothing logic circuit 22' can be designated by a signal TSON (see FIG. 28). When the TSON signal is "false", the grayscale smoothing logic circuit 22' outputs the original data /D7~/D0 of the pixel M of interest as is. Accordingly, in this case the data outputted is the result simply of enlarging the 300 dpi data by a factor of two in both the main- and sub-scan directions.

Figure 37A:
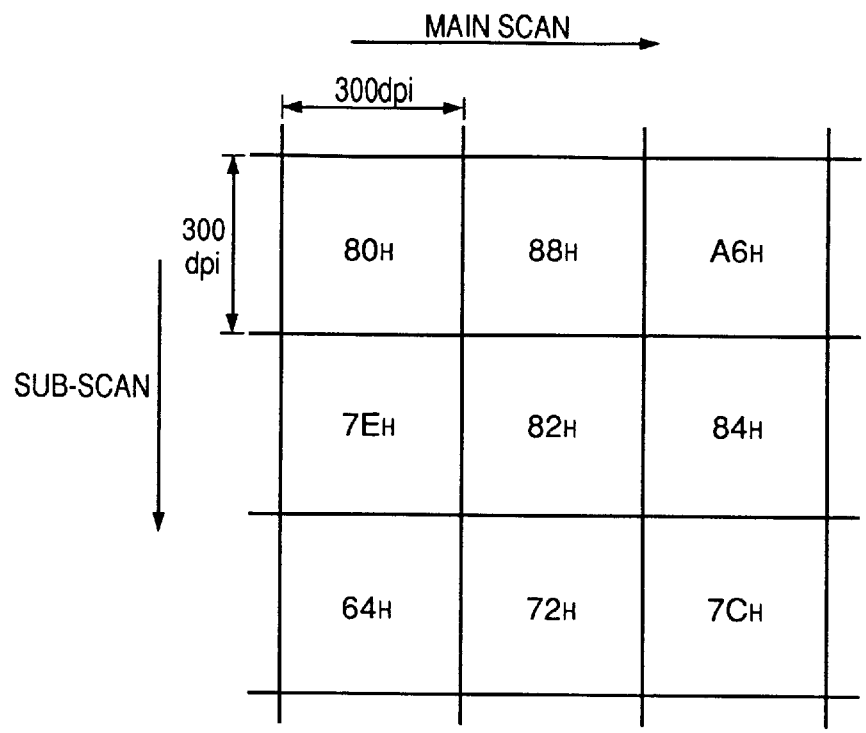
FIGS. 37A and 37B are diagrams schematically illustrating images obtained by grayscale smoothing processing according to the second embodiment.
Figure 37B:
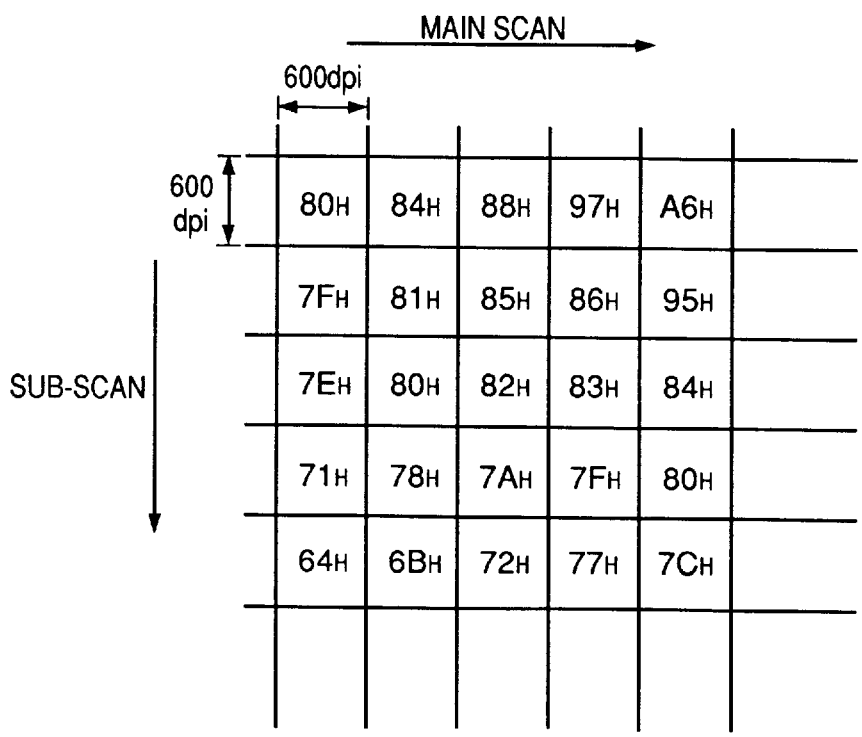

FIGS. 37A and 37B schematically illustrate images obtained by grayscale smoothing processing, in which FIG. 37A represents an image printed on the basis of the original data developed at 300 dpi and FIG. 37B an image printed on the basis of data converted by the grayscale smoothing logic circuit 22'. Smoother tonality can be obtained by thus interpolating data by the mean values of pixels neighboring the original data.

The smoothing logic circuit 14' produces the image-attribute signal /IMCHR as well. More specifically, as shown in FIG. 33, the binarized signals LIGHT and DARK of the pixel M of interest enter an OR gate 24' With regard to a pixel for which either binarized signal is "true", the image-attribute signal /IMCHR is made "false", namely logical "H". With regard to other pixels, the image-attribute signal /IMCHR is made "true", namely logical "L".

The data converted by the edge smoothing logic circuit 21' and the data converted by the grayscale smoothing circuit 22' enters a selector 23'. The image-attribute signal /IMCHR is used as the selection signal of the selector 23'. More specifically, the data converted by the edge smoothing logic circuit 21' is selected with regard to a pixel for which the image-attribute signal /IMCHR is "false", and the data converted by the grayscale smoothing logic circuit 22' is selected with regard to a pixel for which the image-attribute signal /IMCHR is "true". The 600 dpi, eight-bit data thus selected is sent to the printer engine 1100 as the image signals /VDO7~/VDO0 together with the image-attribute signal /IMCHR in synchronization with the image clock VCLK.

FIG. 38 is a timing chart illustrating the timing of the above-described processing when the 300 dpi image data of each color read out of the page memory 1205, converted by the color-signal converting circuit 1252 and fed into the smoothing logic circuit 14' is represented by L1, L2, . . . in regular order starting from a first line in the main-scan direction. It should be noted that the items of data read out of the line memories are illustrated at LM1~LM9.

The printer engine which has received an image signal thus converted to 600 dpi data carries out image formation by the electrophotographic process in the manner described above. When one page of image formation for the color magenta is completed, similar processing is executed for each of the colors in the order of cyan, yellow and black, thereby finally providing a full-color image.

In accordance with this embodiment, as described above, 300 dpi color multiple-value image data is subjected to image conversion processing of one type if the image corresponds to an edge portion and of a different type if the image corresponds to a non-edge portion based upon the characterizing features of the image detected from the values of pixels peripheral to the pixel of interest. This makes it possible to improve printing quality by obtaining a smoothed-edge image.

In the above-described embodiment, the same conversion processing is applied to the four image planes of magenta, cyan, yellow and black. However, since the characteristics of human vision differ for each color, an arrangement may be adopted in which conversion processing is changed depending upon the plane. In such case, a signal indicating the color currently undergoing processing may be sent to a smoothing processing and the logic changed over by a controller.

Furthermore, an arrangement may be adopted in which plural types of conversion logic are prepared in advance and can be selected by the user in dependence upon the environment, etc.

Modifications of the second embodiment will now be described.

<First Modification>

A color laser-beam printer according to this modification differs from the color laser-beam processing of the second embodiment in terms of the conversion algorithm of edge smoothing and the processing performed by the pulse-width modulating circuit for a case where the image-attribute signal /IMCHR is "false".

Specifically, according to the second embodiment, 300 dpi multiple-value image data developed in the page memory is converted to 600 dpi data by the smoothing processing circuit, and 600-line PWM printing is performed with regard to pixels for which the signal /IMCHR is "false".

In this modification, however, if the image-attribute signal /IMCHR is "false", the image data is used as a position designating signal for controlling the ON/OFF operation of the laser in 2400 dpi units in the main-scan direction and not as a signal indicating density level.

Figure 39:
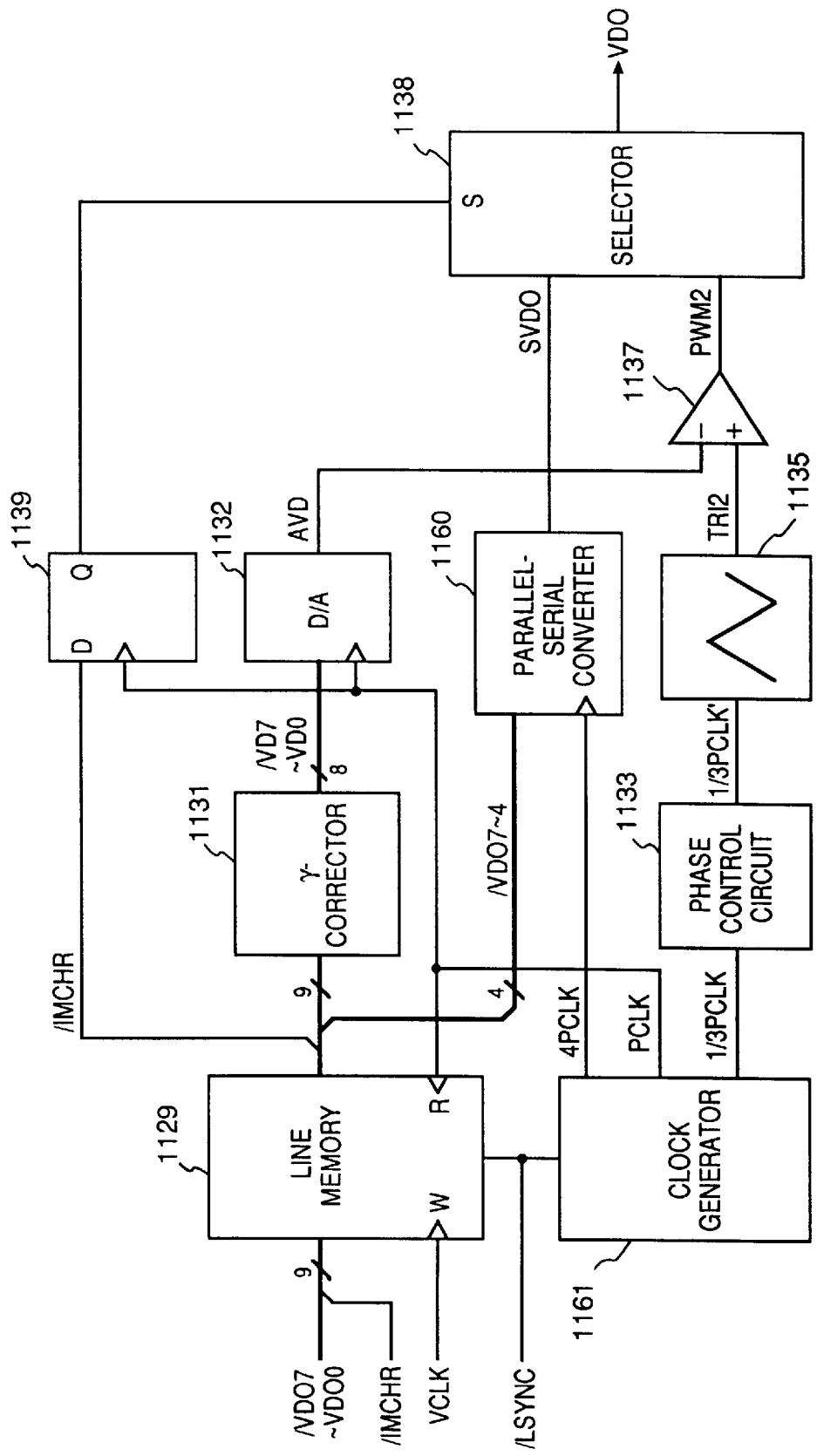
FIG. 39 is a block diagram of a pulse-width modulating circuit constituting a color laser-beam printer according to a first modification of the second embodiment.

FIG. 39 is a block diagram of a pulse-width modulating circuit constituting the color laser-beam printer according to this modification. Components identical with those of the pulse-width modulating circuit according to the second embodiment shown in FIG. 25 are designated by like reference numerals and are not described again. In FIG. 39, numeral 1160 denotes a 4-to-1 parallel-serial converting circuit, and numeral 1161 denotes a clock generating circuit. The latter outputs the signals PCLK, (⅓)PLCK similar to the clocks in the second embodiment, as well as a clock signal 4PCLK, which is a signal having four times the frequency of PCLK.

Data of 81 pixels in an array of nine dots×nine lines centered on the pixel M of interest enters the smoothing circuit 14' of the smoothing processing circuit 1253. As in the foregoing embodiment, the data entered is composed of a total of ten bits comprising the multiple-value image data /D7~/D0 and the binarized signals LIGHT, DARK in relation to a total of four pixels, namely the pixel M of interest and three pixels one of which neighbors the pixel of interest at its right, one below and one diagonally below on the right side. The input data is composed of data of the two bits of the signals LIGHT and DARK with regard to pixels other than these pixels.

Figure 40:
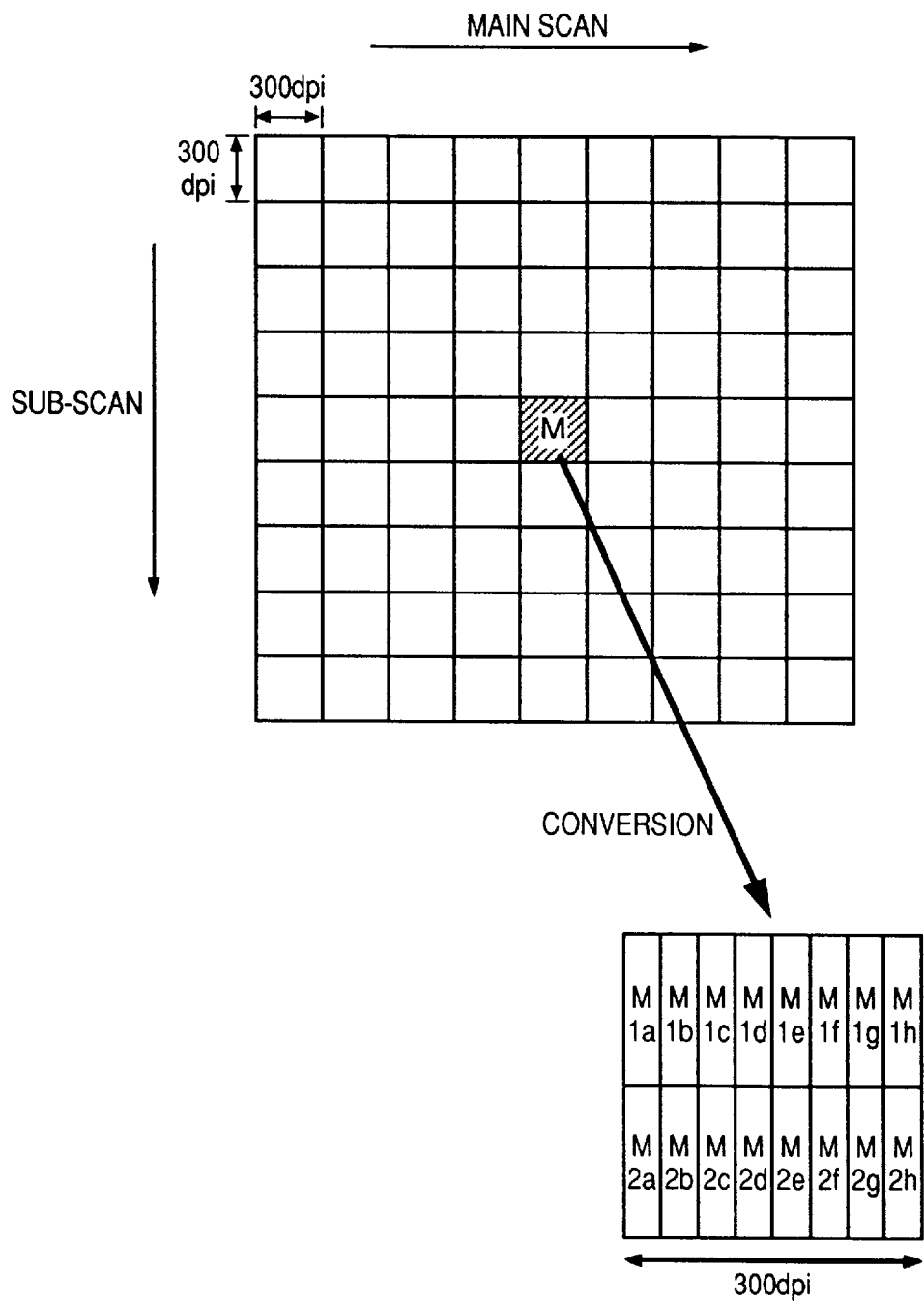
FIG. 40 is a diagram showing conversion of image data of a pixel of interest in an edge smoothing processing circuit according to the first modification.

As shown in FIG. 40, the edge smoothing processing circuit 21' of the smoothing processing circuit 14' detects the edge of the image by referring to the pixels peripheral to the pixel M of interest and converts the image data of the pixel M of interest to 16 items of two-value data M1a, M1b, M1c, M1d, M1e, M1f, M1g, M1h, M2a, M2b, M2c, M2d, M2e, M2f, M2g, M2h, in which main-scan density is multiplied eightfold and sub-scan density is doubled, so as to smoothen a prescribed edge. Accordingly, main-scan density of the data after conversion is 2400 dpi and sub-scan density is 600 dpi.

Figure 41A:
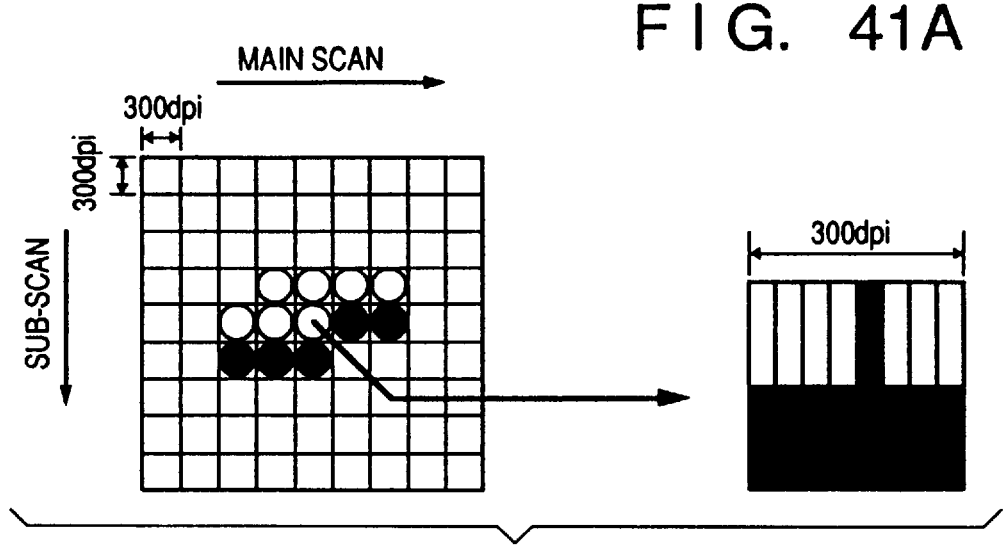
FIGS. 41A and 41B are diagrams showing examples of comparison between output data from a shift register and bitmap patterns according to the first modification.
Figure 41B:
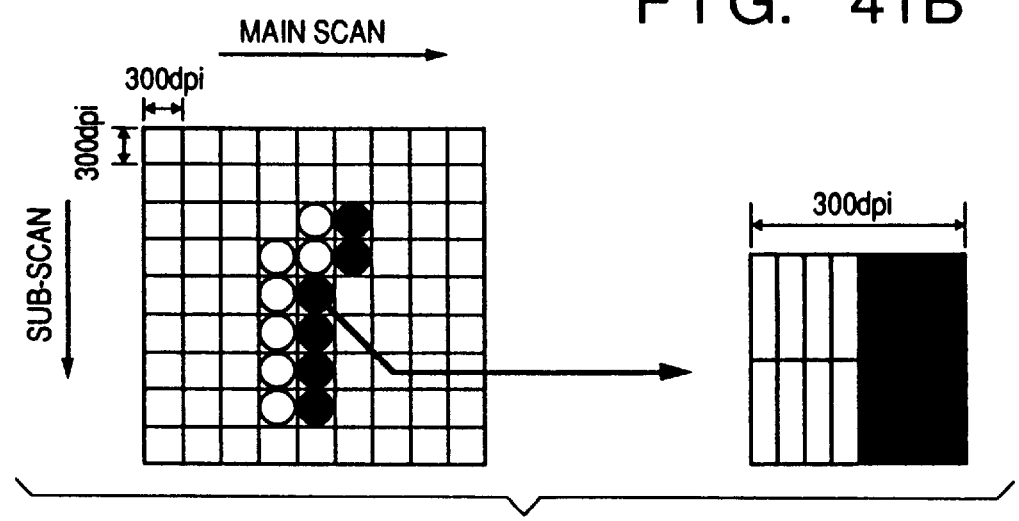
Figure 42A:
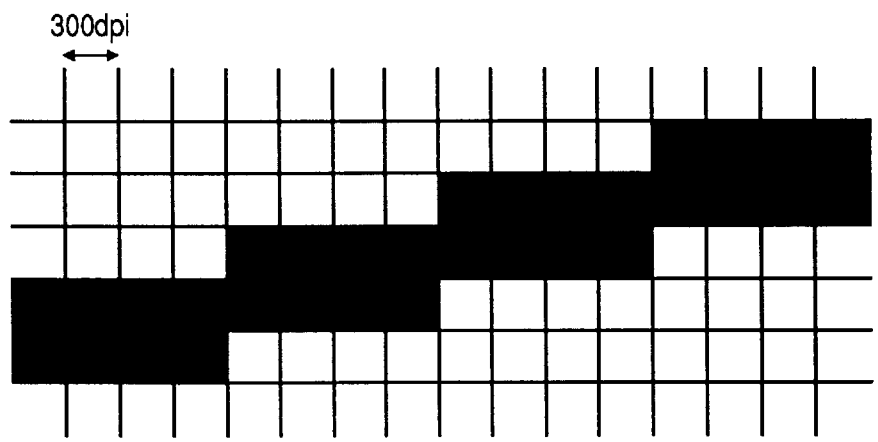
FIGS. 42A and 42B are diagrams schematically showing the printed image of an edge portion according to the first modification.
Figure 42B:
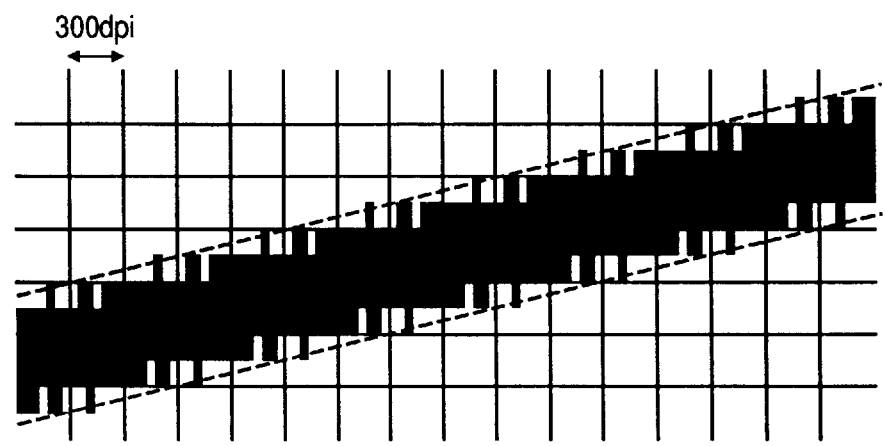
Figure 43A:
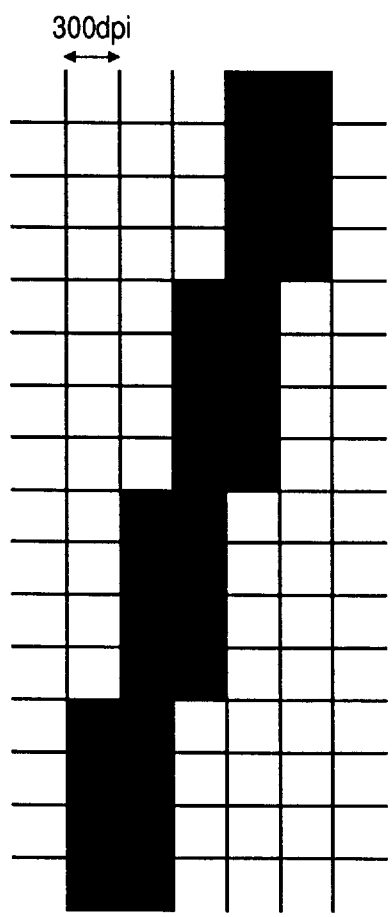
FIGS. 43A and 43B are diagrams schematically showing the printed image of an edge portion according to the first modification.
Figure 43B:

As in the second embodiment, this conversion is carried out by comparing the output data of the shift register 12' with a plurality of predetermined bitmap patterns. FIGS. 41A and 41B illustrate examples.

With regard to data after conversion, M1a~M1h are transmitted when the printer engine prints odd-numbered lines and M2a~M2h are transmitted when the printer engine prints even-numbered lines. At this time the four higher order bits /VDO7~/VDO4 are used as the signal lines, M1a~M1d (M2a~M2d) are transmitted upon being allocated to odd-numbered dots in the main-scan direction in units of 600 dpi, and M1e~M1h (M2e~M2h) are transmitted upon being allocated to even-numbered dots in the main-scan direction in units of 600 dpi. These signals are transmitted to the printer engine along with the attribute-signal /MCHR in synchronization with the image clock VCLK.

The image signal thus inputted to the printer engine next enters the pulse-width modulating circuit 1101, where the four higher order bits /VDO7~/VDO4 enter the parallel-serial converter 1160 via the line memory 1129. The parallel-serial converter 1160 converts the above-mentioned four-bit parallel data to serial data SVDO at the clock signal 4PLCK whose frequency is four times that of the pattern clock signal PCLK generated by the clock generating circuit 1161.

The SVDO signal resulting from the conversion is sent to the laser driver as the laser drive signal VDO via the selector 1138 so that the prescribed printing is carried out. If the image-attribute signal /IMCHR is "true" at this time, multiple-value printing is performed by 200-line PWM in the same manner as in the second embodiment.

FIGS. 42A and 42B and 43A and 43B schematically illustrate printed images of edge portions in this modification.

Thus, according to this modification, dot position can be changed at will in units of 240 dpi in the main-scan direction and 600 dpi in the sub-scan direction when a conversion is performed by smoothing. This modification is particularly effective in the smoothing of nearly vertical slanted lines.

<Second Modification>

In the second embodiment and first modification thereof, a case is described in which the density of the RGB multiple-value image data generated by the controller is 300 dpi. An example will now be described in which the multiple-value image data is capable of being developed even at 600 dpi in conformity with the storage capacity of the page memory 1205 and the type of image.

It should be noted that components similar to those in the color laser-beam printer according to the second embodiment are not described again.

The video controller in this modification is such that the CPU 1202 in the arrangement similar to that of the second embodiment judges whether the RGB image data is developed at 300 dpi or 600 dpi. This judgment is made based upon the relationship between the storage capacity of the page memory 1205 and the compression ratio of the compressing/decompressing circuit 1206.

More specifically, in a case where the page memory 1205 is capable of storing 600 dpi data at a compression ratio (e.g., 1/20) less than a prescribed value, the image data is developed at 600 dpi; in all other cases the image data is developed at 300 dpi. Further, the operation is also capable of designated resolution by the host computer or control panel 1209.

Figure 44:
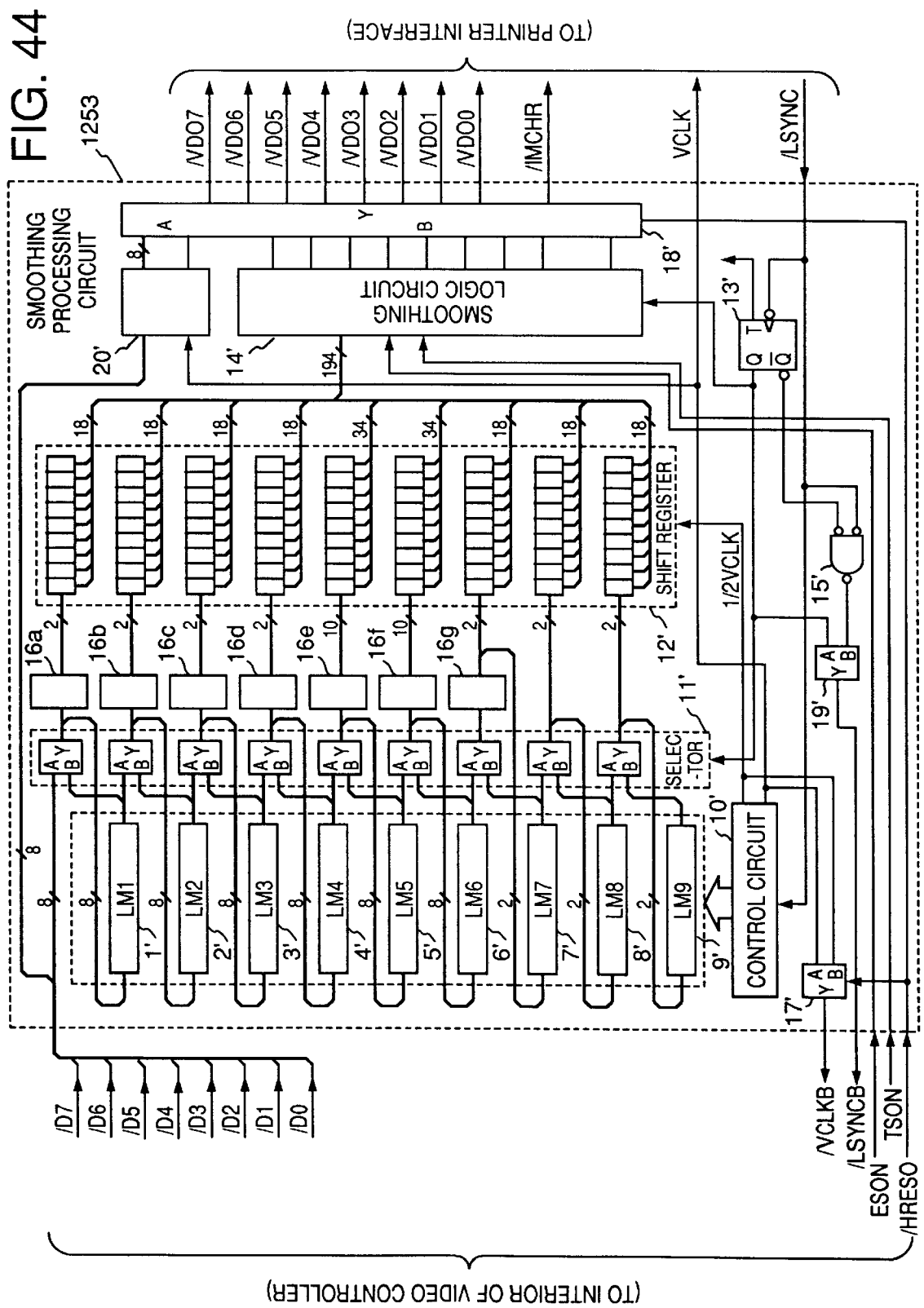
FIG. 44 is a block diagram showing the construction of a smoothing processing circuit according to a second modification.

FIG. 44 is a block diagram illustrating the construction of the smoothing processing circuit 1253 according to this modification. In FIG. 44, numerals 17'~19' denote selectors and 20' an image-attribute signal generating circuit for generating this signal at the time of 600 dpi operation. The other components are similar to those of the smoothing processing circuit according to the second embodiment illustrated in FIG. 30.

A signal /HRES0 indicating the resolution of the data enters the smoothing processing circuit 1253 shown in FIG. 44. If the signal /HRES0 is "true", this indicates that the data resolution is 600 dpi. In this case, the selectors 17'~19' select the A-input side.

More specifically, a 600 dpi clock signal VCLK is used as an image clock signal VCLKB employed within the controller, and the /LSYNC signal from the engine is used, without change, as the vertical synchronizing signal. The 600 dpi, eight-bit RGB signals /D7~/D0 enter the image-attribute signal generating circuit 19' in synchronization with the VCLKB signal.

The image-attribute signal generating circuit 19' produces the /IMCHR signal as "false" when the value of the pertinent printed pixel is less than 0FH or when it is greater than F0H, in the same manner as in the second embodiment. This signal is sent to the printer engine together with the above-mentioned image data. In a case where the /HRES0 is "false", this indicates that the data resolution is 300 dpi. Operation at this time is similar to that of the second embodiment described above.

Thus, in this modification, a controller can be upgraded to a 600 dpi controller by adding a memory to the inexpensive basic model.

[Third Embodiment]

A third embodiment of the invention will now be described.

Figure 45:
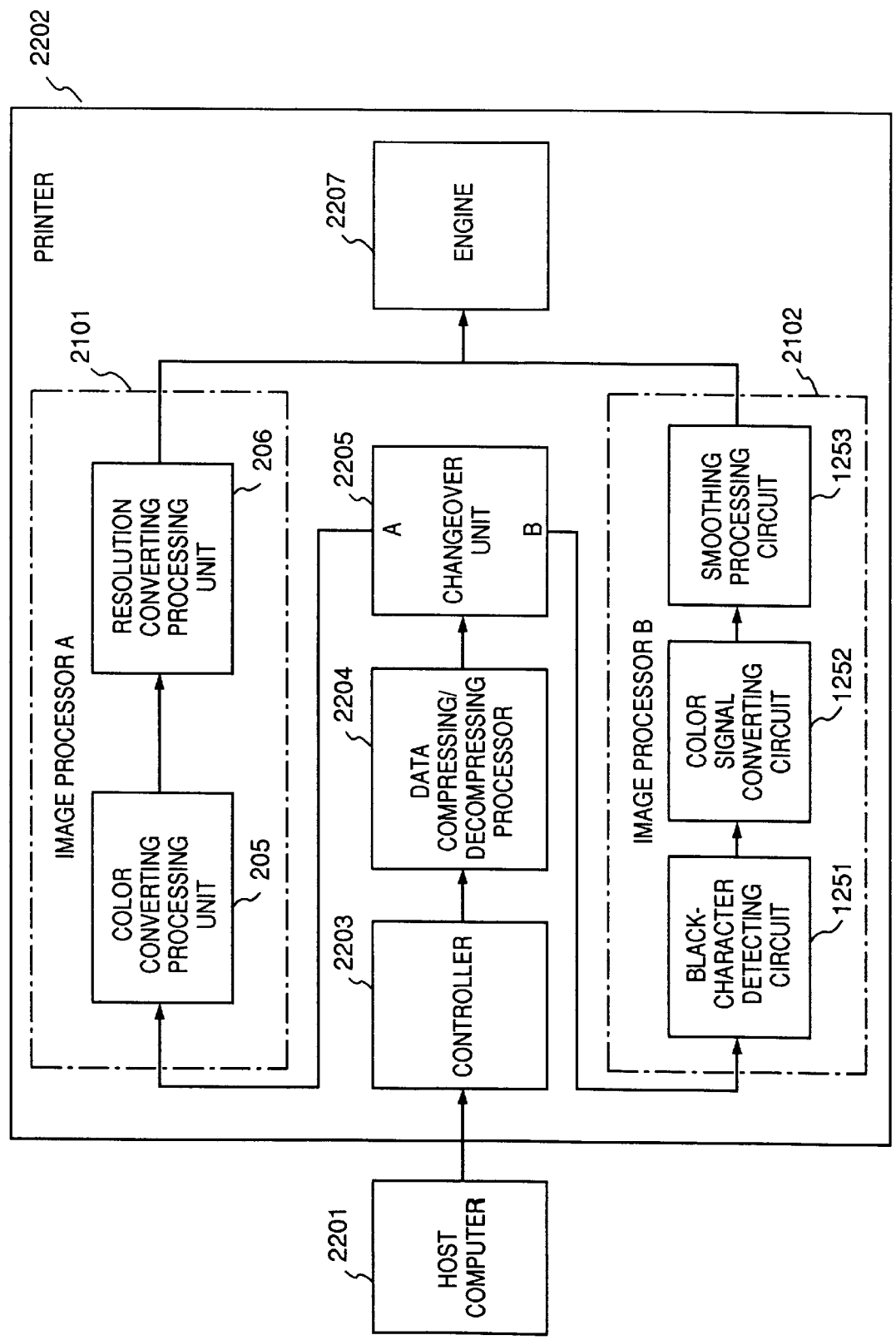
FIG. 45 is a block diagram showing the construction of a color laser-beam printer according to a third embodiment of the present invention.
Figure 46:
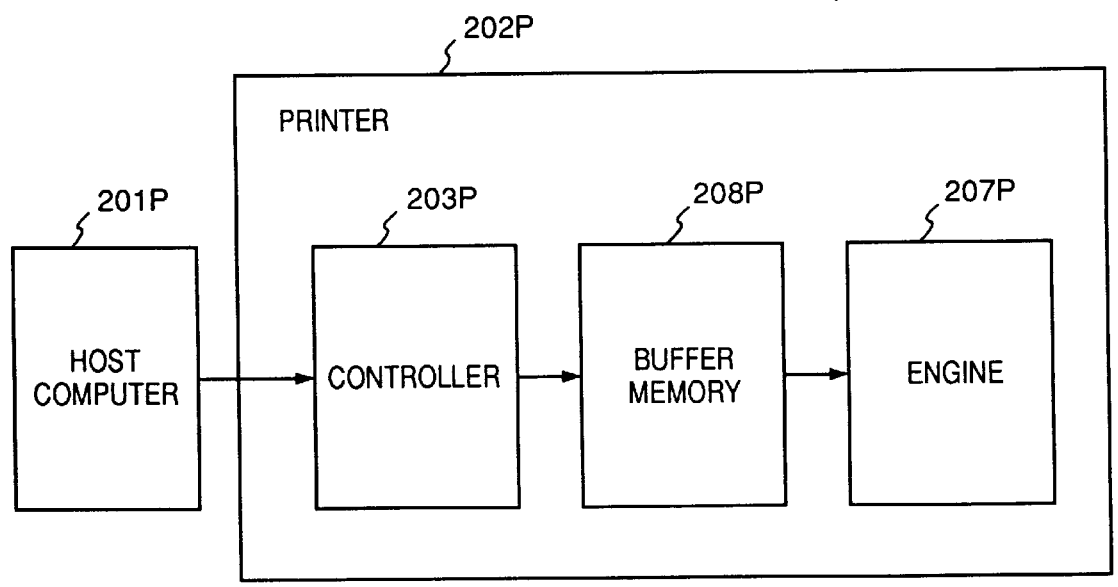
FIG. 46 is a block diagram showing the construction of a color-image forming apparatus according to the prior art.

FIG. 45 is a block diagram illustrating a color laser-beam printer (hereinafter referred to as a "printer") according to a third embodiment of the present invention. Components identical with those of the printers according to the first and second embodiments are designated by like reference numerals.

In FIG. 45, numeral 2201 denotes a host computer connected to a printer 2202. Image information created by application software or the like is transmitted as a command or code data or image data to a controller 2203 within the printer 2202 via an interface (not shown). The controller 2203 is developed into RGB multiple-value bit data (eight bits, for example) conforming to 300 dpi pixels.

The bit data outputted by the controller 2203 is sent to a data compression/decompression processor 2204. Here the data is compressed and then stored in a memory (not shown) as one page of RGB multiple-value bit data. The data compression/decompression processor 2204 successively outputs decompressed 300 dpi, RGB multiple-value bit data from the memory in dependence upon the processing timing of the engine 2207.

Numeral 2205 denotes a changeover unit for performing a changeover when the RGB multiple-value bit data outputted by the data compression/decompression processor 2204 is sent to an image processor A (2101) or image processor B (2102), described below. The changeover here is made to an output terminal on an A side to select the image processor A, in accordance with a designation made by the user or a designation set in the printer beforehand, in a case where a halftone image such as a natural picture and a two-value image such as a character or figure are mixed. Further, with regard to an image that contains a character or figure, the changeover is made to the output terminal on the B side to select the image processor B.

The image processor A has the same construction and the same mechanisms as the color converting processing unit 205 and resolution converting processing unit 206. The color converting processing unit 205 executes masking processing and undercolor removal (UCR) processing conforming to the color reproduction characteristics of the engine, whereby the input 300 dpi, RGB bit data is color-converted to YMCK multiple-value bit data.

The YMCK multiple-value bit data is resolution-converted to 600 dpi multiple-value bit data by the resolution converting processing unit 206 through a method similar to that of the first embodiment, and the converted bit data is outputted to the engine 2207.

As in the case of the image processor 1207 according to the second embodiment, the image processor B is composed of three functional blocks, namely the black-character detecting circuit 1251, color-signal converting circuit 1252 and smoothing processing circuit 1253. The image processor B outputs image data converted in terms of resolution to 600 dpi through processing identical with that of the second embodiment.

In the printer according to this embodiment as well, the bit data outputted by the image processor A or B is subjected by the engine 2207 to pulse-width modulation conforming to the data, and the laser is driven by the modulated signal to obtain a color image.

In accordance with this embodiment, as described above, two image processors are changed over selectively to execute different resolution converting processing. As a result, contour sharpness and contour smoothness can be reproduced at two-value image portions, and smooth reproduction of the grayscale is made possible at halftone image portions to enable printing of high-quality images. In addition, image conversion processing of one type is applied in a case where an image corresponds to an edge and image conversion processing of a different type is applied in a case where an image corresponds to a non-edge portion, thereby converting image data containing characters or figures to high-resolution, smoothened data. As a result, smoother edge images can be obtained.

The present invention can be applied to a system constituted by a plurality of devices or to an apparatus comprising a single device. Furthermore, it goes without saying that the invention is applicable also to a case where the object of the invention is attained by supplying a program to a system or apparatus.

In accordance with the present invention as described above, printing can be carried out at a high resolution in a state in which sharpness and smoothness of image contours are maintained as well as the smoothness of the grayscale in halftone portions of the image. Furthermore, not only is image data compressed but the resolution of the image is converted as well by interpolation processing, thereby achieving high compression of the image data to make possible a reduction in image memory capacity and to maintain image quality.

Further, in accordance with the present invention, conversion of resolution that differs depending upon the characterizing features of the image is executed, thereby making it possible to obtain a smooth-edged image.

In accordance with another aspect of the invention, two image processors are changed over in selective fashion so that different types of resolution conversion processing are executed, thereby making possible the printing of high-quality images. In addition, by applying image conversion logic that differs depending upon the features of the image, a high-resolution, smoother-edged image can be obtained.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus for supplying image data to an image forming apparatus, which forms a color image by overlaying images consisting of a plurality of color components, comprising:

generation means for generating first image data represented by a first color representation which is different from a color representation suitable for image formation by the image forming apparatus, the first image data being further represented by a first resolution representation which is different from a resolution representation suitable for image formation by the image forming apparatus;

color conversion means for converting the first image data into second image data represented by a second color representation suitable for image formation by the image forming apparatus; and resolution conversion means for converting the second image data into third image data represented by a second resolution representation suitable for image formation by the image forming apparatus, wherein said resolution conversion means has a first converting means which performs a smoothing processing, by extracting high-density pixel data, on the second image data of each color component in the second color representation.

2. The apparatus according to claim 1, wherein said resolution conversion means has a second converting means which performs interpolation, by calculating an average of data associated with a plurality of neighboring pixels, on the second image data of each color component in the second color representation.

3. The apparatus according to claim 2, further comprising selection means for selecting one of said first and second converting means and outputting image data which is outputted from said selected converting means to said image forming apparatus as the third image data.

4. The apparatus according to claim 1, wherein said generation means inputs data from an external apparatus and generates the first image data based upon the inputted data.

5. The apparatus according to claim 4, wherein the data from said external apparatus is described in Page Description Language.

6. The apparatus according to claim 4, said generation means has a compressing/decompressing means.

7. The apparatus according to claim 1, wherein the plurality of color components are yellow, magenta, cyan and black color components.

8. The apparatus according to claim 1, where the first color representation is represented by red, green and blue components.

9. The apparatus according to claim 1, further comprising an image forming unit.

10. The apparatus according to claim 9, wherein said image forming unit forms an image using electrophotography.

11. The apparatus according to claim 1, wherein a resolution associated with said first and second resolution representations is a resolution of the image forming apparatus in a sub-scanning direction.

12. A method of supplying image data to an image forming apparatus which forms a color image by overlaying images consisting of a plurality of color components, the method comprising the steps of:

generating first image data represented by a first color representation which is different from a color representation suitable for image formation by the image forming apparatus, the first image data being further represented by a first resolution representation which is different from a resolution representation suitable for image formation by the image forming apparatus;

color-converting the first image data into second image data represented by a second color representation suitable for image formation by the image forming apparatus; and resolution-converting the second image data into third image data represented by a second resolution representation suitable for image formation by the image forming apparatus, wherein said resolution-converting step includes a first converting step of smoothing, by extracting high-density pixel data, the second image data of each color component in the second color representation.

13. The method according to claim 12, wherein said resolution-converting step includes a second converting step of interpolation, by calculating an average of data associated with a plurality of neighboring pixels, on the second image data of each color component in the second color representation.

14. The method according to claim 13, further comprising the steps of:

selecting one of said first and second converting steps; and outputting image data which is outputted from said selected converting step to said image forming apparatus as the third image data.

15. The method according to claim 12, wherein said generating step includes the steps of inputting data from an external apparatus and generating the first image data based upon the inputted data.

16. The method according to claim 15, wherein the data from said external apparatus is described in Printer Language.

17. The method according to claim 15, wherein said generating step comprises a compressing/decompressing step.

18. The method according to claim 12, wherein the plurality of color components are yellow, magenta, cyan and black color components.

19. The method according to claim 12, where the first color representation is represented by red, green and blue components.

20. The method according to claim 12, further comprising the step of forming an image.

21. The method according to claim 20, wherein said step of forming an image uses electro-photography.

22. The method according to claim 12, wherein a resolution associated with said first and second resolution representations is a resolution of the image forming apparatus in a sub-scanning direction.

23. An image processing apparatus for supplying image data to an image forming apparatus, which forms a color image by overlaying images consisting of a plurality of color components, comprising:

input means for inputting first image data represented by a first color representation which is different from a color representation suitable for image formation by the image forming apparatus, the first image data being further represented by a first resolution representation which is different from a resolution representation suitable for image formation by the image forming apparatus;

color conversion means for converting the first image data into second image data represented by a second color representation suitable for image formation by the image forming apparatus; and resolution conversion means for converting the second image data into third image data represented by a second resolution representation suitable for image formation by the image forming apparatus, wherein said resolution conversion means has a first converting means which performs a smoothing processing, by extracting a high-density pixel data, on the second image data of each color component in the second color representation.

24. The apparatus according to claim 23, wherein said resolution conversion means has a second converting means which performs interpolation, by calculating an average of data associated with a plurality of neighboring pixels, on the second image data of each color component in the second color representation.

25. The apparatus according to claim 24, further comprising selection means for selecting one of said first and second converting means and outputting image data which is outputted from said selected converting means to said image forming apparatus as the third image data.

26. The apparatus according to claim 23, wherein the plurality of color components are yellow, magenta, cyan and black color components.

27. The apparatus according to claim 23, where the first color representation is represented by red, green and blue components.

28. An image processing method for supplying image data to an image forming apparatus, which forms a color image by overlaying images consisting of a plurality of color components, in accordance with first image data represented by a first color representation which is different from a color representation suitable for image formation by the image forming apparatus, the first image data being further represented by a first resolution representation which is different from a resolution representation suitable for image formation by the image forming apparatus, said method comprising:

- a color conversion step of converting the first image data into second image data represented by a second color representation suitable for image formation by the image forming apparatus; and
- a resolution conversion step of converting the second image data into third image data represented by a second resolution representation suitable for image formation by the image forming apparatus, wherein said resolution conversion step has a first converting step for performing a smoothing processing, by extracting high-density pixel data, on the second image data of each color component in the second color representation.

29. The method according to claim 28, wherein said resolution conversion step has a second converting step for performing interpolation, by calculating an average of data associated with a plurality of neighboring pixels, on the second image data of each color component in the second color representation.

30. The method according to claim 29, further comprising selection step of selecting one of said first and second converting step and outputting image data which is converted in said selected converting step to said image forming apparatus as the third image data.

31. The method according to claim 28, wherein the plurality of color components are yellow, magenta, cyan and black color components.

32. The method according to claim 28, where the first color representation is represented by red, green and blue components.

33. An image forming apparatus having an image forming unit, which forms a color image by overlaying images consisting of a plurality of color components, comprising:

input means for inputting first image data represented by a first color representation which is different from a color representation suitable for image formation by the image forming unit, the first image data being further represented by a first resolution representation which is different from a resolution representation suitable for image formation by the image forming unit;

color conversion means for converting the first image data into second image data represented by a second color representation suitable for image formation by the image forming unit; and resolution conversion means for converting the second image data into third image data represented by a second resolution representation suitable for image formation by the image forming unit, wherein said resolution conversion means has a first converting means which performs a smoothing processing, by extracting a high-density pixel data, on the second image data of each color component in the second color representation.

34. The apparatus according to claim 33, wherein said resolution conversion means has a second converting means which performs interpolation, by calculating an average of data associated with a plurality of neighboring pixels, on the second image data of each color component in the second color representation.

35. The apparatus according to claim 34, further comprising selection means for selecting one of said first and second converting means and outputting image data which is outputted from said selected converting means to said image forming unit as the third image data.

36. The apparatus according to claim 33, wherein said generation means has a compressing/decompressing means.

37. The apparatus according to claim 33, wherein the plurality of color components are yellow, magenta, cyan and black color components.

38. The apparatus according to claim 33, where the first color representation is represented by red, green and blue components.

39. The apparatus according to claim 33, wherein said image forming unit forms an image using electro-photography.

40. The apparatus according to claim 39, wherein a resolution associated with said first and second resolution representations is a resolution of the image forming unit in a sub-scanning direction.

* * * * *

UNITED STATES PATENT AND TRADEMARK OFFICE
CERTIFICATE OF CORRECTION

PATENT NO. : 5,875,044

DATED : February 23, 1999

INVENTOR(S) : KAORU SETO ET AL.

It is certified that error appears in the above-identified patent and that said Letters Patent is hereby corrected as shown below:

COLUMN 7

Line 36, "latent image" should read --latent-image--.
    Line 47, "KV" should read --kV--.
    Line 60, "KV" should read --kV--.

COLUMN 8

Line 9, "KV" should read --kV--.
    Line 12, "KV" should read --kV--.

COLUMN 10

Line 47, "in" should read --it in--.

COLUMN 14

Line 39, ""$01_H$" should read --"$01_H$"--.
    Line 65, "which" should read --which is--.

UNITED STATES PATENT AND TRADEMARK OFFICE
CERTIFICATE OF CORRECTION

PATENT NO. : 5,875,044

DATED : February 23, 1999

INVENTOR(S) : KAORU SETO ET AL.

It is certified that error appears in the above-identified patent and that said Letters Patent is hereby corrected as shown below:

COLUMN 15

Line 54, "(memory" should read --memory--.
    Line 55, "of when" should read --(when--.

COLUMN 16

Line 53, "YMCK" should read --to YMCK--.

COLUMN 17

Line 18, "the" should read --on the--.

COLUMN 19

Line 12-13, "The developing devices in one of four" should read --Four--.
    Line 14, "supported" should read --are supported--.
    Line 16, "blank should read --black--.

UNITED STATES PATENT AND TRADEMARK OFFICE
CERTIFICATE OF CORRECTION

PATENT NO. : 5,875,044

DATED : February 23, 1999

INVENTOR(S) : KAORU SETO ET AL.

Page 3 of 4

It is certified that error appears in the above-identified patent and that said Letters Patent is hereby corrected as shown below:

COLUMN 20

Line 48, "assumed" should read --assumes--.

COLUMN 22

Line 61, "$_{(½)}$ VCLK." should read --(½) VCLK.--.
    Line 64, "to thereto." should read --thereto.--.

COLUMN 23

Line 11, "$_{(½)}$ VCLK." should read --(½) VCLK.--.
    Line 27, "$_{(½)}$ VCLK." should read --(½) VCLK.--.

COLUMN 24

Line 19, "$_{(½)}$ VCLK" should read --(½) VCLK-.
    Line 40, "$_{(½)}$ VCLK" should read --(½) VCLK--.

COLUMN 25

Line 47, "lime" should read --line--.

UNITED STATES PATENT AND TRADEMARK OFFICE
CERTIFICATE OF CORRECTION

PATENT NO. : 5,875,044

DATED : February 23, 1999

INVENTOR(S) : KAORU SETO ET AL.

It is certified that error appears in the above-identified patent and that said Letters Patent is hereby corrected as shown below:

COLUMN 26

Line 24, ""H"." should read --"L".--.

COLUMN 33

Line 15, "Page Descrip-" should read --Printer--.
   Line 16, "tion" should be deleted.
   Line 17, "said should read --wherein said--.

COLUMN 34

Line 48, "a" should be deleted.

Signed and Sealed this

Thirtieth Day of May, 2000

Attest:

Q. TODD DICKINSON

*Attesting Officer*     *Director of Patents and Trademarks*